US012774904B2

(12) United States Patent
Kagan et al.

(10) Patent No.: US 12,774,904 B2
(45) Date of Patent: Oct. 27, 2026

(54) DEVICES, SYSTEMS AND METHODS FOR A CLOUD-BASED METER MANAGEMENT SYSTEM

(71) Applicant: EI ELECTRONICS LLC, Westbury, NY (US)

(72) Inventors: Erran Kagan, Great Neck, NY (US); Luna A. Koval, Commack, NY (US); Elly Engelstein, Great Neck, NY (US)

(73) Assignee: EI ELECTRONICS LLC, Westbury, NY (US)

(*) Notice: Subject to any disclaimer, the term of this patent is extended or adjusted under 35 U.S.C. 154(b) by 552 days.

(21) Appl. No.: 18/341,415

(22) Filed: Jun. 26, 2023

(65) Prior Publication Data

US 2024/0019269 A1 Jan. 18, 2024

Related U.S. Application Data

(63) Continuation of application No. 16/669,351, filed on Oct. 30, 2019, now Pat. No. 11,686,594, which is a continuation-in-part of application No. 16/278,760, filed on Feb. 19, 2019, now Pat. No. 11,734,704.

(60) Provisional application No. 62/869,532, filed on Jul. 1, 2019, provisional application No. 62/752,740, filed (Continued)

(51) Int. Cl.

| | |
|---|---|
| ***G01D 4/00*** | (2006.01) |
| ***H04L 67/12*** | (2022.01) |
| ***H04L 67/133*** | (2022.01) |

(52) U.S. Cl.

CPC ............ *G01D 4/004* (2013.01); *H04L 67/12* (2013.01); *H04L 67/133* (2022.05)

(58) Field of Classification Search

None

See application file for complete search history.

(56) References Cited

U.S. PATENT DOCUMENTS

| | | |
|---|---|---|
| 2,883,255 A | 4/1959 | Anderson |
| 2,987,704 A | 6/1961 | Gimpel et al. |
| 3,142,820 A | 7/1964 | Daniels |

(Continued)

FOREIGN PATENT DOCUMENTS

| | | |
|---|---|---|
| CN | 101799681 A | 8/2010 |
| CN | 111444240 A | 7/2020 |

(Continued)

OTHER PUBLICATIONS

Zhang et al., "On supporting containment queries in relational database management systems," ACM SIGMOD Record, 2001, vol. 30. No. 2, pp. 425-436.

(Continued)

*Primary Examiner* — Alvaro E Fortich
*Assistant Examiner* — Carl F.R. Tchatchouang
(74) *Attorney, Agent, or Firm* — Robinson + Cole LLP

(57) ABSTRACT

Devices, systems and methods for a cloud-based meter management system are provided. The present disclosure includes a meter cloud server, a plurality of IEDs or meters, and one or more clients 608 (e.g., a web browser client), which are coupled together via a network (e.g., via various wireless and/or hardwired communication networks). The various components and modules of the present disclosure provide a plurality of functions to enable one or more users to manage a plurality of IEDs or meters via the at least one client device.

20 Claims, 28 Drawing Sheets

Related U.S. Application Data on Oct. 30, 2018, provisional application No. 62/631,660, filed on Feb. 17, 2018.

(56) References Cited

U.S. PATENT DOCUMENTS

| | | | |
|---|---|---|---|
| 3,453,540 | A | 7/1969 | Dusheck, Jr. |
| 3,824,441 | A | 7/1974 | Heyman et al. |
| 4,246,623 | A | 1/1981 | Sun |
| 4,466,071 | A | 8/1984 | Russell, Jr. |
| 4,489,386 | A | 12/1984 | Breddan |
| 4,884,021 | A | 11/1989 | Hammond et al. |
| 4,996,646 | A | 2/1991 | Farrington |
| 5,014,229 | A | 5/1991 | Mofachern |
| 5,166,887 | A | 11/1992 | Farrington et al. |
| 5,170,360 | A | 12/1992 | Porter et al. |
| 5,185,705 | A | 2/1993 | Farrington |
| 5,212,441 | A | 5/1993 | McEachern et al. |
| 5,224,054 | A | 6/1993 | Wallis |
| 5,233,538 | A | 8/1993 | Wallis |
| 5,237,511 | A | 8/1993 | Caird et al. |
| 5,298,854 | A | 3/1994 | McEachern et al. |
| 5,298,855 | A | 3/1994 | McEachern et al. |
| 5,298,856 | A | 3/1994 | McEachern et al. |
| 5,298,859 | A | 3/1994 | McEachern et al. |
| 5,298,885 | A | 3/1994 | McEachern et al. |
| 5,298,888 | A | 3/1994 | McEachern et al. |
| 5,300,924 | A | 4/1994 | McEachern et al. |
| 5,301,122 | A | 4/1994 | Halpern |
| 5,302,890 | A | 4/1994 | McEachern et al. |
| 5,307,009 | A | 4/1994 | McEachern et al. |
| 5,315,527 | A | 5/1994 | Beckwith |
| 5,347,464 | A | 9/1994 | McEachern et al. |
| 5,544,064 | A | 8/1996 | Beckwith |
| 5,559,719 | A | 9/1996 | Johnson et al. |
| 5,574,654 | A | 11/1996 | Bingham et al. |
| 5,581,173 | A | 12/1996 | Yalla et al. |
| 5,706,204 | A | 1/1998 | Cox et al. |
| 5,724,556 | A | 3/1998 | Souder et al. |
| 5,764,523 | A | 6/1998 | Yoshinaga et al. |
| 5,774,366 | A | 6/1998 | Beckwith |
| 5,796,977 | A | 8/1998 | Sarangdhar et al. |
| 5,801,643 | A | 9/1998 | Williams et al. |
| 5,819,203 | A | 10/1998 | Moore et al. |
| 5,822,165 | A | 10/1998 | Moran |
| 5,832,210 | A | 11/1998 | Akiyama et al. |
| 5,874,903 | A | 2/1999 | Shuey et al. |
| 5,898,387 | A | 4/1999 | Davis et al. |
| 5,899,960 | A | 5/1999 | Moore et al. |
| 5,986,574 | A | 11/1999 | Colton |
| 6,018,690 | A | 1/2000 | Saito et al. |
| 6,028,857 | A | 2/2000 | Poor |
| 6,038,516 | A | 3/2000 | Alexander et al. |
| 6,073,169 | A | 6/2000 | Shuey et al. |
| 6,088,659 | A * | 7/2000 | Kelley .................. G06Q 30/06 709/201 |
| 6,098,175 | A | 8/2000 | Lee |
| 6,100,817 | A | 8/2000 | Mason, Jr. et al. |
| 6,121,593 | A | 9/2000 | Mansbery et al. |
| 6,151,653 | A | 11/2000 | Lin et al. |
| 6,157,329 | A | 12/2000 | Lee et al. |
| 6,167,329 | A | 12/2000 | Engel et al. |
| 6,195,614 | B1 | 2/2001 | Kochan |
| 6,279,037 | B1 | 8/2001 | Tams et al. |
| 6,289,267 | B1 | 9/2001 | Alexander et al. |
| 6,343,299 | B1 | 1/2002 | Huang et al. |
| 6,393,458 | B1 | 5/2002 | Gigliotti et al. |
| 6,396,839 | B1 | 5/2002 | Ardalan et al. |
| 6,405,128 | B1 | 6/2002 | Bechtolsheim et al. |
| 6,437,692 | B1 | 8/2002 | Petite et al. |
| 6,487,457 | B1 | 11/2002 | Hull et al. |
| 6,493,644 | B1 | 12/2002 | Jonker et al. |
| 6,496,511 | B1 | 12/2002 | Wang et al. |
| 6,519,537 | B1 | 2/2003 | Yang et al. |
| 6,528,957 | B1 | 3/2003 | Luchaco |
| 6,564,332 | B1 | 5/2003 | Nguyen et al. |
| 6,565,608 | B1 | 5/2003 | Fein et al. |
| 6,615,147 | B1 | 9/2003 | Jonker et al. |
| 6,636,030 | B1 | 10/2003 | Rose et al. |
| 6,657,552 | B2 | 12/2003 | Belski et al. |
| 6,671,654 | B1 | 12/2003 | Forth et al. |
| 6,671,802 | B1 | 12/2003 | Ott |
| 6,717,394 | B2 | 4/2004 | Elms |
| 6,735,535 | B1 | 5/2004 | Kagan et al. |
| 6,751,563 | B2 | 6/2004 | Spanier et al. |
| 6,836,737 | B2 | 12/2004 | Petite et al. |
| 6,842,707 | B2 | 1/2005 | Raichle et al. |
| 6,900,738 | B2 | 5/2005 | Crichlow |
| 6,957,158 | B1 | 10/2005 | Hancock et al. |
| 6,972,364 | B2 | 12/2005 | Diedrichsen |
| 6,985,087 | B2 | 1/2006 | Soliman |
| 7,006,934 | B2 | 2/2006 | Jonker et al. |
| 7,010,438 | B2 | 3/2006 | Hancock et al. |
| 7,043,459 | B2 | 5/2006 | Peevey |
| 7,049,975 | B2 | 5/2006 | Vanderah et al. |
| 7,050,808 | B2 | 5/2006 | Janusz et al. |
| 7,072,779 | B2 | 7/2006 | Hancock et al. |
| 7,085,824 | B2 | 8/2006 | Forth et al. |
| 7,085,938 | B1 | 8/2006 | Pozzuoli et al. |
| 7,126,493 | B2 | 10/2006 | Junker et al. |
| 7,129,848 | B2 | 10/2006 | Milliot et al. |
| 7,203,319 | B2 | 4/2007 | Ben-Zur et al. |
| 7,243,050 | B2 | 7/2007 | Armstrong |
| 7,249,265 | B2 | 7/2007 | von Carolsfeld et al. |
| 7,271,996 | B2 | 9/2007 | Kagan et al. |
| 7,299,308 | B2 | 11/2007 | Kondo et al. |
| 7,304,586 | B2 | 12/2007 | Wang et al. |
| 7,337,081 | B1 | 2/2008 | Kagan |
| 7,342,507 | B2 | 3/2008 | Jonker et al. |
| 7,436,687 | B2 | 10/2008 | Patel |
| 7,444,454 | B2 | 10/2008 | Yancey et al. |
| 7,511,468 | B2 | 3/2009 | McEachern et al. |
| 7,514,907 | B2 | 4/2009 | Rajda et al. |
| 7,616,656 | B2 | 11/2009 | Wang et al. |
| 7,668,663 | B2 | 2/2010 | Kurnik et al. |
| 7,702,779 | B1 | 4/2010 | Gupta et al. |
| 7,739,728 | B1 | 6/2010 | Koehler, Jr. et al. |
| 7,813,822 | B1 | 10/2010 | Hoffberg |
| 7,899,630 | B2 | 3/2011 | Kagan |
| 7,916,015 | B1 | 3/2011 | Evancich et al. |
| 7,916,060 | B2 | 3/2011 | Zhu et al. |
| 7,921,199 | B1 | 4/2011 | Shirriff et al. |
| 7,961,736 | B2 | 6/2011 | Ayyagari |
| 7,962,298 | B2 | 6/2011 | Przydatek et al. |
| 7,999,696 | B2 | 8/2011 | Wang et al. |
| 8,019,836 | B2 | 9/2011 | Elliott et al. |
| 8,024,073 | B2 | 9/2011 | Imes et al. |
| 8,078,418 | B2 | 12/2011 | Banhegyesi et al. |
| 8,160,824 | B2 | 4/2012 | Spanier et al. |
| 8,190,381 | B2 | 5/2012 | Spanier et al. |
| 8,193,929 | B1 | 6/2012 | Siu et al. |
| 8,250,246 | B2 | 8/2012 | Brockmann et al. |
| 8,335,936 | B2 | 12/2012 | Jonsson et al. |
| 8,402,267 | B1 | 3/2013 | Graham et al. |
| 8,599,036 | B2 | 12/2013 | Wang et al. |
| 8,635,036 | B2 | 1/2014 | Pamulaparthy et al. |
| 8,700,347 | B2 | 4/2014 | Spanier et al. |
| 8,717,007 | B2 | 5/2014 | Banhegyesi |
| 8,812,979 | B2 | 8/2014 | Khanke et al. |
| 8,933,815 | B2 | 1/2015 | Kagan et al. |
| 9,080,894 | B2 | 7/2015 | Spanier et al. |
| 9,094,227 | B2 | 7/2015 | Park |
| 9,161,102 | B2 | 10/2015 | Millstein et al. |
| 9,268,552 | B1 | 2/2016 | Kiiskila et al. |
| 9,310,792 | B2 | 4/2016 | Lu et al. |
| 10,303,860 | B2 | 5/2019 | Koval et al. |
| 10,972,556 | B1 | 4/2021 | Cheng et al. |
| 11,276,395 | B1 | 3/2022 | Jones et al. |
| 2002/0024453 | A1 | 2/2002 | Maeda |
| 2002/0032535 | A1 | 3/2002 | Alexander et al. |
| 2002/0048269 | A1 | 4/2002 | Hong et al. |
| 2002/0052972 | A1 | 5/2002 | Yim |
| 2002/0065872 | A1 | 5/2002 | Genske et al. |
| 2002/0073211 | A1 | 6/2002 | Lin et al. |
| 2002/0105435 | A1 | 8/2002 | Yee et al. |

(56) References Cited

U.S. PATENT DOCUMENTS

2002/0120723 A1 8/2002 Forth et al.
2002/0129342 A1 9/2002 Kil et al.
2002/0133504 A1 9/2002 Vlahos et al.
2002/0162014 A1 10/2002 Przydatek et al.
2002/0169570 A1 11/2002 Spanier et al.
2002/0174223 A1 11/2002 Childers et al.
2002/0188706 A1 12/2002 Richards et al.
2003/0005130 A1 1/2003 Cheng
2003/0014200 A1 1/2003 Jonker et al.
2003/0065757 A1 4/2003 Mentze et al.
2003/0084280 A1 5/2003 Bryan et al.
2003/0093429 A1 5/2003 Nishikawa et al.
2003/0110380 A1 6/2003 Carolsfeld et al.
2003/0163508 A1 8/2003 Goodman
2003/0178982 A1 9/2003 Elms
2003/0179714 A1* 9/2003 Gilgenbach ............. H04L 67/55 370/252
2003/0187550 A1 10/2003 Wilson et al.
2003/0200285 A1 10/2003 Hansen et al.
2003/0204756 A1 10/2003 Ransom et al.
2003/0226058 A1 12/2003 Miller et al.
2004/0059585 A1* 3/2004 Villicana ................ G01D 4/004 705/412
2004/0078474 A1 4/2004 Ramaswamy
2004/0088408 A1 5/2004 Tsyganskiy
2004/0098459 A1 5/2004 Leukert-Knapp et al.
2004/0107025 A1 6/2004 Ransom et al.
2004/0122833 A1 6/2004 Forth et al.
2004/0127775 A1 7/2004 Miyazaki et al.
2004/0128260 A1 7/2004 Amedure et al.
2004/0138834 A1 7/2004 Blackett et al.
2004/0162642 A1 8/2004 Gasper et al.
2004/0170181 A1 9/2004 Bogdon et al.
2004/0172207 A1 9/2004 Hancock et al.
2004/0177062 A1 9/2004 Urquhart et al.
2004/0187028 A1 9/2004 Perkins et al.
2004/0193329 A1 9/2004 Ransom et al.
2004/0208182 A1 10/2004 Boles et al.
2004/0243735 A1 12/2004 Rosenbloom et al.
2004/0250059 A1 12/2004 Ramelson et al.
2005/0027464 A1 2/2005 Jonker et al.
2005/0033956 A1 2/2005 Krempl
2005/0060110 A1 3/2005 Jones et al.
2005/0093571 A1 5/2005 Suaris et al.
2005/0138421 A1 6/2005 Fedronic et al.
2005/0138432 A1 6/2005 Ransom et al.
2005/0144437 A1 6/2005 Ransom et al.
2005/0169309 A1 8/2005 Tripathi et al.
2005/0183128 A1 8/2005 Assayag et al.
2005/0187725 A1 8/2005 Cox
2005/0202808 A1 9/2005 Fishman et al.
2005/0234837 A1 10/2005 Ramachandran et al.
2005/0240540 A1 10/2005 Borleske et al.
2005/0273280 A1 12/2005 Cox
2005/0273281 A1 12/2005 Wall et al.
2006/0020788 A1 1/2006 Han et al.
2006/0047787 A1 3/2006 Agarwal et al.
2006/0052958 A1 3/2006 Hancock et al.
2006/0066456 A1 3/2006 Jonker et al.
2006/0066903 A1 3/2006 Shiimori
2006/0083260 A1 4/2006 Wang et al.
2006/0085419 A1 4/2006 Rosen
2006/0089932 A1 4/2006 Buehler et al.
2006/0145890 A1 7/2006 Junker et al.
2006/0155422 A1 7/2006 Uy et al.
2006/0155442 A1 7/2006 Luo et al.
2006/0161360 A1 7/2006 Yao et al.
2006/0161400 A1 7/2006 Kagan
2006/0200599 A1 9/2006 Manchester et al.
2006/0206433 A1 9/2006 Scoggins
2006/0265720 A1 11/2006 Cai et al.
2006/0267560 A1 11/2006 Rajda et al.
2006/0274899 A1 12/2006 Zhu et al.
2007/0047735 A1 3/2007 Celli et al.
2007/0058634 A1 3/2007 Gupta et al.
2007/0061786 A1 3/2007 Zhou et al.
2007/0067119 A1 3/2007 Loewen et al.
2007/0067121 A1 3/2007 Przydatek et al.
2007/0096765 A1 5/2007 Kagan
2007/0096942 A1 5/2007 Kagan et al.
2007/0106618 A1 5/2007 Wu et al.
2007/0114987 A1 5/2007 Kagan
2007/0120705 A1 5/2007 Kiiskila et al.
2007/0136236 A1 6/2007 Kussmaul et al.
2007/0152058 A1 7/2007 Yeakley et al.
2007/0186111 A1 8/2007 Durand
2007/0240159 A1 10/2007 Sugiyama
2007/0255861 A1 11/2007 Kain et al.
2007/0263643 A1 11/2007 Wadhawan
2007/0266004 A1 11/2007 Wall et al.
2008/0028395 A1 1/2008 Motta et al.
2008/0033920 A1 2/2008 Colclasure et al.
2008/0046205 A1 2/2008 Gilbert et al.
2008/0052384 A1 2/2008 Marl et al.
2008/0071482 A1 3/2008 Zweigle et al.
2008/0074285 A1 3/2008 Guthrie
2008/0077806 A1 3/2008 Cui et al.
2008/0086222 A1 4/2008 Kagan
2008/0103631 A1 5/2008 Koliwad et al.
2008/0104149 A1 5/2008 Vishniac et al.
2008/0130639 A1 6/2008 Costa-Requena et al.
2008/0147334 A1 6/2008 Kagan
2008/0168434 A1 7/2008 Gee et al.
2008/0172192 A1 7/2008 Banhegyesi
2008/0187116 A1 8/2008 Reeves et al.
2008/0195562 A1 8/2008 Worth et al.
2008/0195794 A1 8/2008 Banker
2008/0201723 A1 8/2008 Bottaro et al.
2008/0215264 A1 9/2008 Spanier et al.
2008/0228830 A1 9/2008 Hawtin
2008/0234957 A1 9/2008 Banhegyesi et al.
2008/0235355 A1 9/2008 Spanier et al.
2008/0238406 A1 10/2008 Banhegyesi
2008/0238713 A1 10/2008 Banhegyesi et al.
2008/0243404 A1 10/2008 Banhegyesi
2009/0012728 A1 1/2009 Spanier et al.
2009/0037163 A1 2/2009 Kong et al.
2009/0055912 A1 2/2009 Choi et al.
2009/0070168 A1 3/2009 Thompson et al.
2009/0070447 A1 3/2009 Jubinville et al.
2009/0082879 A1 3/2009 Dooley et al.
2009/0082980 A1 3/2009 Thurmond et al.
2009/0094317 A1 4/2009 Venkitaraman
2009/0096654 A1 4/2009 Zhu et al.
2009/0115626 A1 5/2009 Vaswani et al.
2009/0172519 A1 7/2009 Xu et al.
2009/0190486 A1 7/2009 Lavigne et al.
2009/0196206 A1 8/2009 Weaver et al.
2009/0228224 A1 9/2009 Spanier et al.
2009/0235075 A1 9/2009 Cho et al.
2009/0235090 A1 9/2009 Chang
2009/0276102 A1 11/2009 Smith et al.
2009/0292894 A1 11/2009 Henry et al.
2009/0300165 A1 12/2009 Tuckey et al.
2009/0307178 A1 12/2009 Kuhns et al.
2009/0327483 A1 12/2009 Thompson et al.
2010/0004350 A1 1/2010 Zalich et al.
2010/0030734 A1 2/2010 Chunilal
2010/0031076 A1 2/2010 Wan et al.
2010/0054276 A1 3/2010 Wang et al.
2010/0057387 A1 3/2010 Kagan et al.
2010/0057628 A1 3/2010 Trinidad et al.
2010/0058355 A1 3/2010 Gernaey
2010/0073192 A1 3/2010 Goldfisher et al.
2010/0094851 A1 4/2010 Bent et al.
2010/0121996 A1 5/2010 Schmidt et al.
2010/0169709 A1 7/2010 Chiu et al.
2010/0169876 A1 7/2010 Mann
2010/0175062 A1 7/2010 Kim
2010/0217871 A1 8/2010 Gammon
2010/0238003 A1 9/2010 Chan et al.
2010/0278187 A1 11/2010 Hart et al.
2010/0299441 A1 11/2010 Hughes et al.

(56) References Cited

U.S. PATENT DOCUMENTS

| | | | | |
|---|---|---|---|---|
| 2010/0302064 | A1* | 12/2010 | Rodgers | G01D 4/004 340/870.16 |
| 2010/0305891 | A1* | 12/2010 | Rodgers | G01D 4/004 702/62 |
| 2010/0324845 | A1 | 12/2010 | Spanier et al. | |
| 2011/0004350 | A1 | 1/2011 | Cheifetz et al. | |
| 2011/0004426 | A1 | 1/2011 | Wright et al. | |
| 2011/0015961 | A1 | 1/2011 | Chan | |
| 2011/0016021 | A1 | 1/2011 | Manning | |
| 2011/0029461 | A1 | 2/2011 | Hardin, Jr. | |
| 2011/0040809 | A1 | 2/2011 | Spanier et al. | |
| 2011/0069709 | A1 | 3/2011 | Morris et al. | |
| 2011/0072423 | A1 | 3/2011 | Fukata | |
| 2011/0078305 | A1 | 3/2011 | Varela | |
| 2011/0093843 | A1 | 4/2011 | Endo et al. | |
| 2011/0106589 | A1 | 5/2011 | Blomberg et al. | |
| 2011/0107357 | A1 | 5/2011 | Cullimore | |
| 2011/0178651 | A1 | 7/2011 | Choi et al. | |
| 2011/0184671 | A1 | 7/2011 | Abiprojo et al. | |
| 2011/0282508 | A1 | 11/2011 | Goutard et al. | |
| 2011/0296496 | A1 | 12/2011 | O'Donnell et al. | |
| 2012/0041696 | A1 | 2/2012 | Sanderford, Jr. et al. | |
| 2012/0059932 | A1 | 3/2012 | Messer et al. | |
| 2012/0078547 | A1 | 3/2012 | Murdoch | |
| 2012/0079471 | A1 | 3/2012 | Vidal et al. | |
| 2012/0099478 | A1 | 4/2012 | Fu et al. | |
| 2012/0109999 | A1 | 5/2012 | Futty et al. | |
| 2012/0126995 | A1 | 5/2012 | Sobotka et al. | |
| 2012/0173032 | A1 | 7/2012 | Pamulaparthy et al. | |
| 2012/0209057 | A1 | 8/2012 | Siess et al. | |
| 2012/0216244 | A1 | 8/2012 | Kumar et al. | |
| 2012/0245595 | A1 | 9/2012 | Kesavadas et al. | |
| 2012/0265357 | A1 | 10/2012 | Song et al. | |
| 2012/0299744 | A1 | 11/2012 | Sfaelos | |
| 2013/0031201 | A1 | 1/2013 | Kagan et al. | |
| 2013/0055389 | A1 | 2/2013 | Alvarez et al. | |
| 2013/0066965 | A1 | 3/2013 | Foti | |
| 2013/0073059 | A1 | 3/2013 | Brian et al. | |
| 2013/0073374 | A1 | 3/2013 | Heath | |
| 2013/0084882 | A1 | 4/2013 | Khorashadi et al. | |
| 2013/0103657 | A1 | 4/2013 | Ikawa et al. | |
| 2013/0151849 | A1 | 6/2013 | Graham et al. | |
| 2013/0158918 | A1 | 6/2013 | Spanier et al. | |
| 2013/0198245 | A1* | 8/2013 | Kagan | H04L 67/06 707/812 |
| 2013/0198507 | A1 | 8/2013 | Kasuya | |
| 2013/0200702 | A1 | 8/2013 | Schöppner | |
| 2013/0293390 | A1 | 11/2013 | Le Buhan et al. | |
| 2013/0318627 | A1 | 11/2013 | Lundkvist et al. | |
| 2014/0025321 | A1 | 1/2014 | Spanier | |
| 2014/0094194 | A1 | 4/2014 | Schwent et al. | |
| 2014/0149836 | A1 | 5/2014 | Bedard et al. | |
| 2014/0172885 | A1 | 6/2014 | Sekharan | |
| 2014/0236371 | A1 | 8/2014 | Ishihara et al. | |
| 2014/0277788 | A1 | 9/2014 | Forbes, Jr. | |
| 2014/0281620 | A1 | 9/2014 | Rallo et al. | |
| 2014/0325679 | A1 | 10/2014 | Heo et al. | |
| 2015/0089061 | A1 | 3/2015 | Li et al. | |
| 2015/0143108 | A1 | 5/2015 | Demeter et al. | |
| 2015/0178865 | A1 | 6/2015 | Anderson et al. | |
| 2015/0185748 | A1 | 7/2015 | Ishchenko et al. | |
| 2015/0286394 | A1 | 10/2015 | Koval | |
| 2015/0294013 | A1 | 10/2015 | Ozer | |
| 2015/0316907 | A1 | 11/2015 | Elbsat et al. | |
| 2015/0317151 | A1 | 11/2015 | Falcy et al. | |
| 2015/0317589 | A1 | 11/2015 | Anderson et al. | |
| 2015/0324896 | A1 | 11/2015 | Marson et al. | |
| 2015/0341969 | A1 | 11/2015 | Brochu et al. | |
| 2016/0011616 | A1 | 1/2016 | Janous et al. | |
| 2016/0034437 | A1 | 2/2016 | Yong et al. | |
| 2016/0283256 | A1 | 9/2016 | Standley et al. | |
| 2016/0294953 | A1 | 10/2016 | Prabhakar et al. | |
| 2016/0359684 | A1 | 12/2016 | Rizqi et al. | |
| 2016/0364648 | A1 | 12/2016 | Du et al. | |
| 2017/0039372 | A1 | 2/2017 | Koval et al. | |
| 2017/0063566 | A1 | 3/2017 | Seminario et al. | |
| 2017/0078455 | A1 | 3/2017 | Fisher et al. | |
| 2017/0140149 | A1 | 5/2017 | Dumas et al. | |
| 2017/0147329 | A1 | 5/2017 | Shutt et al. | |
| 2017/0162320 | A1 | 6/2017 | Rumrill | |
| 2017/0180137 | A1 | 6/2017 | Spanier et al. | |
| 2017/0185056 | A1 | 6/2017 | Satou | |
| 2017/0270414 | A1 | 9/2017 | Ignatova et al. | |
| 2017/0317495 | A1 | 11/2017 | Pavlovski et al. | |
| 2017/0373500 | A1 | 12/2017 | Shafi et al. | |
| 2018/0025423 | A1 | 1/2018 | Utsumi et al. | |
| 2018/0066860 | A1 | 3/2018 | Carlson et al. | |
| 2018/0260695 | A1 | 9/2018 | Majumdar et al. | |
| 2018/0260920 | A1 | 9/2018 | Saratsis et al. | |
| 2018/0275898 | A1 | 9/2018 | Bhansali et al. | |
| 2018/0295546 | A1* | 10/2018 | Crawford | G06F 16/27 |
| 2019/0086891 | A1 | 3/2019 | Kawamoto et al. | |
| 2019/0102411 | A1 | 4/2019 | Hung et al. | |
| 2019/0138964 | A1 | 5/2019 | Morita et al. | |
| 2019/0205116 | A1 | 7/2019 | Chen et al. | |
| 2019/0340545 | A1 | 11/2019 | Minegishi et al. | |
| 2019/0349733 | A1 | 11/2019 | Nolan et al. | |
| 2020/0143522 | A1 | 5/2020 | Vogels et al. | |
| 2020/0266628 | A1 | 8/2020 | Kato et al. | |

FOREIGN PATENT DOCUMENTS

| | | | |
|---|---|---|---|
| JP | 2009-225629 | A | 10/2009 |
| KR | 10-1522175 | B1 | 5/2015 |
| WO | 2008/099035 | A1 | 8/2008 |
| WO | 2009/044369 | A2 | 4/2009 |
| WO | 2009/044369 | A3 | 4/2009 |

OTHER PUBLICATIONS

Trunov et al., "Legacy Applications Model Integration to Support Scientific Experiment," Institute of Electrical and Electronics Engineers, Mar. 2018. (7 pages).

"The Debian New Maintainer's Guide," Debian.org, 2011, Chapters 1, 6, and B, retrieved from https:/lweb.archive.org/web/2011051401193B/http://www.debian.org/doc/manuals/maint-guide/start.en.html on Apr. 28, 2021. (16 pages).

"Use Excel As A Web Browser," https://www.youtube.com/watch?v=A7LukCXev78, 2010.

Allard et al., "Jini meets UPnP: an architecture for Jini/UPnP interoperability," Proceedings of the 2003 Symposium on Applications and the Internet, Institute of Electrical and Electronics Engineers, 2003. (8 pages).

Andersen et al., "Btrdb: Optimizing storage system design for timeseries processing," Proceedings of the 14th USENIX Conference on File and Storage Technologies (FAST '16), 2006, pp. 39-52.

Braden, R., "Requirements for Internet Hosts—Application and Support," Request for Comments: 1123, Oct. 1989. (97 pages).

Chima, Chikodi, "How Social Media Will Make the smart Energy Grid More Efficient," mashable.com, Feb. 8, 2011. (4 pages).

Codingfreak, "iptables-Rate-limit incoming connections," https://web.archive.org/web/20100426123449/http://codingfreak. blogspot.com/2010/01/iptables-rate-limitincoming.htm, Apr. 26, 2010. (3 pages).

Communicator EXT 3.0: User Manual Revision 1.32, Electro Industries/Gauge Tech, Aug. 27, 2007. (558 pages).

Crockford, Douglas, "What jsmin Does," https://web.archive.org/web/20030621080211/http://www.crockford.com/javascript/jsmin.html, Oct. 28, 2002. (2 pages).

Deutsch et al., "How to Use Anonymous FTP," RFC1635, May 1994. (14 pages).

Yu et al., "Deep Convolutional Neural Networks with Layer-wise Context Expansion and Attention," Sep. 2016. (5 pages).

Duncan et al., "Protection, metering, monitoring, and control of medium-voltage power systems," IEEE Transactions on Industry Applications, Jan./Feb. 2004, vol. 40, No. 1, pp. 33-40.

Futura+Series, "Advanced Power Monitoring and Analysis for the 21st Century," Electro Industries/Gauge Tech, Specification, Apr. 13, 2000. (8 pages).

(56) References Cited

OTHER PUBLICATIONS

Gonzales et al., "Passive Scanning in Modbus Networks," IFIP International Federation for Information Processing, 2008, vol. 253, Critical Infrastructure Protection, pp. 175-187.
"Universal Plug and Play," Wikipedia, https://web.archive.org/web/20010140155 36/http://en.wikipedia.org/wiki/Universal_Plug_and_Play, Oct. 14, 2007. (14 pages).
"Burst Mode (computing)," Wikipedia, https://web.archive.org/web/20081018044345/http://en.wikipedia.org/wiki/Burst_mode_(computing), Oct. 18, 2008. (1 page).
Hubbert, "What is flat file?", WhatIs.com, http://searchsqlserver.techtarget.com/definition/flat-file, Jul. 2006. (1 page).
"HW Virtual Serial Port," HW server, http://www.trcontrolsolutions.com/pdfs/hw_vsp_v104_en.pdf, Jul. 2003. (4 pages).
"Electromagnetic compatibility (EMC) Part 4: Testing and measuring techniques, Section 15: Flickermeter-Functional and design specifications (IEC 61000-4-15)," European Committee for Electrotechnical Standardization, Apr. 1998. (25 pages).
"7700 ION: 3-Phase Power Meter, Analyzer and Controller: Power Measurement, specification," ION Technology, revision date Dec. 8, 1998. (10 pages).
"7500 ION 7600 ION: High Visibility Energy & Power Quality Compliance Meters, Power Measurement, specification," ION Technology, revision date Nov. 30, 2000. (8 pages).
"7500 ION: High Visibility 3-Phase Energy & Power Quality Meter, Power Measurement, specification," ION Technology, revision date Mar. 21, 2000. (8 pages).
"ION7550/ION7650 PowerLogic power-monitoring units: Technical data sheets," Schneider Electric, 2006. (12 pages).
Janetzko et al., "Anomaly detection for visual analytics of power consumption data," Computers & Graphics, 2014, vol. 38, pp. 27-37.
Kezunovic, Mladen, "Smart Fault Location for Smart Grids," IEEE Transactions on Smart Grid, Mar. 2011, vol. 2, No. 1, pp. 11-22.
"Using DNS Servers with DHCP," Microsoft TechNet, Jan. 21, 2005, accessed from https://technet.microsoft.com/en-us/library/cc787034 on Jun. 9, 2015. (4 pages).
Computer Dictionary, Microsoft, 2002, 5th Edition; pp. 174, 215, and 276 (excerpt includes table of contents and front matter).
Definition of JavaScript, Computer Dictionary, Microsoft, 2002, 5th Edition. (3 pages).
Milanovic et al., "The Influence of Fault Distribution on Stochastic Prediction of Voltage Sags," IEEE Transactions on Power Delivery, Jan. 2005, vol. 20, No. 1, pp. 278-285.
Natarajan, Ramesh, "4 Easy Steps to Upgrade Linksys Wireless Router," Thegeekstuff.com, https://www.thegeekstuff.com/2009/06/how-to-upgrade-linksys-wireless-router-firmware, Jun. 8, 2009. (3 pages).
"Nexus 1250: Installation and Operation Manual Revision 1.20," Electro Industries/Gauge Tech, Nov. 8, 2000. (50 pages).
"Nexus 1250: Precision Power Meter & Data Acquisition Node," Accumeasure Technology, Electro Industries/Gauge Tech, specification, Nov. 1999. (16 pages).
"Introduction to Code Obfuscation," Paladion, https://www.paladion.net/blogs/introduction-to-code-obfuscation, 2004. (52 pages).
Pan et al., "LiftingNet: A Novel Deep Learning Network With Layerwise Feature Learning From Noisy Mechanical Data for Fault Classification," IEEE Transactions on Industrial Electronics, 2017, vol. 65, No. 6, pp. 4973-4982.
"Nexus 1250: Performance Power Meter & Data Acquisition Node," Electro Industries/Gauge Tech, specification, Dec. 14, 2000. (8 pages).
Postel et al., "File Transfer Protocol (FTP)", RFC 959, Oct. 1985. (66 pages).
"PowerLogic Series 4000 Circuit Monitors," Schneider Electric, Document # 3020HO0601, Jan. 2006. (4 pages).
Horowitz et al., "FTP Security Extensions," RFC 2228, 1997, retrieved from https://tools.ietf.org/html/rfc2228, Apr. 18, 2019. (18 pages).
Speirs, Ryan, "What is binary file?", WhatIs.com, http://whatis.techtarget.com/definition/binary-file, Apr. 2005. (1 page).
Tufekci, Pinar, "Prediction of full load electrical power output of a base load operated combined cycle power plant using machine learning methods," International Journal of Electrical Power & Energy Systems, 2014, vol. 60, pp. 126-140.
"UPnP Device Architecture 1.0," UPnP Forum, revised Apr. 24, 2008. (80 pages).
"User's Installation & Operation and User's Programming Manual," The Futura Series, Electro Industries/Gaugetech, 1995. (34 pages).
"What is a Network Interface Card?", WhatIs.com, https://www.techtarget.com/searchnetworking/definition/network-interface-card?_gl=1 *13qjdky*_ ga*NzA 1 MzE3NjAyLjE2Mzl3NzU5NjA.*_ga_TQKE4GS5P9*MTYzMjk1 MDkzNC4yLjEuMTYzMjk1 MTY3Ny4w&_ga=2.164813883.525309060.1632950935-705317602.1632775960, Sep. 27, 2021. (5 pages).
White, Russ, "Working with IP addresses," The Internet Protocol Journal, Cisco Systems, Inc., vol. 9, No. 1, 1992-2006, http://web.archive.org/web/20060508172602/http://www.cisco.com/web/about/ac123/ac147/archived_issues/ipj_9-1/ip_addresses.tml, May 8, 2008. (8 pages).
"File Transfer Protocol," Wikipedia, https://web.archive.org/web/20051216071210/http:en.wikipedia.org/wiki/File_Transfer_Protocol, Dec. 16, 2005. (9 pages).
"User Datagram Protocol," Wikipedia, https://web.archive.org/web/20050823032448/https://en.wikipedia.org/wiki/User_Datagram_Protocol, Aug. 23, 2005. (2 pages).
Wils et al., "Device discovery via residential gateways," IEEE Transactions on Consumer Electronics, Aug. 2002, vol. 48, No. 3, pp. 478-483.
Xia et al., "Secure Session Key Management Scheme for Meter-Reading System Based on LoRa Technology," IEEE Access, 2018, vol. 6, pp. 75015-75024.
Yum, "Secured Remote Data," Manual p. 2012, retrieved from yum.baseurl.org/wiki/securedRemoteData on Apr. 18, 2019. (2 pages).
Zeinalipour-Yazti et al., "MicroHash: An Efficient Index Structure for Flash-Based Sensor Devices," Proceedings of the 4th Conference on USENIX Conference on File and Storage Technologies, Dec. 2005, vol. 4. (14 pages).

* cited by examiner

DEVICES, SYSTEMS AND METHODS FOR A CLOUD-BASED METER MANAGEMENT SYSTEM

PRIORITY

This application is a continuation of U.S. patent application Ser. No. 16/669,351, filed Oct. 30, 2019, now U.S. Pat. No. 11,686,594, which claims priority to U.S. Provisional Patent Application Ser. No. 62/752,740, filed Oct. 30, 2018, and U.S. Provisional Patent Application Ser. No. 62/869,532, filed Jul. 1, 2019, and is also a continuation-in-part application to U.S. patent application Ser. No. 16/278,760, filed Feb. 19, 2019, which claims priority to U.S. Provisional Patent Application Ser. Nos. 62/631,660, filed Feb. 17, 2018, and 62/752,740, filed Oct. 30, 2018, the contents of which are hereby incorporated by reference in their entireties, the contents of which are hereby incorporated by reference in their entirety.

CROSS REFERENCE TO RELATED APPLICATIONS

This application is related to

U.S. patent application Ser. No. 13/644,877, filed Oct. 4, 2012,

U.S. patent application Ser. No. 13/799,832, filed Mar. 13, 2013,

U.S. patent application Ser. No. 13/836,671, filed Mar. 15, 2013,

U.S. patent application Ser. No. 14/742,302, filed Jun. 17, 2015, the contents of each of the above listed applications are hereby incorporated by reference in their entirety.

BACKGROUND

Field. The present disclosure relates generally to intelligent electronic devices (IEDs) and, in particular, to devices, systems and methods for a cloud-based meter management system.

Description of the Related Art Monitoring of electrical energy by consumers and providers of electric power is a fundamental function within any electric power distribution system. Electrical energy may be monitored for purposes of usage, equipment performance and power quality. Electrical parameters that may be monitored include volts, amps, watts, vars, power factor, harmonics, kilowatt hours, kilovar hours and any other power related measurement parameters. Typically, measurement of the voltage and current at a location within the electric power distribution system may be used to determine the electrical parameters for electrical energy flowing through that location.

Devices that perform monitoring of electrical energy may be electromechanical devices, such as, for example, a residential billing meter or may be an intelligent electronic device ("IED"). Intelligent electronic devices typically include some form of a processor. In general, the processor is capable of using the measured voltage and current to derive the measurement parameters. The processor operates based on a software configuration. A typical consumer or supplier of electrical energy may have many intelligent electronic devices installed and operating throughout their operations. IEDs may be positioned along the supplier's distribution path or within a customer's internal distribution system. IEDs include revenue electric watt-hour meters, protection relays, programmable logic controllers, remote terminal units, fault recorders and other devices used to monitor and/or control electrical power distribution and consumption. IEDs are widely available that make use of memory and microprocessors to provide increased versatility and additional functionality. Such functionality includes the ability to communicate with remote computing systems, either via a direct connection, e.g., a modem, a wireless connection or a network. IEDs also include legacy mechanical or electromechanical devices that have been retrofitted with appropriate hardware and/or software allowing integration with the power management system.

Typically, an IED is associated with a particular load or set of loads that are drawing electrical power from the power distribution system. The IED may also be capable of receiving data from or controlling its associated load. Depending on the type of IED and the type of load it may be associated with, the IED implements a power management function that is able to respond to a power management command and/or generate power management data. Power management functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof.

SUMMARY

In accordance with embodiments of the present disclosure, there are provided herein devices, methods and systems for a cloud-based meter management system. The cloud-based meter management system of the present disclosure enables one or more client devices to seamlessly and efficiently manage a plurality of meters or intelligent electronic devices (IEDs) disposed throughout various locations.

In one embodiment, a cloud-based meter management system is provided including at least one meter manager module that collects meter log data from at least one meter and sends the collected meter log data to at least one server via a predetermined format; the at least one server receives and stores the collected meter log data from the at least one meter manager module; and at least one client device that accesses the at least one server to view the meter log data.

In one aspect, the system further includes at least one network enabled meter that sends meter log data to the at least one server via the predetermined format.

In another aspect, the predetermined format is JSON data format.

In a further aspect, the predetermined format is at least of a XML and/or HTML.

In yet another aspect, the at least one server includes a web server for providing a user interface to the at least one client device.

In one aspect, the at least one server includes at least one REST web service that receives at least one request from the at least one client device and provide a response to the at least one request.

In another aspect, the at least one REST web service further receives the collected meter log data from the at least one meter manager module for storage in at least one database.

In still another aspect, the at least one server is configured for autoscaling to add at least one additional server when an increased load of data sent to the at least one server exceeds a predetermined limit.

In another aspect, the system further includes at least one load balancer for distributing the sent data among the at least one server and the at least one additional server.

In a further aspect, the system further includes a message broker for routing communications between the at least one web server, the at least REST web service and the at least one database.

In another aspect of the present disclosure, the system further includes at least one consumer that performs at least one of collecting calls from the at least one REST web service, sending the calls to the at least one database and/or returning data from the at least one database.

In one aspect, the at least one consumer includes a push consumer that captures sent data from the message broker and stores the sent data in the at least one database.

In another aspect, the at least one consumer includes a metadata consumer that receives at least one request from the message broker, sends the at least one request to the at least one database and sends at least one response for presentation on a web site hosted by the at least one server.

In still another aspect, the at least one server generates a key upon registration of a user, wherein the generated key is associated to the at least one meter of the registered user.

In a further aspect, the at least one server verifies the sent data received from the at least one meter via the generated key.

In yet another aspect, the at least one server determines if the sent meter log data from the at least one meter manager module exceeds a predetermined limit and, if the predetermined limit is exceeded, the at least one server excludes the data from being stored in the at least one database.

In one aspect, the at least one server records a count and associated time of day when the data was excluded.

In another aspect, the at least one server presents the count and associated time of day of the excluded data to at least one user via a web page.

In a further aspect, the meter log data includes waveform data, the waveform data including at least one of Trigger Cause, Trigger Time, Recording Start Time, Time per sample, Total duration, Samples per cycle, List of samples per channel and/or List of RMS values for the cycle at the time of the trigger, and the at least one server is further configured send a single waveform recording to the at least one client device in response to a query.

According to another aspect of the present disclosure, a cloud-based meter management system includes at least one web service enabled meter that pushes meter log data to at least one server via a predetermined format; at least one meter manager module that collects meter log data from at least one non-web service meter and pushes the collected meter log data to the at least one server via the predetermined format; the at least one server receives and stores pushed meter log data from the at least one web service enabled meter and the collected meter log data from the at least one meter manager module; and at least one client device that accesses the at least one server to view the meter log data.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Figure 1:
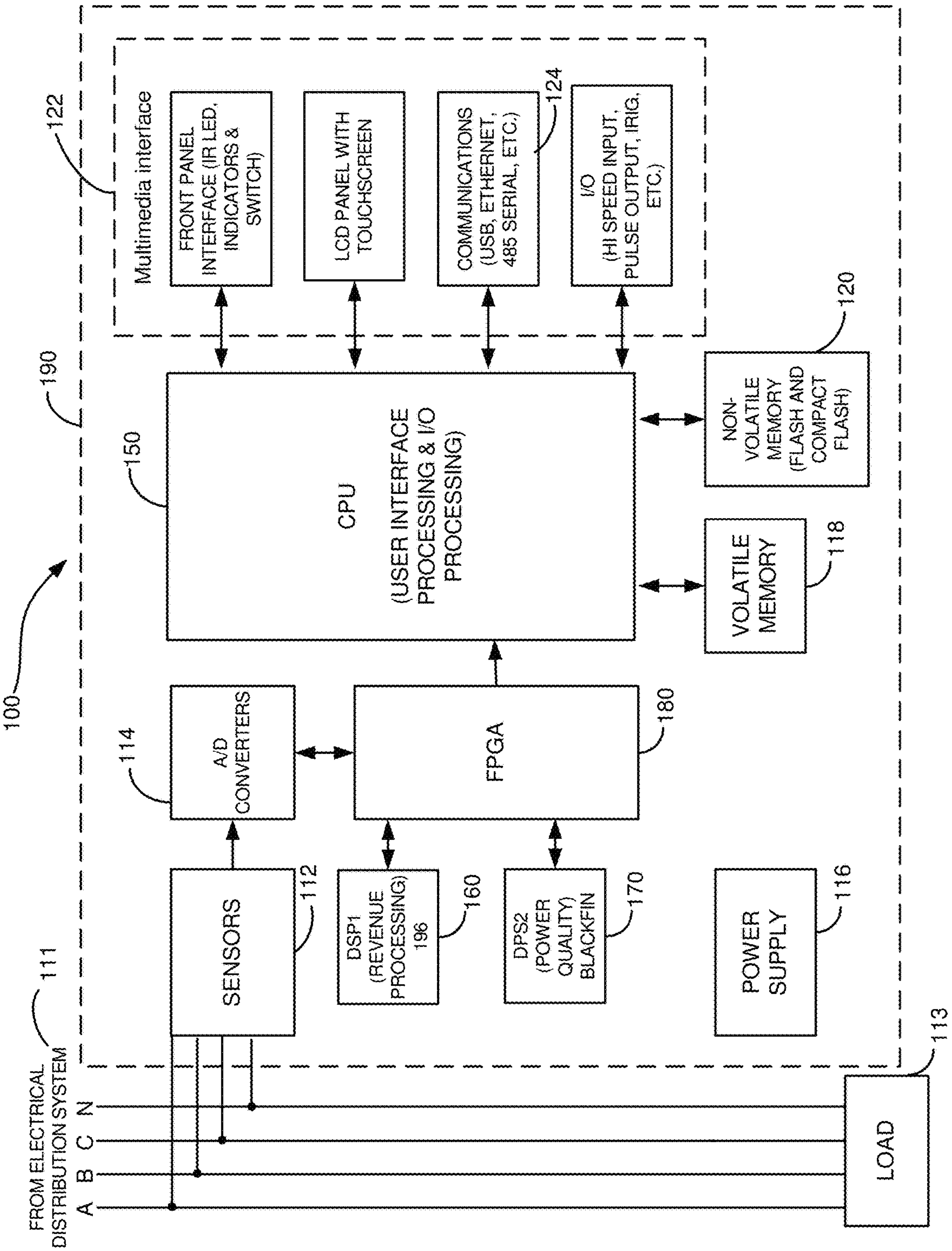
FIG. 1 is a block diagram of an intelligent electronic device (IED), according to an embodiment of the present disclosure.

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links. Additionally, it is to be appreciated that in the drawings any line connecting components, devices, method steps, blocks, etc. that is illustrated as a single headed arrow, i.e., to indicate one way direction, may be interchangeable and/or replaced with a double headed arrow, i.e., to indicate two-way direction.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

FIG. 1 is a block diagram of an intelligent electronic device (IED) 10 for monitoring and determining power usage and power quality for any metered point within a power distribution system and for providing a data transfer system for faster and more accurate processing of revenue and waveform analysis.

The IED 100 of FIG. 1 includes a plurality of sensors 112 coupled to various phases A, B, C and neutral N of an electrical distribution system 111, a plurality of analog-to-digital (A/D) converters 114, including inputs coupled to the sensor 112 outputs, a power supply 116, a volatile memory 118, an non-volatile memory 120, a multimedia user interface 122, and a processing system that includes at least one central processing unit (CPU) 150 (or host processor) and/or one or more digital signal processors, two of which are shown, i.e., DSP1 160 and DSP2 170. The IED 100 also includes a Field Programmable Gate Array 180 which performs a number of functions, including, but not limited to, acting as a communications gateway for routing data between the various processors 150, 160, 170, receiving data from the A/D converters 114 performing transient detection and capture and performing memory decoding for CPU 150 and the DSP processor 160. In one embodiment, the FPGA 80 is internally comprised of two dual port memories to facilitate the various functions. It is to be appreciated that the various components shown in FIG. 1 are contained within housing 190. Exemplary housings will be described below in relation to FIGS. 2A-2H.

The plurality of sensors 112 sense electrical parameters, e.g., voltage and current, on incoming lines (i.e., phase A, phase B, phase C, neutral N) of an electrical power distribution system 111 e.g., an electrical circuit, that are coupled to at least one load 113 that consumes the power provided. In one embodiment, the sensors 112 will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 114 configured to convert the analog output voltage from the transformer to a digital signal that can be processed by the CPU 150, DSP1 160, DSP2 170, FPGA 180 or any combination thereof.

A/D converters 114 are respectively configured to convert an analog voltage output to a digital signal that is transmitted to a gate array, such as Field Programmable Gate Array (FPGA) 180. The digital signal is then transmitted from the FPGA 180 to the CPU 150 and/or one or more DSP processors 160, 170 to be processed in a manner to be described below.

The CPU 150 or DSP Processors 160, 170 are configured to operatively receive digital signals from the A/D converters 114 (see FIG. 1) to perform calculations necessary to determine power usage and to control the overall operations of the IED 100. In some embodiments, CPU 150, DSP1 160 and DSP2 170 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 180. In some embodiments, the digital samples, which are output from the A/D converters 114 are sent directly to the CPU 150 or DSP processors 160, 170, effectively bypassing the FPGA 180 as a communications gateway.

The power supply 116 provides power to each component of the IED 100. In one embodiment, the power supply 116 is a transformer with its primary windings coupled to the incoming power distribution lines and having windings to provide a nominal voltage, e.g., 5 VDC, +12 VDC and −12 VDC, at its secondary windings. In other embodiments, power may be supplied from an independent power source to the power supply 116. For example, power may be supplied from a different electrical circuit or an uninterruptible power supply (UPS).

In one embodiment, the power supply 116 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor dividing power supplies are also contemplated.

The multimedia user interface 122 is shown coupled to the CPU 150 in FIG. 1 for interacting with a user and for communicating events, such as alarms and instructions to the user. The multimedia user interface 122 may include a display for providing visual indications to the user. The display may be embodied as a touch screen, a liquid crystal display (LCD), a plurality of LED number segments, individual light bulbs or any combination. The display may provide information to the user in the form of alpha-numeric lines, computer-generated graphics, videos, animations, etc. The multimedia user interface 122 further includes a speaker or audible output means for audibly producing instructions, alarms, data, etc. The speaker is coupled to the CPU 150 via a digital-to-analog converter (D/A) for converting digital audio files stored in a memory 118 or non-volatile memory 120 to analog signals playable by the speaker. An exemplary interface is disclosed and described in commonly owned U.S. Pat. No. 8,442,660, entitled "POWER METER HAVING AUDIBLE AND VISUAL INTERFACE", which claims priority to expired U.S. Provisional Patent Appl. No. 60/731,006, filed Oct. 28, 2005, the contents of which are hereby incorporated by reference in their entireties.

The IED 100 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .mlv, .mp2v .mpeg2), Microsoft Recorded TV Show files (.dvr-ms), Microsoft Windows Video files (.avi) and Microsoft Windows Audio files (.wav).

The IED 100 further comprises a volatile memory 118 and a non-volatile memory 120. In addition to storing audio and/or video files, volatile memory 118 will store the sensed and generated data for further processing and for retrieval when called upon to be displayed at the IED 100 or from a remote location. The volatile memory 118 includes internal storage memory, e.g., random access memory (RAM), and the non-volatile memory 120 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory will be used for storing historical trends, waveform captures, event logs including time-stamps and stored digital samples for later downloading to a client application, web-server or PC application.

In a further embodiment, the IED 100 will include a communication device 124, also know as a network interface, for enabling communications between the IED or meter, and a remote terminal unit, programmable logic controller and other computing devices, microprocessors, a desktop computer, laptop computer, other meter modules, etc. The communication device 124 may be a modem, network interface card (NIC), wireless transceiver, etc. The communication device 124 will perform its functionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection may operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 100 may communicate to a server or other computing device via the communication device 124. The IED 100 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. The server may further include a storage medium for storing a data received from at least one IED or meter and/or storing data to be retrieved by the IED or meter.

In an additional embodiment, the IED 100 may also have the capability of not only digitizing waveforms, but storing the waveform and transferring that data upstream to a central computer, e.g., a remote server, when an event occurs such as a voltage surge or sag or a current short circuit. This data may be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform will also allow the CPU 150 to compute other electrical parameters such as harmonics, magnitudes, symmetrical components and phasor analysis. Using the harmonics, the IED 100 will also calculate dangerous heating conditions and can provide harmonic transformer derating based on harmonics found in the current waveform.

In a further embodiment, the IED 100 will execute an e-mail client and will send e-mails to the utility or to the customer direct on an occasion that a power quality event occurs. This allows utility companies to dispatch crews to repair the condition. The data generated by the meters are used to diagnose the cause of the condition. The data is transferred through the infrastructure created by the electrical power distribution system. The email client will utilize a POP3 or other standard mail protocol. A user will program the outgoing mail server and email address into the meter. An exemplary embodiment of said metering is described in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 100 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 2A:
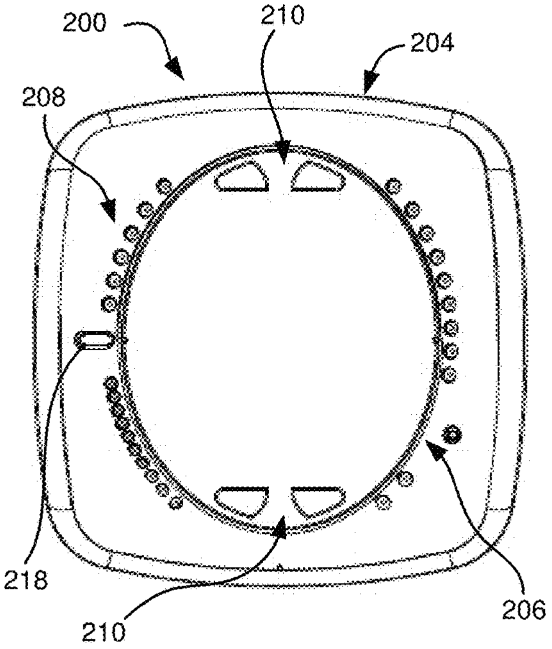
FIGS. 2A-2H illustrate exemplary form factors for an intelligent electronic device (IED) in accordance with an embodiment of the present disclosure.
Figure 2B:
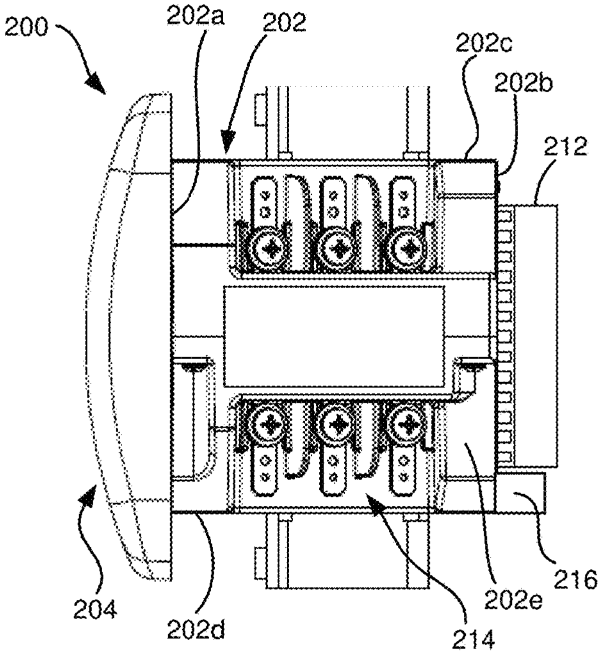

Furthermore, it is to be appreciated that the components and devices of the IED 10 of FIG. 1 may be disposed in various housings depending on the application or environment. For example, the IED 100 may be configured as a panel meter 200 as shown in FIG. 2A an 2B. The panel meter 200 of FIGS. 2A and 2B is described in more detail in commonly owned U.S. Pat. No. 7,271,996, the contents of which are hereby incorporated by reference. As seen in FIGS. 2A and 2B, the IED 200 includes a housing 202 defining a front surface 202*a*, a rear surface 202*b*, a top surface 202*c*, a bottom surface 202*d*, a right side surface 202*e*, and a left side surface (not shown). Electrical device 200 includes a face plate 204 operatively connected to front surface 202*a* of housing 202. Face plate 204 includes displays 206, indicators 208 (e.g., LEDs and the like), buttons 210, and the like providing a user with an interface for visualization and operation of electrical device 200. For example, as seen in FIG. 2A, face plate 204 of electrical device 200 includes analog and/or digital displays 206 capable of producing alphanumeric characters. Face plate 204 includes a plurality of indicators 208 which, when illuminated, indicate to the user the "type of reading", the "% of load bar", the "parameter designation" which indicates the reading which is being displayed on displays 206, a "scale selector" (e.g., Kilo or Mega multiplier of Displayed Readings), etc. Face plate 204 includes a plurality of buttons 210 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 202 includes voltage connections or inputs 212 provided on rear surface 202*b* thereof, and current inputs 214 provided along right side surface 202*e* thereof. The IED 200 may include a first interface or communication port 216 for connection to a master and/or slave device. Desirably, first communication port 216 is situated in rear surface 202*b* of housing 202. IED 200 may also include a second interface or communication port 218 situated on face plate 204.

Figure 2C:
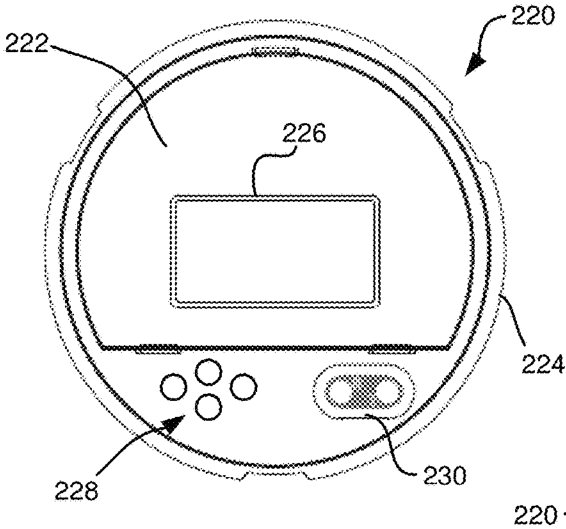
Figure 2D:
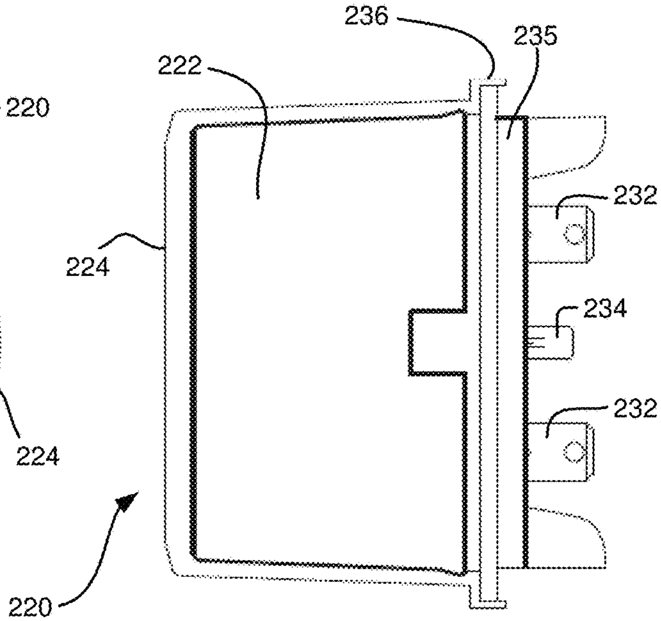

In other embodiment, the IED 100 may be configured as a socket meter 220, also known as a S-base type meter or type S meter, as shown in FIG. 2C an 2D. An exemplary socket meter is described in more detail in commonly owned U.S. Pat. No. 8,717,007, the contents of which are hereby incorporated by reference. Referring to FIGS. 2C and 2D, the meter 220 includes a main housing 222 surrounded by a cover 224. The cover 224 is preferably made of a clear material to expose a display 226 disposed on the main body 222. An interface 228 to access the display and a communication port 230 is also provided and accessible through the cover 224. The meter 220 further includes a plurality of current terminals 232 and voltage terminals 234 disposed on backside of the meter extending through a base 235. The terminals 232, 234 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 236 is used as a seal between the meter 220 and/or cover 224 and the meter socket to prevent removal of the meter and to indicate tampering with the meter.

Figure 2E:
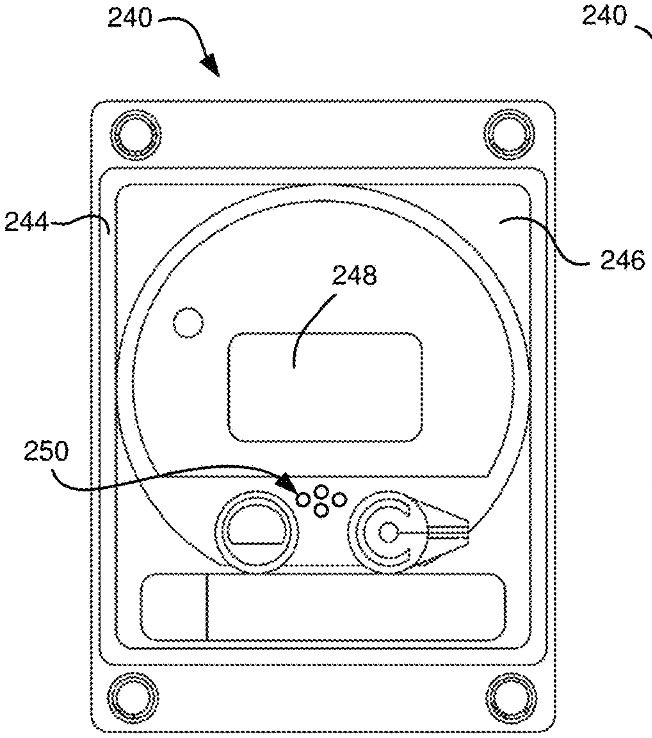
Figure 2F:
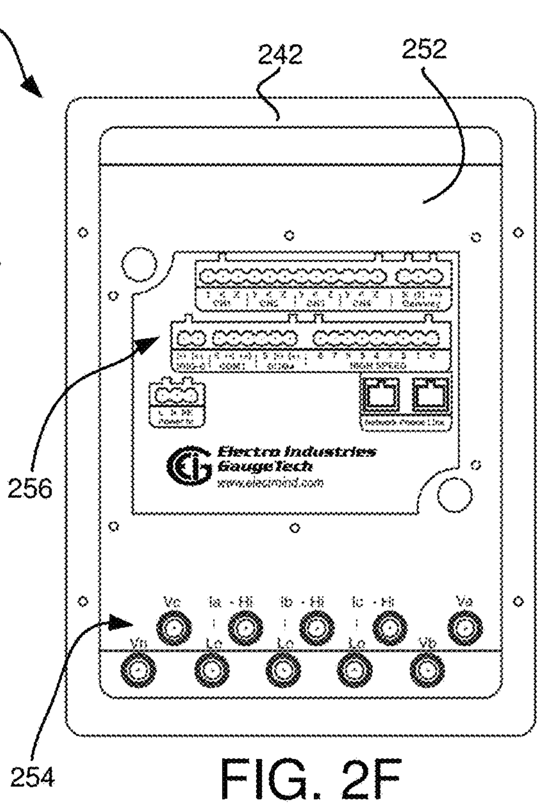

In a further embodiment, the IED 100 of FIG. 1 may be disposed in a switchboard or draw-out type housing 240 as shown in FIGS. 2E and 2F, where FIG. 2E is a front view and FIG. 2F is a rear view. The switchboard enclosure 242 usually features a cover 244 with a transparent face 246 to allow the meter display 248 to be read and the user interface 250 to be interacted with by the user. The cover 244 also has a sealing mechanism (not shown) to prevent unauthorized access to the meter. A rear surface 252 of the switchboard enclosure 242 provides connections for voltage and current inputs 254 and for various communication interfaces 256. Although not shown, the meter disposed in the switchboard enclosure 242 may be mounted on a draw-out chassis which is removable from the switchboard enclosure 242. The draw-out chassis interconnects the meter electronics with the electrical circuit. The draw-out chassis contains electrical connections which mate with matching connectors 254, 256 disposed on the rear surface 252 of the enclosure 242 when the chassis is slid into place.

Figure 2G:
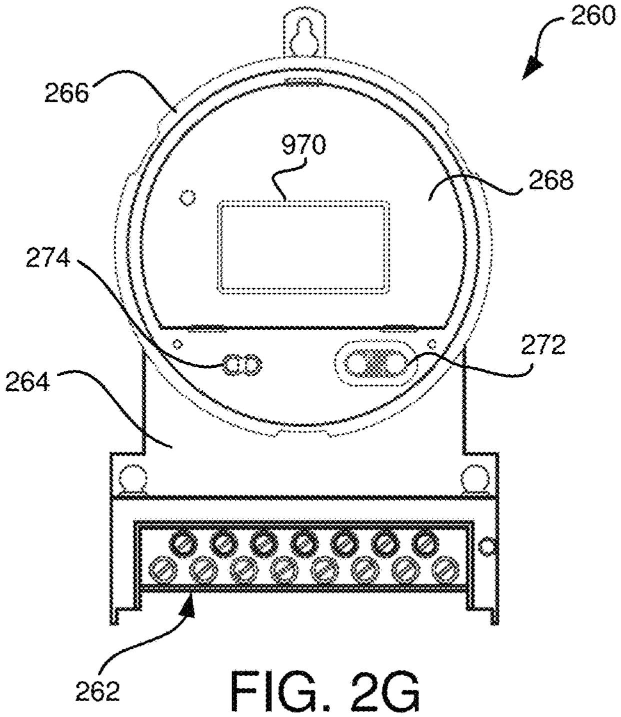
Figure 2H:
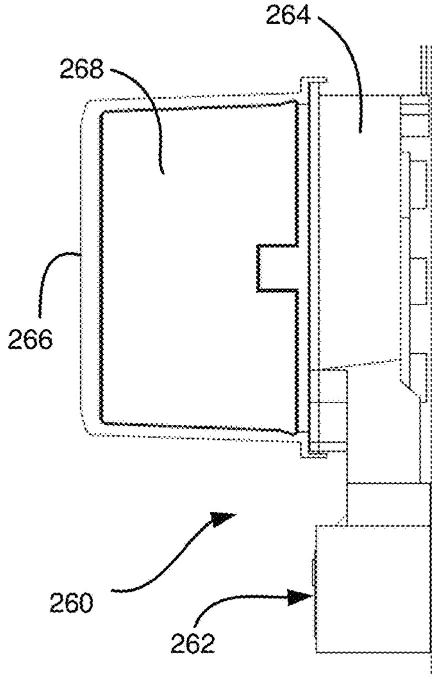

In yet another embodiment, the IED 100 of FIG. 1 may be disposed in an A-base or type A housing as shown in FIGS. 2G and 2H. A-base meters 260 feature bottom connected terminals 262 on the bottom side of the meter housing 264. These terminals 262 are typically screw terminals for receiving the conductors of the electric circuit (not shown). A-base meters 260 further include a meter cover 266, meter body 268, a display 270 and input/output means 272. Further, the meter cover 266 includes an input/output interface 274. The cover 266 encloses the meter electronics 268 and the display 270. The cover 266 has a sealing mechanism (not shown) which prevents unauthorized tampering with the meter electronics.

It is to be appreciated that other housings and mounting schemes, e.g., circuit breaker mounted, are contemplated to be within the scope of the present disclosure.

Figure 3:
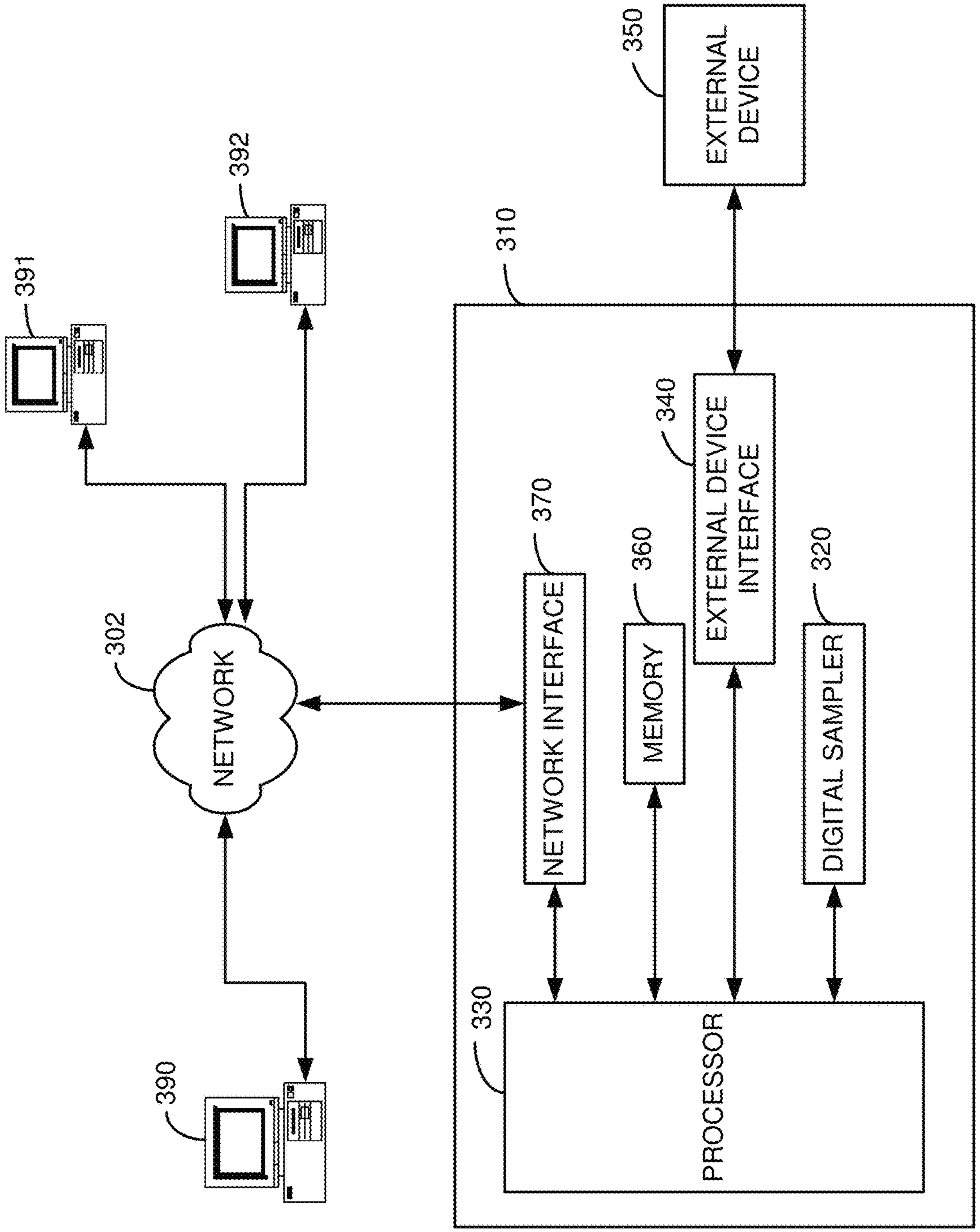
FIG. 3 illustrates an environment in which the present disclosure may be utilized.

FIG. 3 illustrates an exemplary environment 300 in which the present disclosure may be practiced. The environment 300 includes at least one IED 310 and at least one computing device 390, 391, 392. The network 302 may be the Internet, a public or private intranet, an extranet, wide area network (WAN), local area network (LAN) or any other network configuration to enable transfer of data and commands. An example network configuration uses the Transport Control Protocol/Internet Protocol ("TCP/IP") network protocol suite, however, other Internet Protocol based networks are contemplated by the present disclosure. Communications may also include IP tunneling protocols such as those that allow virtual private networks coupling multiple intranets or extranets together via the Internet. The network 302 may support existing or envisioned application protocols, such as, for example, telnet, POP3, Mime, HTTP, HTTPS, PPP, TCP/IP, SMTP, proprietary protocols, or any other network protocols. During operation, the IED 310 may communicate using the network 302 as will be hereinafter discussed.

It is to be appreciated that are at least two basic types of networks, based on the communication patterns between the machines: client/server networks and peer-to-peer networks. On a client/server network, every computer, device or IED has a distinct role: that of either a client or a server. A server is designed to share its resources among the client computers on the network. A dedicated server computer often has faster processors, more memory, and more storage space than a client because it might have to service dozens or even hundreds of users at the same time. High-performance servers typically use from two to eight processors (and that's not counting multi-core CPUs), have many gigabytes of memory installed, and have one or more server-optimized network interface cards (NICs), RAID (Redundant Array of Independent Drives) storage consisting of multiple drives, and redundant power supplies. Servers often run a special network OS—such as Windows Server, Linux, or UNIX—that is designed solely to facilitate the sharing of its resources. These resources can reside on a single server or on a group of servers. When more than one server is used, each server can "specialize" in a particular task (file server, print server, fax server, email server, and so on) or provide redundancy (duplicate servers) in case of server failure. For demanding computing tasks, several servers can act as a single unit through the use of parallel processing. A client device typically communicates only with servers, not with other clients. A client system may be a standard PC that is running an OS such as Windows, Linux, etc. Current OSes contain client software that enables the client computers to access the resources that servers share. Older OSes, such as Windows 3.x and DOS, required add-on network client software to join a network. By contrast, on a peer-to-peer network, every computer or device is equal and can communicate with any other computer or device on the network to which it has been granted access rights. Essentially, every computer or device on a peer-to-peer network can function as both a server and a client; any computer or device on a peer-to-peer network is considered a server if it shares a printer, a folder, a drive, or some other resource with the rest of the network. Note that the actual networking hardware (interface cards, cables, and so on) is the same in client/server versus peer-to-peer networks, it is only the logical organization, management and control of the network that varies.

A client may comprise any computing device, such as a server 390, mainframe, workstation, personal computer 391, 392, hand held computer, laptop telephony device, network appliance, an IED 310, Programmable Logic Controller, Power Meter, Protective Relay etc. The client may include system memory, which may be implemented in volatile and/or non-volatile devices, and one or more client applications which may execute in the system memory. Such client applications may include, for example, FTP client applications. File Transfer Protocol (FTP) is an application for transfer of files between computers attached to Transmission Control Protocol/Internet Protocol (TCP/IP) networks, including the Internet. FTP is a "client/server" application, such that a user runs a program on one computer system, the "client", which communicates with a program running on another computer system, the "server". In one embodiment, IED 310 includes at least an FTP server.

While FTP file transfer comprises one embodiment for encapsulating files to improve a data transfer rate from an IED to external clients, the present disclosure contemplates the use of other file transfer protocols, such as the Ethernet protocol such as HTTP or TCP/IP for example. Of course, other Ethernet protocols are contemplated for use by the present disclosure. For example, for the purpose of security and firewall access, it may be preferable to utilize HTTP file encapsulation as opposed to sending the data via FTP. In other embodiments, data can be attached as an email and sent via SMTP, for example. Such a system is described in a co-owned U.S. Pat. No. 6,751,563, titled "Electronic Energy meter", the contents of which are incorporated herein by reference. In the U.S. Pat. No. 6,751,563, at least one processor of the IED or meter is configured to collect the at least one parameter and generate data from the sampled at least one parameter, wherein the at least one processor is configured to act as a server for the IED or meter and is further configured for presenting the collected and generated data in the form of web pages, as will be described in relation to FIG. 3.

IED 310 includes a digital sampler 320 for digitally sampling the voltage and current of the power being supplied to a customer or monitored at the point of the series connection in the power grid. Digital sampler 320 digitally samples the voltage and current and performs substantially similar to the A/D converters 114 described above in relation to FIG. 1. The digital samples are then forwarded to processor 330 for processing. It is to be appreciated that the processor may be a single processing unit or a processing assembly including at least one CPU 150, DSP1 160, DSP2 170 and FPGA 180, or any combination thereof. Also connected to processor 330 is external device interface 340 for providing an interface for external devices 350 to connect to meter 310. These external devices might include other power meters, sub-station control circuitry, on/off switches, etc. Processor 330 receives data packets from digital sampler 320 and external devices 350, and processes the data packets according to user defined or predefined requirements. A memory 360 is connected to processor 330 for storing data packets and program algorithms, and to assist in processing functions of processor 330. These processing functions include the power quality data and revenue calculations, as well as formatting data into different protocols which will be described later in detail. Processor 330 provides processed data to network 302 through network interface 370, similar to the communication device 124 described above in relation to FIG. 1 In one embodiment, the network interface converts the data to an Ethernet TCP/IP format. The use of the Ethernet TCP/IP format allows multiple users to access the power meter simultaneously. In a like fashion, network interface 370 might be comprised of a modem, cable connection, or other devices that provide formatting functions.

A web server program (web server) is contained in memory 360, and accessed through network interface 370. The web server provides real time data through any known web server interface format. For example, popular web server interface formats consist of HTML and XML formats. The actual format of the programming language used is not essential to the present disclosure, in that any web server format can be incorporated herein. The web server provides a user friendly interface for the user to interact with the meter 310. The user can have various access levels to enter limits for e-mail alarms. Additionally, the user can be provided the data in a multiple of formats including raw data, bar graph, charts, etc. The currently used HTML or XML programming languages provide for easy programming and user-friendly user interfaces.

The processor 330 formats the processed data into various network protocols and formats. The protocols and formats can, for example, consist of the web server HTML or XML formats, Modbus TCP, RS-485, FTP or e-mail. Dynamic Host Configuration Protocol (DHCP) can also be used to assign IP addresses. The network formatted data is now available to users at computers 390-392 through network 302, that connects to meter 310 at the network interface 370. In one embodiment, network interface 370 is an Ethernet interface that supports, for example, 100 base-T or 10 base-T communications. This type of network interface can send and receive data packets between WAN connections and/or LAN connections and the meter 310. This type of network interface allows for situations, for example, where the web server may be accessed by one user while another user is communicating via the Modbus TCP, and a third user may be downloading a stored data file via FTP. The ability to provide access to the meter by multiple users, simultaneously, is a great advantage over the prior art. This can allow for a utility company's customer service personnel, a customer and maintenance personnel to simultaneously and interactively monitor and diagnose possible problems with the power service.

Figure 4:
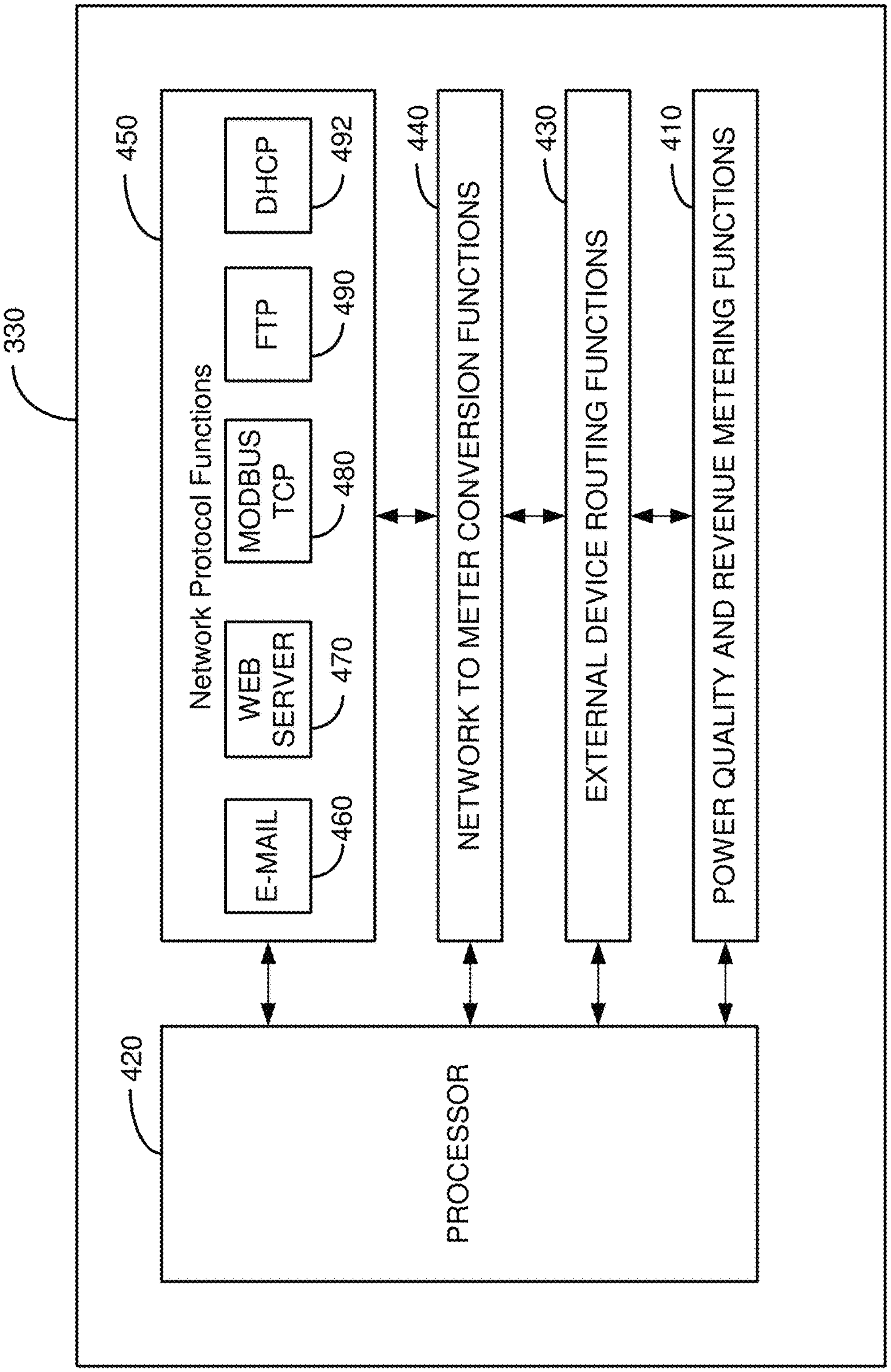
FIG. 4 is a functional block diagram of a processor of an intelligent electronic device according to the embodiment of the present disclosure.

FIG. 4 is a functional block diagram of processor 330 according to the embodiment of the present disclosure. Processor 330 is shown containing at least four main processing functions. The functions shown are illustrative and not meant to be inclusive of all possible functions performed by processor 330. Power Quality and Revenue Metering functions (metering functions) 410 consists of a complete set of functions which are needed for power quality and revenue metering. Packet data collected by digital sampler 320 is transmitted to processor 330. Processor 330 calculates, for example, power reactive power, apparent power, and power factor. The metering function 410 responds to commands via the network or other interfaces supported by the meter. External Device Routing Functions 430 handle the interfacing between the external device 350 and meter 310. Raw data from external device 350 is fed into meter 310. The external device 350 is assigned a particular address. If more than one external device is connected to meter 310, each device will be assigned a unique particular address. The Network Protocol Functions 450 of meter 310 are executed by processor 330 which executes multiple networking tasks that are running concurrently. As shown in FIG. 4, these include, but are not limited to, the following network tasks included in network protocol functions 450: e-mail 460, web server 470, Modbus TCP 480, FTP 490, and DHCP 492. The e-mail 460 network protocol function can be utilized to send e-mail messages via the network 302 to a user to, for example, notify the user of an emergency situation or if the power consumption reaches a user-set or pre-set high level threshold. As the processor receives packets of data it identifies the network processing necessary for the packet by the port number associated with the packet. The processor allocates the packet to a task as a function of the port number. Since each task is running independently the meter 310 can accept different types of requests concurrently and process them transparently from each other. For example, the web server may be accessed by one user while another user is communicating via Modbus TCP and at the same time a third user may download a log file via FTP. The Network to Meter Protocol Conversion Function 440 is used to format and protocol convert the different network protocol messages to a common format understood by the other functional sections of meter 310. After the basic network processing of the packet of data, any "commands" or data which are to be passed to other functional sections of meter 310 are formatted and protocol converted to a common format for processing by the Network to Meter Protocol Conversion Function 440. Similarly, commands or data coming from the meter for transfer over the network are pre-processed by this function into the proper format before being sent to the appropriate network task for transmission over the network. In addition, this function first protocol converts and then routes data and commands between the meter and external devices.

Although the above described embodiments enable users outside of the network the IED or meter is residing on to access the internal memory or server of the IED or meter, IT departments commonly block this access through a firewall to avoid access by dangerous threats into corporate networks. A firewall is a system designed to prevent unauthorized access to or from a private network, e.g., an internal network of a building, a corporate network, etc. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. A firewall may employ one or more of the following techniques to control the flow of traffic in and of the network it is protecting: 1) packet filtering: looks at each packet entering or leaving the network and accepts or rejects it based on user-defined rules; 2) Application gateway: applies security mechanisms to specific applications, such as FTP and Telnet servers; 3) Circuit-level gateway: applies security mechanisms when a TCP or UDP connection is established, once the connection has been made, packets can flow between the hosts without further checking; 4) Proxy server: intercepts all messages entering and leaving the network, effectively hides the true network addresses; and 5) Stateful inspection: doesn't examine the contents of each packet but instead compares certain key parts of the packet to a database of trusted information, if the comparison yields a reasonable match, the information is allowed through, otherwise it is discarded. Other techniques and to be developed techniques are contemplated to be within the scope of the present disclosure.

In one embodiment, the present disclosure provides for overcoming the problem of not being allowed firewall access to an IED or meter installed within a facility, i.e., the meter is residing on a private network, by enabling an IED to initiate one way communication through the firewall. In this embodiment, the IED or meter posts the monitored and generated data on an Internet site external to the corporate or private network, i.e., on the other side of a firewall. The benefit is that any user would be able to view the data on any computer or web enabled smart device without having to pierce or bypass the firewall. Additionally, there is a business opportunity to host this data on a web server and charge a user a monthly fee for hosting the data. The features of this embodiment can be incorporated into any telemetry application including vending, energy metering, telephone systems, medical devices and any application that requires remotely collecting data and posting it on to a public Internet web site.

Figure 5:
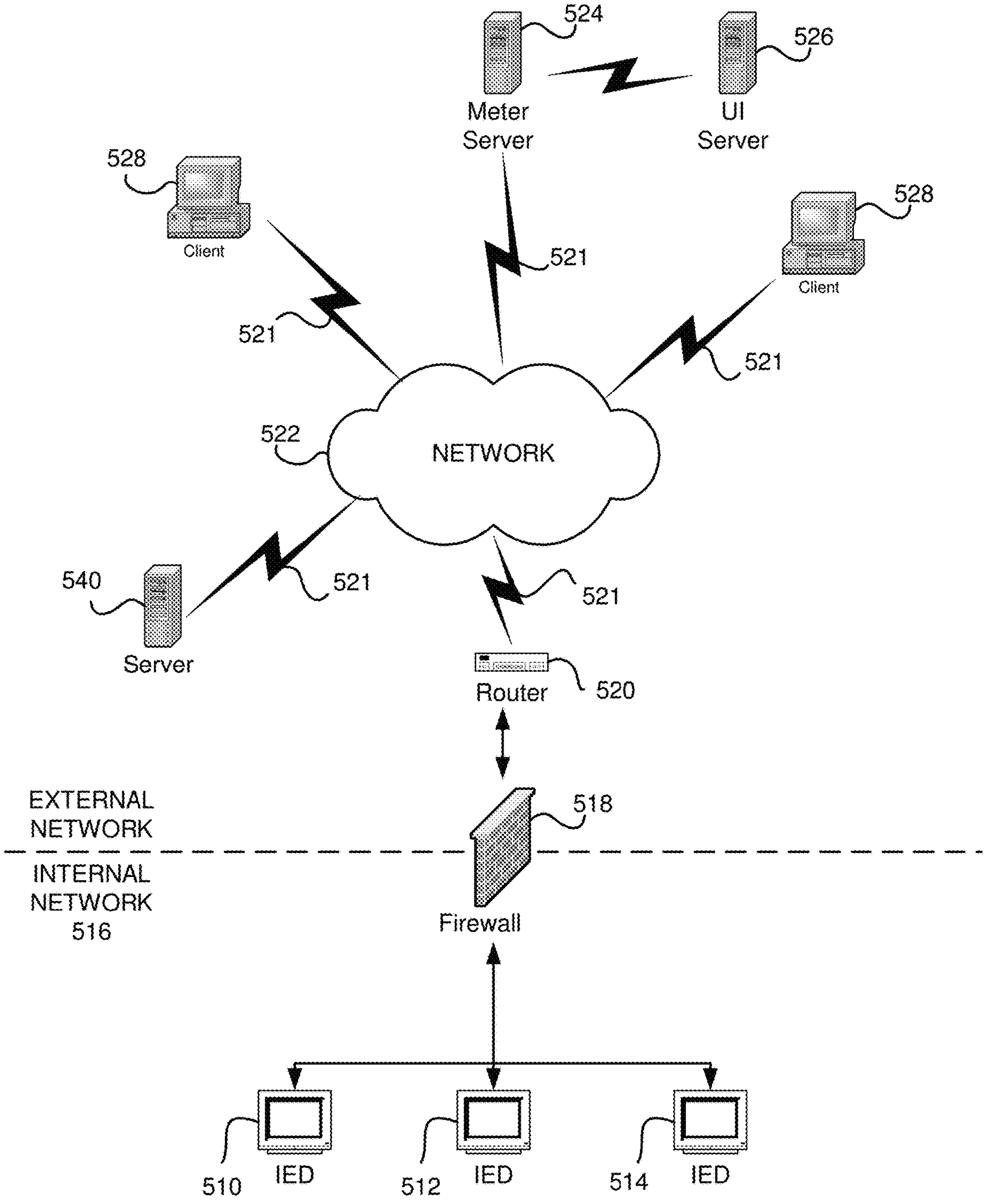
FIG. 5 illustrates another environment in which the present disclosure may be utilized.

In one embodiment, the IED or metering device will communicate through the firewall using a protocol such as HTTP via a port that is open through the firewall. Referring to FIG. 5, IEDs or meters 510, 512, 514 reside on an internal network 516, e.g., an intranet, private network, corporate network, etc. The internal network 516 is coupled to an external network 522, e.g., the Internet, via a router 520 or similar device over any known hardwire or wireless connection 521. A firewall 518 is disposed between the internal network 516 and external network 522 to prevent unauthorized access from outside the internal network 516 to the IEDs or meters 510, 512, 514. Although the firewall 518 is shown between the internal network 516 and the router 520 it is to be appreciated that other configurations are possible, for example, the firewall 518 being disposed between the router 520 and external network 522. In other embodiments, the firewall 518 and router 520 may be configured as a single device. It is further to be appreciated that firewall 518 can be implemented in both hardware and software, or a combination of both.

The communication device or network interface of the meter (as described above in relation to FIGS. 1 and 4) may communicate through the firewall 518 and read a web site server 524. It is to be appreciated that the one way communication from the IED through the firewall may be enabled by various techniques, for example, by enabling outbound traffic to the IP address or domain name of the server 524 or by using a protocol that has been configured, via the firewall settings, to pass through the firewall such as HTTP (Hyper Text Transfer Protocol), IP (Internet Protocol), TCP (Transmission Control Protocol), FTP (File Transfer Protocol), UDP (User Datagram Protocol), ICMP (Internet Control Message Protocol), SMTP (Simple Mail Transport Protocol), SNMP (Simple Network Management Protocol), Telnet, etc. Alternatively, the IED may have exclusive access to a particular port on the firewall, which is unknown to other users on either the internal or external network. Other methods or techniques are contemplated, for example, e-mail, HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc.

The server 524 will provide instructions in computer and/or human readable format to the IED or meter. For instance, the web server 524 might have XML tags that state in computer readable format to provide data for the last hour on energy consumption by 15 minute intervals. The meter 510, 512, 514 will then read those instructions on that web server 524 and then post that data up on the server 524. In this manner, the IED or meter initiates communication in one direction, e.g., an outbound direction, to the server 524.

Another server (or can be in one server) will read the data that the meter 510, 512, 514 posts and will format the meter data into data that can be viewed for humans on a web site or a software application, i.e., UI Server 526. Servers 524, 526 can also store the data in a database or perform or execute various control commands on the data. Clients 528 may access the IED data stored or posted on servers 524, 526 via a connection to the network 522.

Since the meters are only communicating in an outbound direction only, the meters 510, 512, 514 can read data or instructions from an external network application (e.g., server 524), the external network application cannot request information directly from the meter. The server 524 posts the data or instructions on the web site and waits for the meter to check the site to see if there has been a new post, i.e., new instructions for the meter. The meter can be programmed at the user's discretion as to frequency for which the meter 510, 512, 514 exits out to the external network to view the postings.

The meter instruction server 524 will post instructions in a directory programmed/located on the server or into XML or in any fashion that the meter is configured to understand and then the meter will post whatever data it is instructed to do. The meter can also be configured to accomplish control commands. In addition to the meter instruction server 524, a user interface (UI) server 526 is provided that can be used to enable a user interface to the user. The user can provide input on the UI server 526 that might trigger the meter instruction server 524 to produce a message to control the energy next time the meter reads that server.

In another embodiment, the IED or metering device will communicate through the firewall using a server (not shown) disposed on an internal network protected by a firewall. In this embodiment, the server aggregates data from the various IEDs 510, 512, 514 coupled to the internal or private network 516. Since the server and the IEDs 510, 512, 514 are all on the same side of the firewall 518, generally communications and data transfers among the server and the IEDs 510, 512, 514 is unrestricted. The server then communicates or transfers the data from the IEDs to server 524 on the external network on the other side of the firewall 518. The communication between server on the internal network and server 524 may be accomplished by any one of the communication means or protocols described in the present disclosure. The server 524 then posts the data from the IEDs 510, 512, 514 making the data accessible to clients 528 on external networks, as described above.

In a further embodiment, the server disposed on the internal network communicates or transfers the data from the IEDs to clients 528 on the external network on the other side of the firewall 518, without the need to transfer or pass data to a server on the external network.

In another embodiment, each IED 510, 512, 514 may be configured to act as a server to perform the functionality described above obviating the need for a separate server.

Furthermore, in another embodiment, each IED 510, 512, 514 and each client device 528 may be configured as a server to create a peer-to-peer network, token ring or a combination of any such topology.

The systems and methods of the present disclosure may utilize one or more protocols and/or communication techniques including, but not limited to, e-mail, File Transfer Protocol (FTP), HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc. Common chat protocols, such as MSN, AIM, IRQ, IRC, and Skype, could be used to send a message, containing the meter's data, to a public chat server which could then route that message to any desired client. A public social server that supports a common web interface for posting information, such as Twitter™, Facebook™, BBS's, could be used to post a status, containing the meter's data, to a user on the public social server for that service, e.g., server 440, 540, 640. This post could then be viewed by the clients to see the meter's data, or read by another server for further parsing and presentation. Hosted data services, such as a hosted database, cloud data storage, Drop-Box, or web service hosting, could be used as an external server to store the meter's data, called Hosting. Each of these Hosts, e.g., server 540, could then be accessed by the clients to query the Hosted Data.

In another embodiment, the IEDs can communicate to devices using Generic Object Oriented Substation Event (GOOSE) messages, as defined by the IEC-61850 standard, the content of which are herein incorporated by reference. A GOOSE message is a user-defined set of data that is "published" on detection of a change in any of the contained data items sensed or calculated by the IED. Any IED or device on the LAN or network that is interested in the published data can "subscribe" to the publisher's GOOSE message and subsequently use any of the data items in the message as desired. As such, GOOSE is known as a Publish-Subscribe message. With binary values, change detect is a False-to-True or True-to-False transition. With analog measurements, IEC61850 defines a "deadband" whereby if the analog value changes greater than the deadband value, a GOOSE message with the changed analog value is sent. In situation where changes of state are infrequent, a "keep alive" message is periodically sent by the publisher to detect a potential failure. In the keepalive message, there is a data item that indicates "The NEXT GOOSE will be sent in XX Seconds" (where XX is a userdefinable time). If the subscriber fails to receive a message in the specified time frame, it can set an alarm to indicate either a failure of the publisher or the communication network.

The GOOSE message obtains high-performance by creating a mapping of the transmitted information directly onto an Ethernet data frame. There is no Internet Protocol (IP) address and no Transmission Control Protocol (TCP). For delivery of the GOOSE message, an Ethernet address known as a Multicast address is used. A Multicast address is normally delivered to all devices on a Local Area Network (LAN). Many times, the message is only meant for a few devices and doesn't need to be delivered to all devices on the LAN. To minimize Ethernet traffic, the concept of a "Virtual" LAN or VLAN is employed. To meet the reliability criteria of the IEC-61850, the GOOSE protocol automatically repeats messages several times without being asked. As such, if the first GOOSE message gets lost (corrupted), there is a very high probability that the next message or the next or the next will be properly received.

The above-described devices, systems and methods enable a cloud-based meter management system, which will be described in greater detail below.

Figure 6:
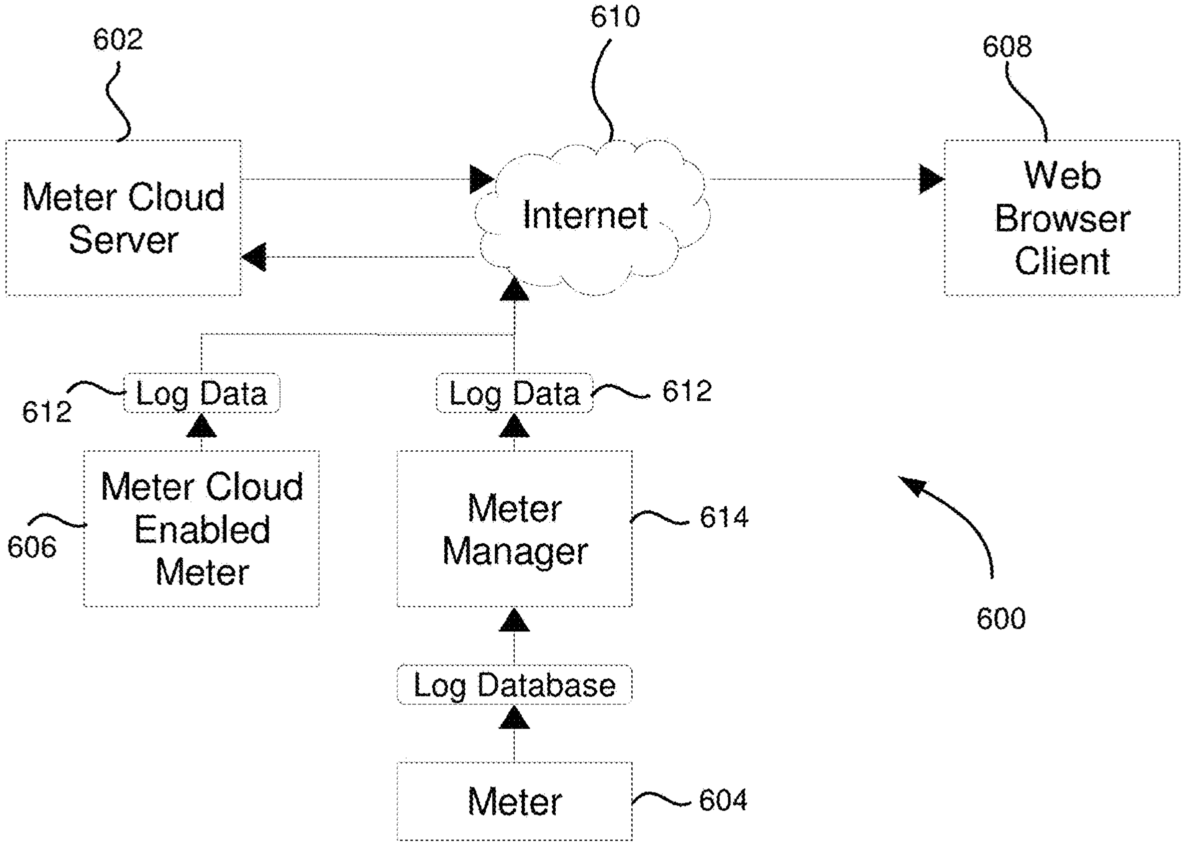
FIG. 6 illustrates a cloud-based meter management system in accordance with the present disclosure.

Referring to FIG. 6. the system 600 of the present disclosure includes a meter cloud server 602, a plurality of IEDs or meters 604 and 606, and one or more clients 608 (e.g., a web browser client), which are coupled together via a network 610 (e.g., via various wireless and/or hardwired communication networks). The various components and modules of the system of the present disclosure provide a plurality of functions to enable one or more users to manage a plurality of IEDs or meters via at least one client device 608.

The meter cloud system 600, at its most basic, stores meter log data 612 in the cloud, i.e., a meter cloud server 602, so that it is accessible by a web client 608. To achieve this, meter log data 612 is uploaded to the meter cloud server 602 directly by a Meter Cloud Enabled Meter 606, or by a Meter Manager module or software 614 executing on a processor of a computing device (e.g., a server, as will be described below) using log data retrieved from a meter 604. The Meter Cloud Server 602 then stores that data and provides the data to a user with a web browser client 608 when requested.

The techniques of the present disclosure enable the following features: upload meter log data 612 to the Meter Cloud Server 602 using a JSON log data format (or any other suitable format); preform Registration and Unregistration of meters 604, 606, associating meters 604, 606 with the correct customer in the process, simplifying the registration process for the user; provide list to easily identify which meters 604, 606 have been registered to the cloud server 602; and provides direct links to a selected meter in the web browser client 608.

The meter cloud system 600 links meters such as meters 604, 606, log data 612, meter manager module 614, and cloud server 602 into one cohesive mesh, allowing varying levels of data to be accessible from any client 608 coupled to network 610. In one embodiment, a common WebAPI protocol links each of the components, allowing simple interchange of data. In other embodiments, the components are linked using multiple protocols.

Components of the meter cloud system 600 will now be described in more detail below.

Meter Cloud Server 602: The meter cloud server 602 provides storage and retrieval for the Meter Log Data 612, management of Users and Customers, as well as additional meta actions, such as, but not limited to, the generation of reports on the data received from meters 604, 606 (including log data 612). The Meter Cloud Server 602 of the present disclosure provides the following features: provides a Web Service for log data uploads, retrievals, security logins, and meter management; stores meter log data 612 for later retrieval by clients 608; provides user security, such that meters 604, 606 are associated with customers, and only users which have permission for that customer can view the data associated to meter or meters 604, 606; serves web resources that are displayed and can be viewed on web browser client 608; and Single Cloud software, running on the cloud server 602. Cloud server 602 collects meter information and a reduced subset of log data, stores them in a database or other storage medium, and provides a single website and web services that a web client, e.g., 608, can execute and use to query and display the meter data for their location. Meters 604, 606 are organized by customer and location, and log data is pushed up to the cloud server 602 (via web services) by the meter manager module 614 (which provides data from meters 604) and web service enabled meters 606.

Meter Manger Module 614: Meter Manager Module 614 plays two roles in the Meter Cloud system 600. First, it collects meter log data 612 from non-web service enabled meters 604, and pushes the compatible data up to the Cloud server 602. Secondly, it provides full access to the data of meters 604 via its own set of web services, using the same protocols as the Cloud server 602. The web services including registration, upload, and query. To enable this, the Meter Manager Module 614 employs a WebAPI RPC control structure, extended to provide a WebAPI Log Service to log data, as well as including cloud configuration and management tools.

Meter 604: For non-web service enabled meters 604, the meter manager module 614 will perform log collection and upload to the Cloud server 602.

Meter Cloud Enabled Meter 606: Certain meters of the present disclosure are configured to register and upload their own logs to the meter cloud server 602 using a JSON log data format, on an interval, i.e., are configured to push data up to the Cloud server 602 directly (e.g., using at least one processor and at least one communication module), using the same protocol as the meter manager module 614. The meters 606 may perform this automatically, following an initial commissioning phase, that enables the meter for integration with the cloud server 602.

Web Browser Client 608: A web browser client 608 executes and displays the main Meter Cloud User Interface (UI) for managing meters, users, and viewing meter data. The UI is presented as a web page, viewed through a web browser, such as Chrome, Firefox, Edge, Safari, iPhone, Android, etc., that is executed by a processor of the client 608. The web browser client 608 is configured to provide the following features via the execution and display of the Meter Cloud UI: responsive layout, allowing for both small layout browsers such as a phone, and large layout browsers; organizes meters 604, 606 by facility; provides a login page to prevent unauthorized access; provides a create new user option, where the user can create a new customer, or associate themselves with an existing one; provides user management interfaces for admin users, to assign access rights to individual users within a customer; and provides individual meter dashboards for viewing a meter's log data.

Protocol: In one embodiment, all interactions with the meter cloud server 602, including uploading data, configuring meters, and querying meter data, use a single Web API protocol, using JSON for its format. The present disclosure provides a common protocol between all components in the meter cloud system 600. The Web API uses a REST (representational state transfer) style interface, and a JSON body format and provides interfaces for: Uploading Data; Downloading Data; Querying Log Information; and Configuring Meters. In another embodiment, the interactions with meter cloud server 602 may use multiple different protocols specific to a given task or function performed between components of system 600.

Figure 7:
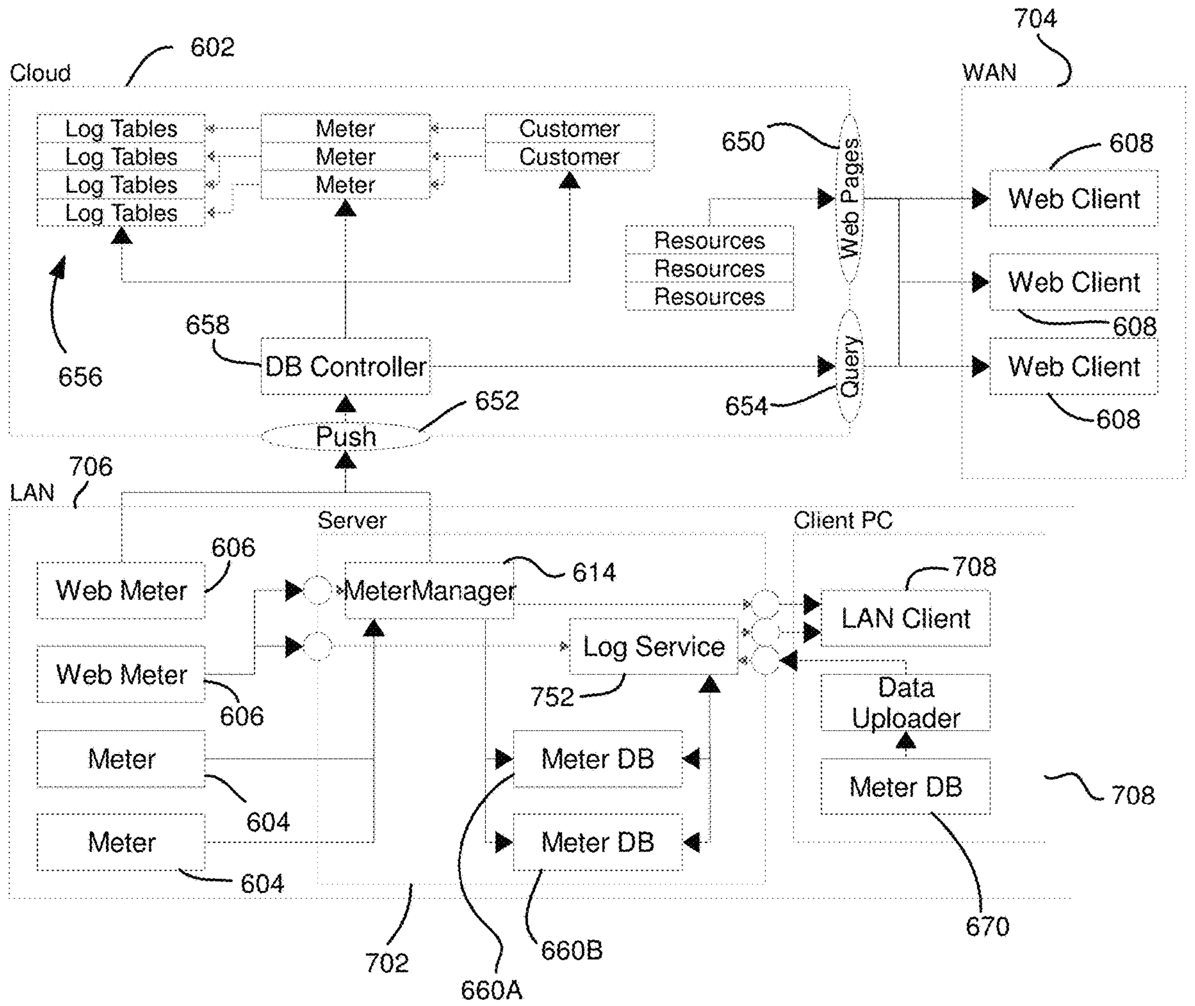
FIG. 7 illustrates components of the cloud-based meter management system shown in FIG. 6.

Referring to the FIG. 7, in one embodiment, the meter cloud system 600 includes at least the following components: a cloud server 602, a wide area network (WAN) 704 and a local area network (LAN) 706, which will be described in more detail below.

Cloud Server 602: Hosted on a cloud web service provider, the cloud server 602 provides access to meters 604, 606 and data for clients 608 outside of the private LAN 706 of a customer. A single server (or cluster) provides access to the data of multiple customers, using security and API keys to segregate the data of one customer from another. Usage of the cloud server 602 may be a billed service, including upload of data, management of meters 604, 606, and retrieval of meter data. The cloud server 602 includes three of the following components:

Web Server 650—Provides access to the web resources and UI, such as images and web pages, used by the WAN web clients 608. Uses the Web Services to provide dynamic data content to clients 608.

Web Services 652, 654—Provides data access and manipulation services for meters 604, 606, logs 612, security, users, and registration. Provides a common protocol that can be used by meters 606, the meter manager module 614, web clients 608, and third party applications to upload and retrieve log data 612.

Database 656—Stores meter, location, customer, user, and log configuration and data, to be used and manipulated by the Web Services.

Database Controller 658 is configured to enable access to database 656.

WAN 704: Web Clients 608 operating on the Internet 610 connect to the Cloud server 602 to configure and view meter data, using a customer's user information and API key.

LAN 706: Local Area Network

Figure 8:
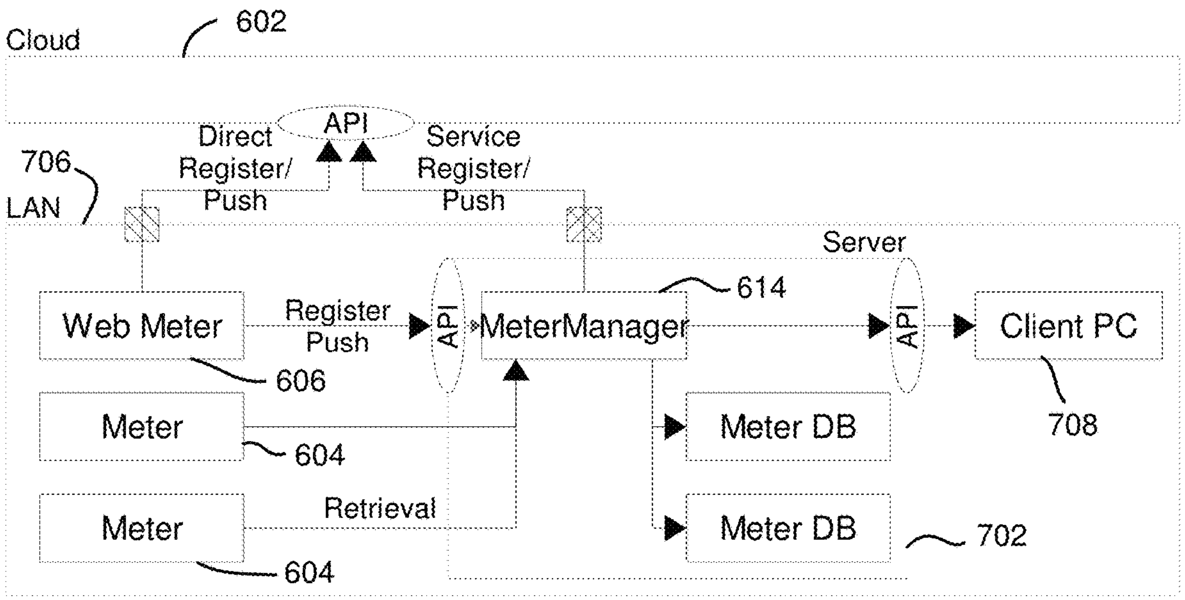
FIG. 8 illustrates components of the local area network (LAN) shown in FIG. 7.

Interior to a customer's private network, i.e., LAN 706, reside the meters 604, 606 and servers 702 which collect log data 612, and provide direct access to that data 612. The meter manager module 614 collects data from all the meters, stores full detail logs internally (e.g., in at least one memory), and uploads a reduced subset (e.g., having a predetermined and/or user-configured subset of the data stored on each meter 604, 606 that meter manager 614 determines (e.g., via user-configured preferences) is most important/useful for the user) to the cloud server 602 for consumption by Web Clients 608 on WAN 704. Additionally, it provides Web Service access to clients 708 interior to the LAN 706 using the same protocol as that used on Cloud server 602, allowing for richer clients with access to the full set of data. As shown in FIG. 8, the LAN 706 includes at least a server 702, meters 604, web meters 606 and client PCs 708.

Server 702: The Server 702 is the center of the LAN system, meter manager 614 runs on server 702 to provide all data collection, query, and push services. Meter data collected is stored locally to the server 702 in either old MS Access databases (or other legacy databases), or in a Massive Table format PostGreSQL databases (or other type of modern database format).

The Meter Manager Server 702 provides (in some embodiments) the same web services as the Cloud server 602, allowing web service enabled meters to register with, and upload data directly to Meter Manager server 602. Additionally, clients 608 can use the same query protocols to read meter data directly from the Cloud server 602 or from Meter Manager server 602.

Meters 604: Meter log data 614 is collected via log retrieval by Meter Manager server 702, and stored on the server to be used by LAN clients 708 and pushed up to the Cloud server 602.

Web Meters 606: For meters which are web service enabled, they can directly register and push data up to the Cloud server 602. However, if a firewall requires individual configuration to allow outbound web requests, the web meter 606 can be configured to register and push to the Meter Manager Server 702, which can then provide the upload service.

Client PC 708: Client PC's 708 on the LAN 706 can access meter log data and configuration through Meter Manager Web Services.

The Meter Cloud System of the present disclosure enables at least, but not limited to, the following features:

- Common WebAPI protocol for configuration, registration, data upload and query, and login.
- Customer API key will be used to provide restricted user API access.
- Cloud Service via cloud server 602, which provides access to a restricted log data set from the Internet.
- Upload Service provided by Meter Manager 614 to push log data 612 up to the Cloud Sever 602.
- Customer segregation in the Cloud Service, such that one customer cannot access the data of another.
- Security management and login in both the Cloud Service, and the Meter Manager Service provided by Meter Manager 614, allowing only verified users to access and configure the servers 602, 702.
- Web Service Enabled Meters 606 are configured to register and upload data directly to the cloud server 602.
- Meter Manager Server 702 (including meter manager 614) is configured to provide all the Web Service functionality of the cloud server 602, allowing clients to upload and query the same.
- Meter Manager Server 702 will provide storage and access to the full data in the stored meter log databases 660A, 660B that are accessible by meter manager 614 and server 702 (e.g., meter log databases stored in server 702). It is to be appreciated that log data in meter databases 670 stored in client device 708 may be synced to meter log databases 660, such that, meter manager 614 may upload log data received from meter database 670 to cloud 602.
- A Massive Table PostGreSQL database will be available in server 702 to store meter log data in one centralized location.
- Meter Manager Server 702 is configured to retrieve and store log data 612 for meters 604, 606 interior to the customers network, e.g., LAN 706.
- Meter Manager Server 702 is configured to extend access via web queries to allow other softwares to access the services from other PCs in the LAN 706.
- Meters 604, 606 may be organized into Locations in the Cloud server 602, and tied to location information configured by the Customer.

It is to be appreciated that system 600 employs a network configuration that enabled load balanced data and communication flow in accordance with an embodiment of the present disclosure. For example, referring to FIG. 9, a network configuration of the server 602 is shown in accordance with an embodiment of the present disclosure. It is to be appreciated that server 602 may be configured from several physical or virtual servers or one physical or virtual server including the functionality of the individual components shown in FIG. 9. The network configuration includes a DNS and certificate service 804, which connects a user 802 to the application executing in cloud server 602. The network configuration employs load balancing (e.g., elastic load balancing), via load balancers 812, 814, 816. Load balancers 812, 814, 816 automatically distribute incoming application traffic to server 602 to multiple destinations or routes to efficiently manage large amounts of incoming application traffic. The load balancers 812, 814, 816 may further incorporate custom rules for routing incoming application traffic (e.g., forcing https (SSL), etc.). It is to be appreciated that there are 3 different webservices, a push service 820, billing service 822, and a query service 818, each of which will be described below. Each of these 3 services speaks to it's own load balancer. If the push Service is called, then it speaks to the pushLoadBalancer 814, if the Billing Service 822 is called, it speaks to the BillingLoadBalancer 816 and, if the query Service 818 is called, it speaks to the queryLoadBalancer 812.

The network configuration further includes a web application firewall (WAF) 810 (described in greater detail below), logs 808 (including log data from WAF 810 and balancers 112/114/116), and storage 106 (e.g., one or more storage devices or facilities for storing logs 108 and data backups from data in server 602). All requests to any of the services, e.g., service 818, 820, 882, always go through the web application firewall (WAF) 810 first and will be blocked if the firewall has an issue with the incoming request.

The network configuration supports services 818, 820, 822, e.g., REST services. The query service 818 runs throughout the whole cloud management application and also allows application calls to other applications internal to server(s) 602, e.g., requests for data and/or logs. The push service 820 is a webservice that receives meter log data from various sources, such as, an application installed on the LAN 706 (e.g., meter manager module 614 on server 702). Push service 820 is used to upload log date from meters 604, 606 to server(s) 602. The billing service 822 is a billing and management web service of server(s) 602 that is configured to handle any billing or managements issues/matters users may have. It is to be appreciated that services 818, 820, 822 are installed on one or more servers 602 configured for autoscaling such that if the load (e.g., data pushed to server, queries or polling of the server, etc.) on one of the servers 602 is above a predetermined limit, the network and/or server 602 is configured to employ at least one additional server to accommodate for the increased load (alternatively, the network and/or server 602 further decreases the amount of servers in use when the load on the servers 602 is decreased). In one embodiment, the applications in the network configuration (e.g., such as services 818, 820, 822) are deployed on ElasticBeanStalk (i.e., a service for deploying and scaling web applications and services) and Docker (i.e., an open source tool for deploying applications).

It is to be appreciated that although only three (3) services are shown, e.g., services 818, 820, 822, it is contemplated that more than three services may be employed in system 600. As additional services are employed, additional corresponding load balancers may also be employed.

Figure 9:
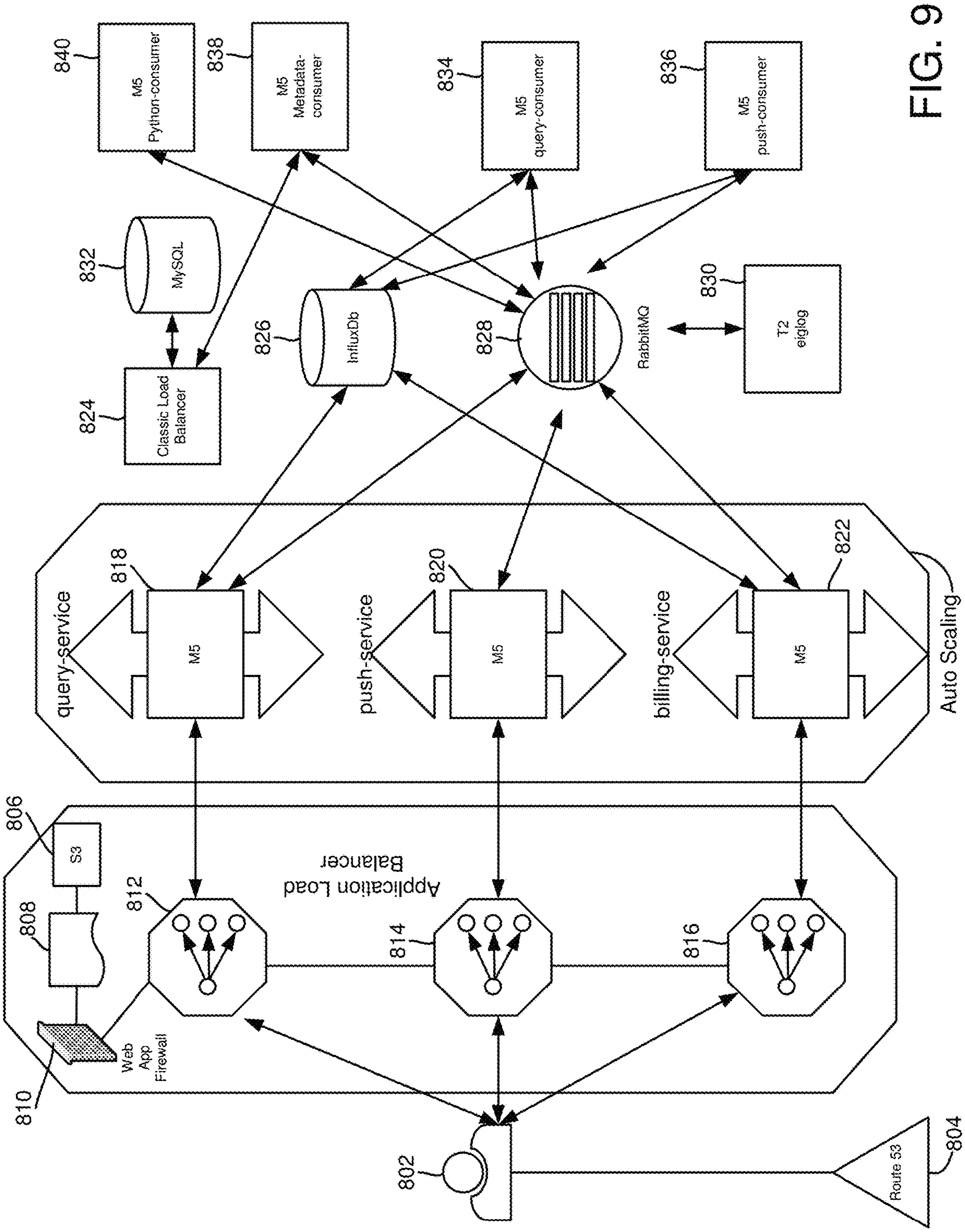
FIG. 9 illustrates a network configuration of a server of the cloud-based meter management system in accordance with the present disclosure.

The network configuration of FIG. 9 further includes another load balancer 824 (e.g., an elastic load balancer), which supports TCP for communication with a database (e.g., MySQL) 832 for storing relational and structured data, such as, but not limited to, facility information, user information, and meter information.

The network configuration further includes a database 826 (e.g., non-relational database) configured for time series data. Database 826 stores logs from meters 604, 606 in an unstructured format. Database 826 stores History, PQ, Limit, Wave, and System Event Logs from meters 604, 606.

The network configuration further includes a databus or message broker 828, e.g., RabbitMQ™, for routing communications in multiple different protocols between components of the network configuration of FIG. 9. Databus 828 is configured to handle call load to the various databases of cloud 602 such that instead of every call being directly sent to a given database of cloud server(s) 602, a call is made to databus 828 and databus 828 is configured to then route the call to the appropriate database. Databus 828 is configured to enable async calls and includes a Publish/Subscribe tool where a service publishes to databus 828 and then an object/entity/service may subscribe to get the data (e.g., a consumer) and send the data back to databus 828, which sends the data to the original caller service.

The network configuration further includes a log server 830, which logs all calls made by the webservice and store the calls in logs in server 830. The network configuration also includes consumers 834, 836, 838, 840. Consumer 834 communicates with databus 828 and collects all of the calls from query service 818 and send the calls to database 826 and returns data from the database 826. Push consumer 836 interfaces with the push server 820 and captures push data sent to databus 828 and stores the push data in database 826. Metadata consumer 838 is configured to enables anyone in the network to communication with database 832 without any knowledge about where data is stored. Metadata consumer 838 wraps all of the interactions of database 832 (and makes calls to database 826) for the website generated by server 602 and presented to client device 608. Metadata consumer 838 receives requests from databus 828, sends the requests to the appropriate database, and pushes responses to the requests from the databases to databus 828. Python consumer 840 is configured to get all of the data from the meter logs as well as weather data from a third party weather API and build out prediction models (e.g., billing predictions) that are used.

In one embodiment, database 832 is a relational database and stores data in Tables and Rows. Database 832 is used in the system for 'structured data' like facility information, user login/pass, customer information (first/last name, address etc.). Database 826 is a NoDB system (i.e., is known as a Time Series NoDB which is a NoDB focused on time data which is all the meter logs). A NoDB stores unstructured data which can change easily and stores it in a JSON style format. It is not as rigid as a relational database and allows for data to be stored better in the case of logs and things that are not structured. As an example, one wave file can contain 100 pieces of data, while another can contain 34, another 275 etc.

Figure 10:
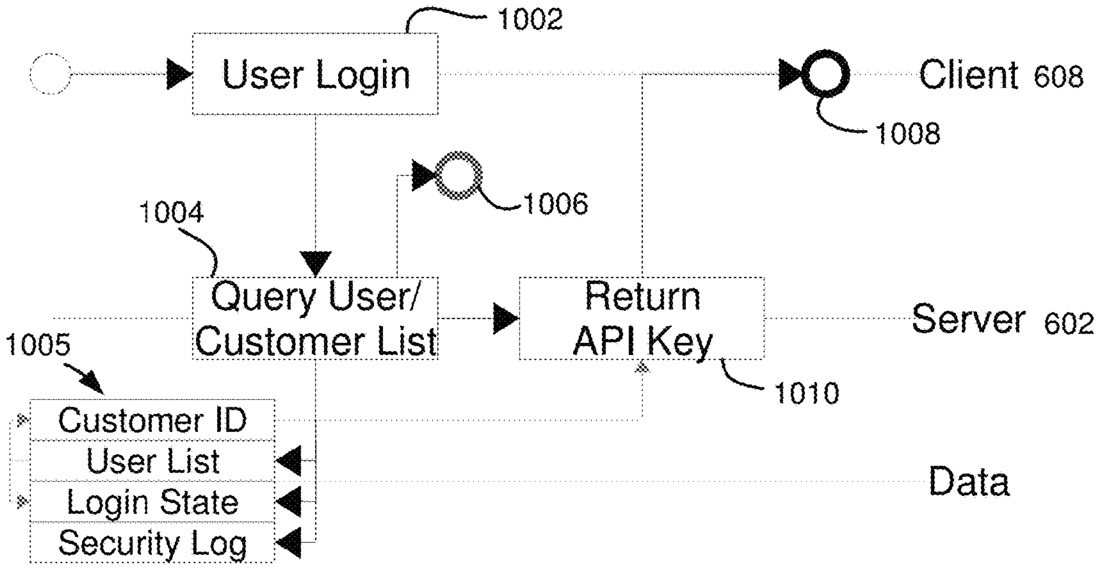
FIG. 10 is a user login flow diagram in accordance with the present disclosure.

Referring to FIG. 10, a user login flow diagram is shown in accordance with an embodiment of the present disclosure. A user logs into the system 1002 (e.g., via a UI displayed in a web browser of client device 608), a database of server 602 takes the login information and validates it 1004 (e.g., by checking information 1005 including customer ID information, such as, but not limited to, API keys and customer roles among other information) in the database system (in one embodiment, BCrypt is employed to encrypt passwords in the database). If invalid 1006, cloud server 602 returns invalid to the user (and displays the result in the UI displayed in the web browser). If valid 1006, cloud server 602 logs the user into the system and gets 1010 the information 1005 for the user such as basic information, e.g., their APIKey, which cloud server 602 can use to associate the meters 604, 606 to and their role as an Enterprise User or a Simple user (or other type of user) of the system 600 as well as the EIGlog will capture a login of this user into the system.

Figure 11:
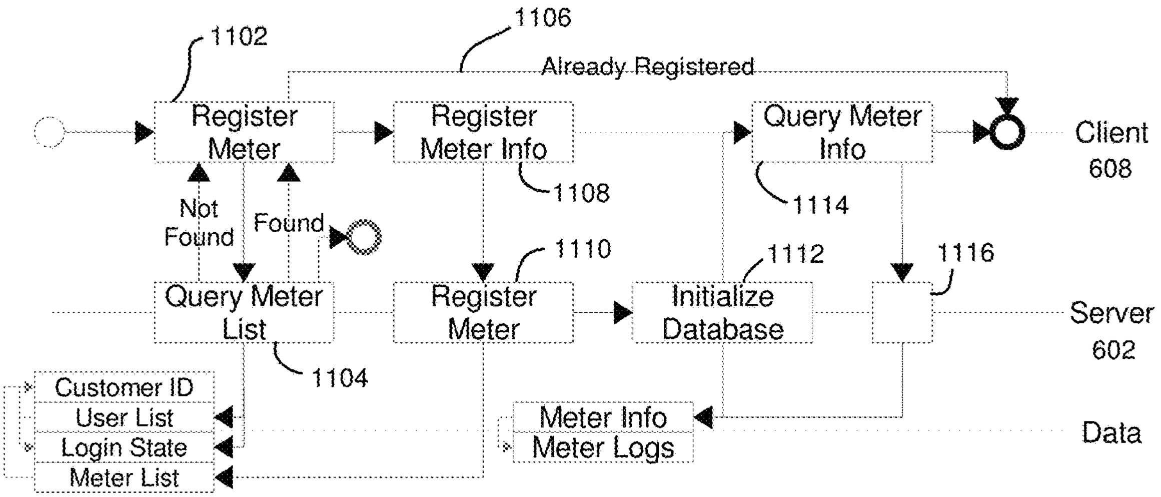
FIG. 11 is a meter registration flow diagram in accordance with the present disclosure.

Referring to FIG. 11, a meter registration flow diagram is shown in accordance with an embodiment of the present disclosure. In step 1102, when an attempt is made to register a meter 604, 606, a register meter API command is sent to server 602. In step 1104, server 602 queries a meter list including all registered meters 604, 606, if the meter 604, 606 is already registered, in step 1106, server 602 sends a notification (e.g., to a user on a client device 608) that the meter is already registered. The notification may include information (e.g., meter ID, meter type, etc.) associated with the registered meter. Alternatively, if, in step 1104, server 602 finds that the meter 604, 606 has not been registered, in step 1108, information associated with the new meter 604, 606 (e.g., meter ID, meter type, meter settings (e.g., CT/PT ratio, energy scaling, hookup info, etc.)) is registered, and in step 1110, the new meter 604, 606 is registered (e.g., in a database including a meter list). In step 1112, a server database of server 602 is initialized and the information associated with the new meter 604, 606 is stored. In step 1116, the meter settings information associated with the new meter 604, 606 is used to update the meter settings stored in the server database.

User registration is done through a webpage provided by the cloud server 602 to a client 608. When a user registers with the cloud server 602 (e.g., via a UI displayed in a web browser of client device 608), they are given the option of creating a new customer, or joining in an existing customer's group of users. If the user creates a new customer, a unique APIKey is generated, to be used by all users of this Customer. Alternatively, when a user registers, they can join an existing customer's group of users, thus accessing that customers meters 604, 606. To join an existing customer's group, the user must acquire and enter that customer's APIKey (generated above, and provided by the user that created the customer to the user desiring to join the group), to verify (by server 602 checking a database including the customer information) they have legitimate access to this customer. Whether the user creates a customer, or joins an existing one, that APIKey is associated with that user account. This APIkey is then used by the meter data push service of server 602 to verify that the upload has legit access to the meter data being modified.

Figure 12:
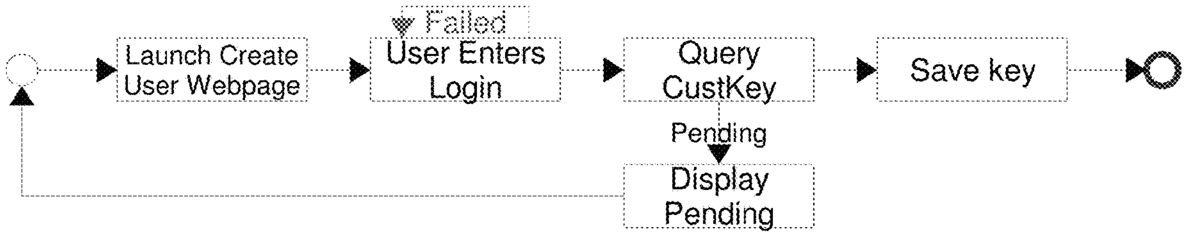
FIG. 12 illustrates an overview of an interaction between a client software and cloud server in accordance with the present disclosure.

Referring to FIG. 12, an overview of the interaction between a user and cloud server 602 is shown in accordance with the present disclosure. Since the client software or website being accessed by client browser needs the CustKey to perform any action, the user must login before the software can interact with the cloud server 602. After creating a user, or just logging in, the cloud server 602 will query the CustKey for the logged in user, and store this for usage by uploads and meter registration, as shown above in the overview of client software interaction.

The interaction between client devices 608, meter manager module 614, and/or web-enabled meters 606 with the components of cloud server 602 shown in the network configuration of FIG. 9 will now be described in relation to FIGS. 32-34.

Figure 32:
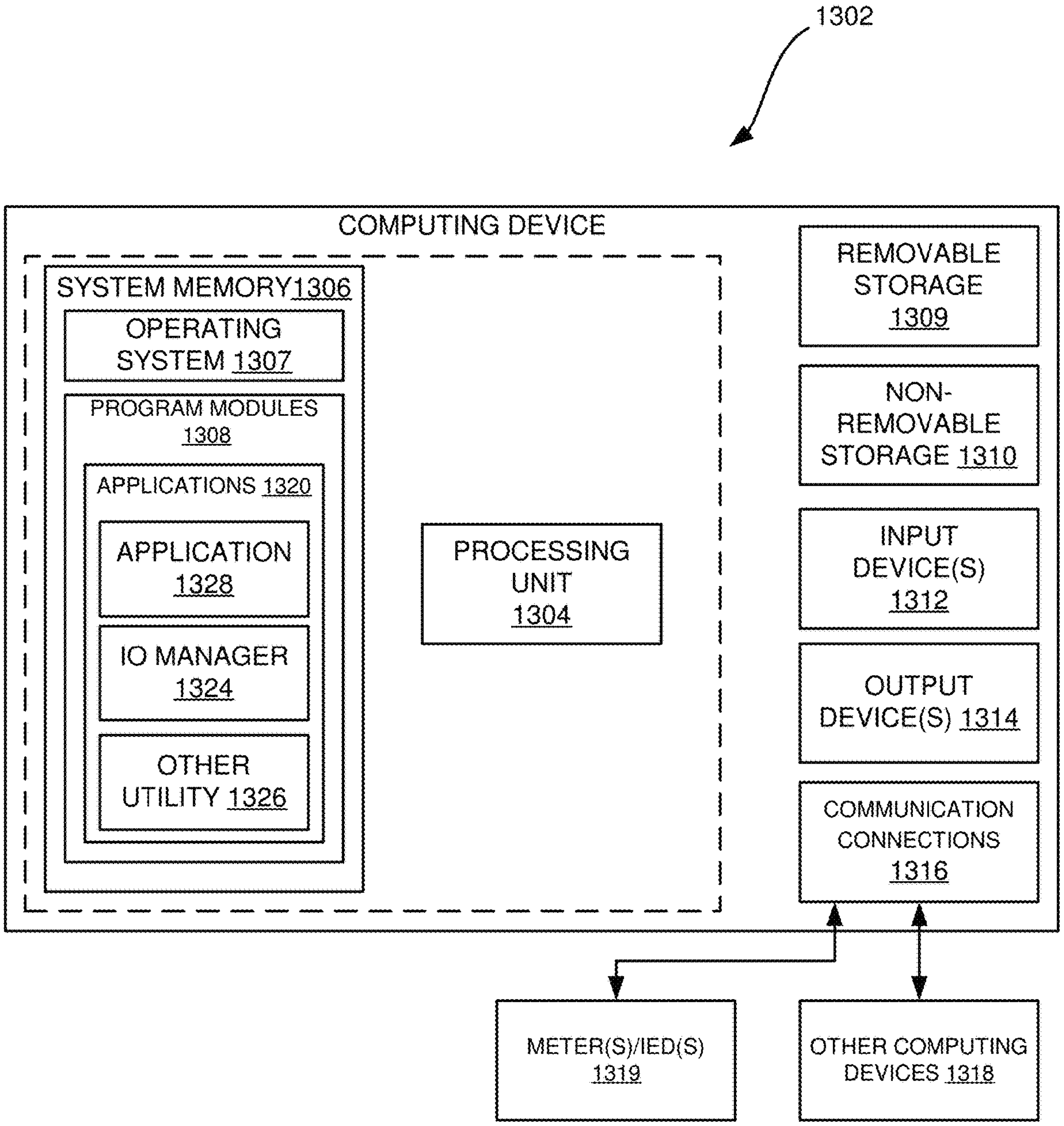
FIG. 32 is a block diagram of an exemplary computing device in accordance with an embodiment of the present disclosure.

Referring to FIG. 32, a flow diagram illustrating a method for pushing data (e.g., log data) to cloud server 602 and how server 602 handles the pushed data is shown in accordance with an embodiment of the present disclosure. In step 3202, meter manager module 614 or a web-enabled meter 606 uses an HTTP POST method to provide data to push service 820 of server 602. In step 3204, push service 820 pushes the data to databus 826, and in step 3206, databus 826 pushes the data to push consumer 836. In step 3208, push consumer 836 pushes the data to database 826. In step 2310, consumer 836 pushes historical channel data (e.g., associated with a predetermined time period, such as a day) to databus 826, and, in step 3212, databus 826 provides the historical data to consumer 834. In step 3214, query consumer 834 requests all the historical data for the updated period (e.g., meter data or channel data associated with a predetermined period of time, such as a day) from database 826. In step 3216, database 826 responds to the request by providing the channel data requested to query consumer 834. In step 3218, the query consumer 834 stores the sum/avg data for this channel for the specified day in database 826.

Figure 33:
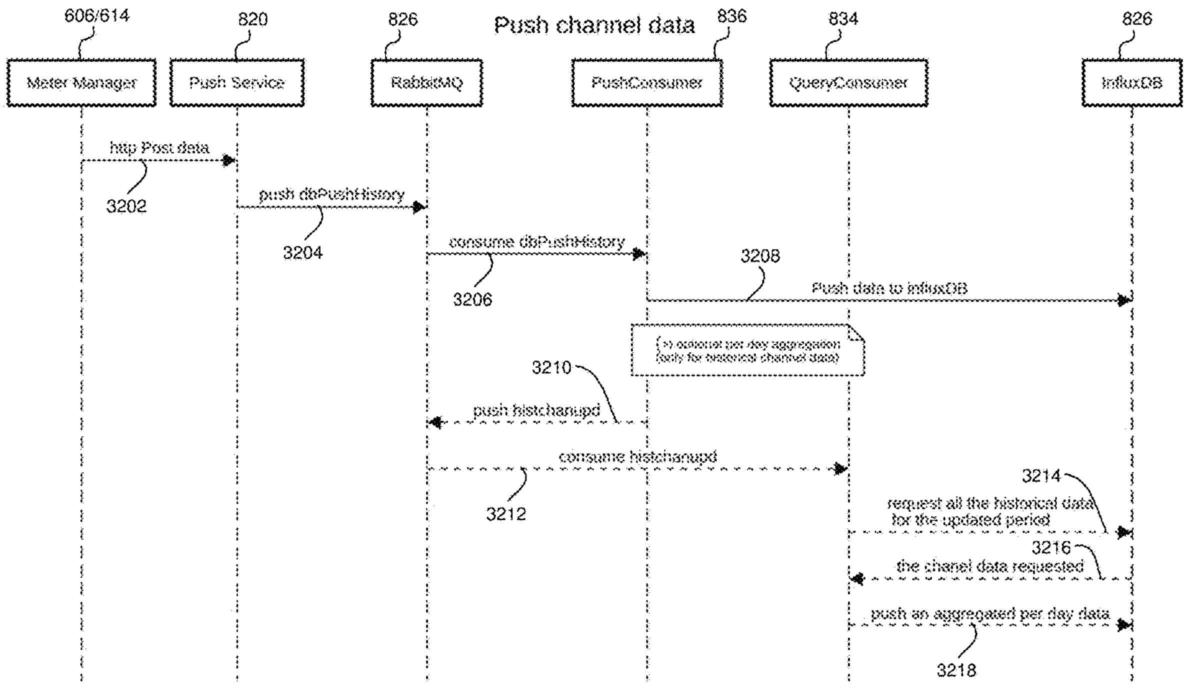
FIG. 33 is a flow diagram illustrating a method for pushing data to a cloud server in accordance with the present disclosure.

Referring to FIG. 33, a flow diagram illustrating a method for handling (e.g., pushing) various types of data (e.g., power quality, waveform, limit, and event data) is shown in accordance with an embodiment of the present disclosure. In step 3202, meter manager module 614 or a web-enabled meter 606 uses an HTTP POST method to provide data (e.g., log data) to push server 820 of server 602. In step 3304, service 820 pushes the data to databus 826. In step 3306, databus 826 sends the data to consumer 836, which pushes the data to database 826, in step 3308.

Figure 34:
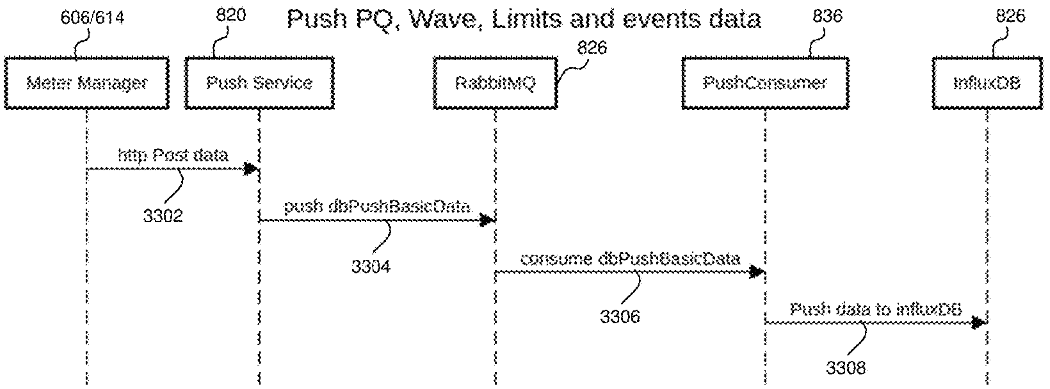
FIG. 34 is a flow diagram illustrating a method for handling various types of data in accordance with the present disclosure.
Figure 35:
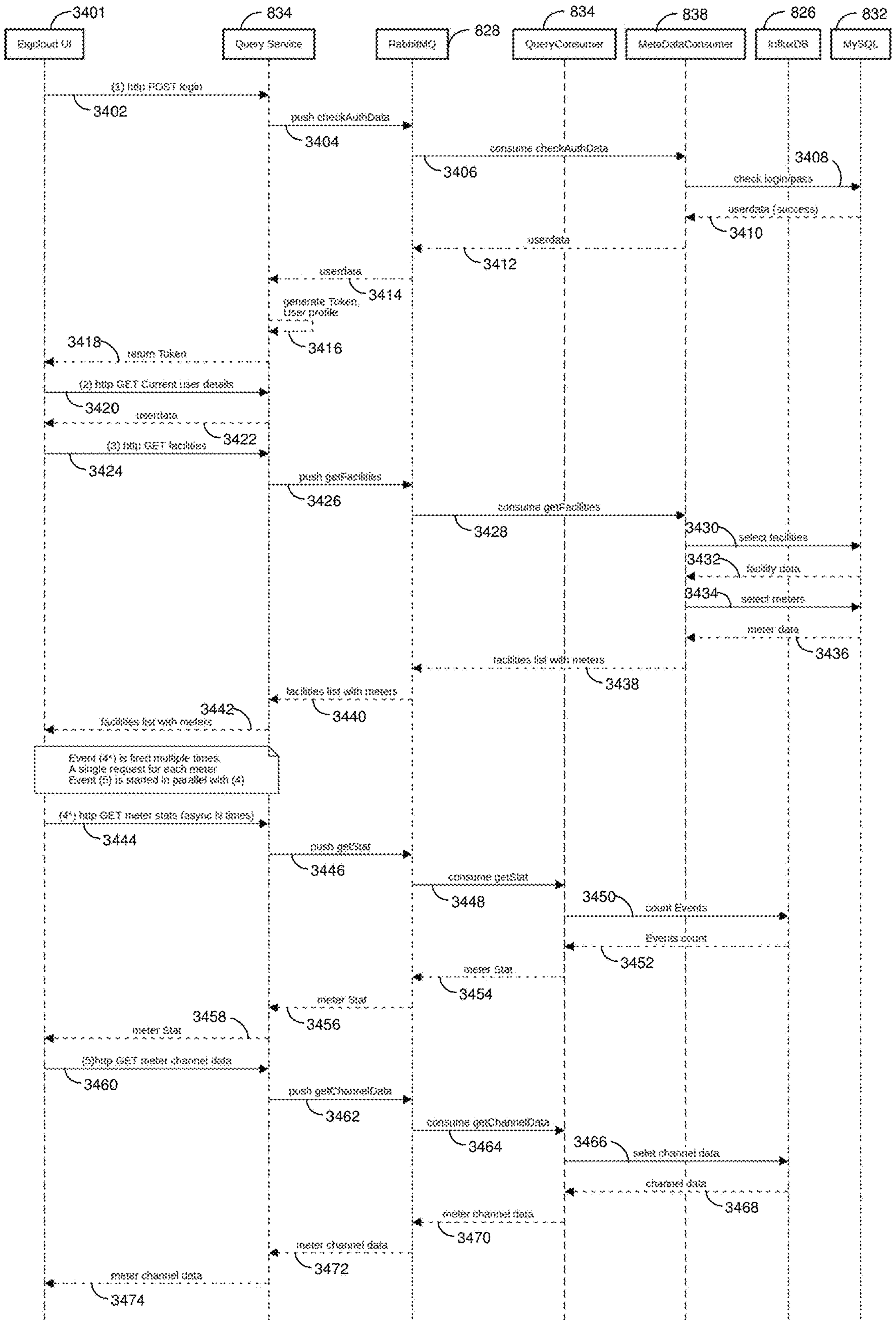
FIG. 35 is a flow diagram illustrating a method for interacting with a cloud server in accordance with the present disclosure.

Referring to FIG. 34, a flow diagram illustrating a method for using the network configuration of FIG. 9 in system 600 is shown in accordance with an embodiment of the present disclosure. In step 3402, cloud UI 3401 e.g., a website and/or UI, the code for which is stored on server 602 and executed by a client browser to be displayed on a display of client 608, uses an HTTP POST method provided to query service 834 to log in to the website/database cloud system hosted on server 602. It is to be appreciated that any of the UIs disclosed herein may be represented by cloud UI 3401. In step 3404, service 834 pushes authentication data received in the POST method to databus 828, which sends the authentication data to metadata consumer 838, in step 3406. In step 3408, metadata consumer 838 sends a request to database 832 to check to the authentication data against authentication stored in database 832 (e.g., against a user name and password of the user), and, in step 3410, database 832 responds to the request with user data if the check was successful and sends the user data to consumer 3410.

In step 3412, consumer 838 sends the user data to databus 828, which sends the data to service 834, in step 3414. In step 3416, service 834 generates a token based on the user data, and, in step 3418, service 834 provides or returns to the token to the cloud UI.

In step 3420, the cloud UI uses an HTTP GET method to get the current user details (e.g., name, user ID, email address, associated client information such as an APIKEY, etc.) from service 834. Responsive to the GET method, service 834 responds with the user data requested and provides the user data to the cloud UI, in step 3422. In step 3424, the cloud UI sends an HTTP GET method to service 834 to request facility data (e.g., facility name, facility ID, facility address and other facility information) associated with meters 604, 606 in a user's fleet. In step 3426, service 834 pushes the request to databus 828, and, in step 3428, databus 828 sends to the request to consumer 838. In step 3430, consumer 838 sends a request to database 832 to determine (e.g., based on the API key and user ID associating users with particular facilities and meters) the facility associated to the user making the request. In step 3432, database 832 responds to the request by providing the facility data to consumer 838. In step 3434, based on the facility data, consumer 838 sends a request for data (e.g., a listing of the meters) associated with the meters 604, 606 at the facility determined to database 832, and, in step 3436, database returns the meter data requested to consumer 838 responsive to the request. In step 3438, consumer 838 sends a facility list with the meters 604, 606 at the particular facility (and/or all facilities for that user with their associated meters) to databus 828, and, in step 3440, databus 828 sends the facility list with the meters 604, 606 to service 834, which provides the list to the cloud UI, in step 3442.

In step 3444, cloud UI sends an HTTP GET method to service 834 to request data or statistics associated with meters 604, 606. In some embodiments the data is requested in a series of asynchronous calls. In step 3446, the request is pushed by service 834 to databus 828, and, in step 3448, databus 828 sends the request to consumer 834. In step 3450, responsive to the request consumer 834 sends a request to database 826 to get a count of events associated with the data or statics requested in step 3444. In step 3452, database 826 responds to the request and sends the count of the events to consumer 834. In step 3454, consumer sends the meter data or statistics requested in step 3444 to databus 828, databus 828 sends the meter data or statistics to service 834, in step 3456, and service 834 sends the meter data or statistics to the cloud UI, in step 3458.

In step 3460, the cloud UI sends an HTTP GET method to services 834 to request meter channel data (e.g., current, voltage, or other data measured and calculated by each meter 604, 606) relating to the meters in the list returned in step 3442. In step 3462, the request is pushed by consumer 834 to databus 828. In step 3464, databus 828 sends the request to consumer 834. In step 3466, consumer 834 sends a request for the channel data to database 826, and, in step 3468, database 826 returns the channel data to consumer 834. In step 3470, the channel data is provided by consumer 834 to databus 828. In step 3472, the channel data is provided by databus 828 to service 834. In step 3474, the channel data is provided by service 834 to the cloud UI.

It is to be appreciated that the sequence of steps 3444, 3446, 3448, 3450, 3452, 3454, 3456, 3458 may be performed several times in succession. Furthermore, it is to be appreciated that steps 3460, 3462, 3464, 3466, 3468, 3470, 3472, 3474 may be performed in parallel with steps 3444, 3446, 3448, 3450, 3452, 3454, 3456, 3458.

Figure 13:
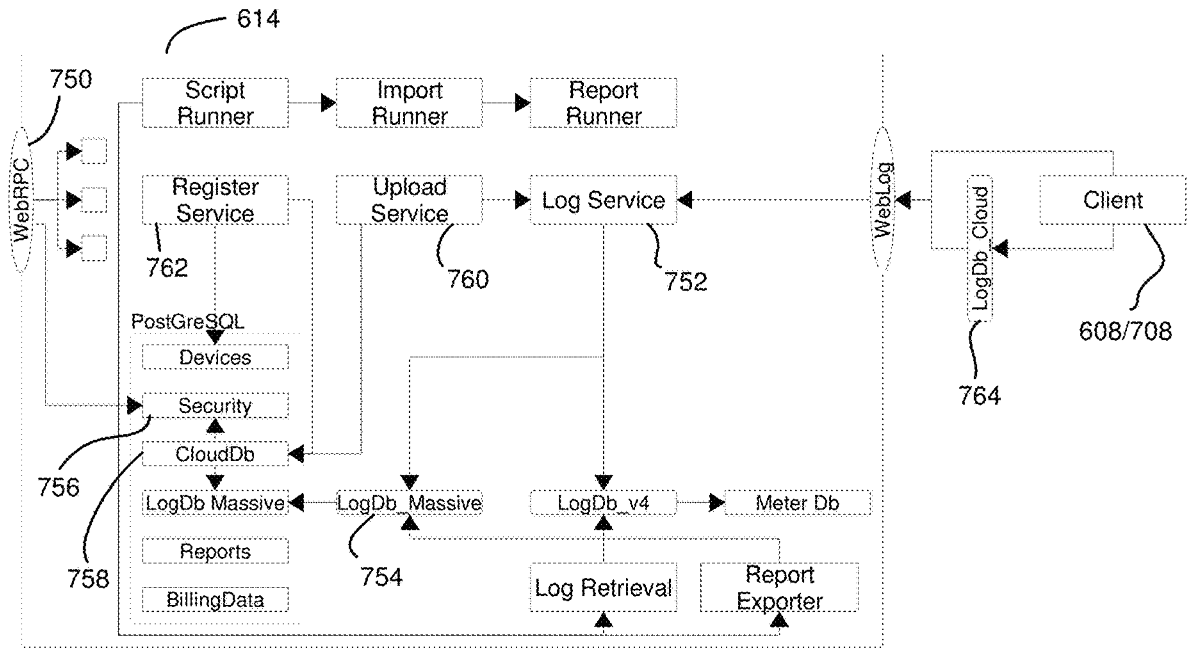
FIG. 13 illustrates a functional block diagram of a meter manager module in accordance with the present disclosure.

Referring to FIG. 13, a block diagram of the meter manager module 614 of the cloud meter system 600 in accordance with the present disclosure is provided.

- WebAPI Hosts—Host classes are used to listen to WebAPI requests for both RPC and Log API's.
- WebAPI RPC Server 750—The RPCServer class supports WebAPI requests, from either a RPCClient, or directly from a Web Client 608/708.
- Log Service 752—Internal service which manages the meter log databases stored by meter manager module 614, and provides the WebAPI Host for Logs.
- Log Db Massive 754—Database Server based meter log data storage.
- Log Utils Log Db Massive—Log Utils DataSource interface to read LogEventLists from the Log Db Massive. This allows all existing C#applications to be easily migrated to the new database.
- Log Utils Log Db Cloud 764—Log Utils DataSource interface to read meter log data from the Cloud WebAPI. This allows all existing C# applications to be easily migrated to the new datastorage.
- Security 756—Security Manager which will ensure that only authorized users can access meter manager resources through the various WebAPI interfaces.
- CloudDb 758—Storage of information related to interfacing with the cloud server 602, including Customer Login information and meter upload configurations.
- Cloud Upload Service 760—Service which monitors the retrieval of logs from meters, and uploads new data to the cloud server 602.
- Cloud Register Service 762—Service which registers and configures meters in the cloud server 602 for the user.

Figure 14:
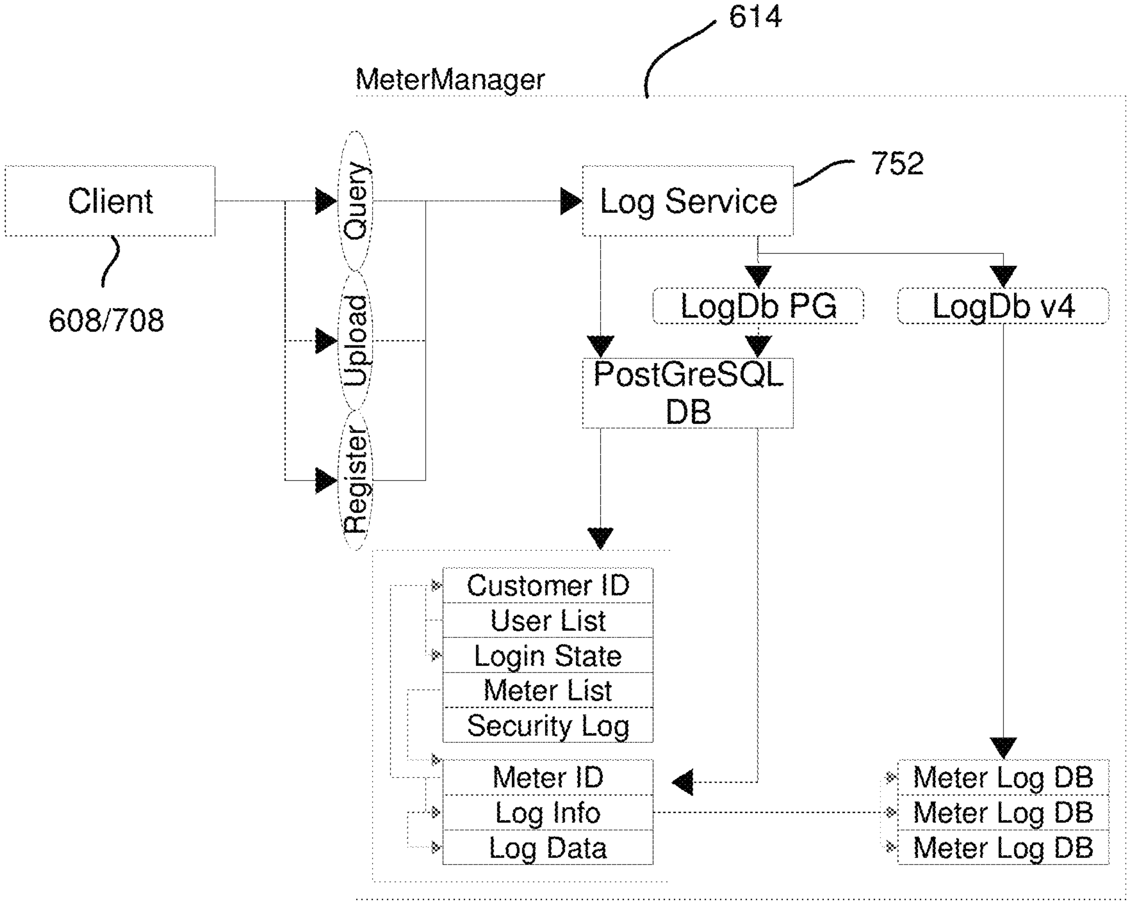
FIG. 14 is a log service flow diagram in accordance with the present disclosure.

Referring to FIG. 14, the Log Service performed by meter manager module 614 is shown in greater detail in accordance with the present disclosure.

Figure 15:
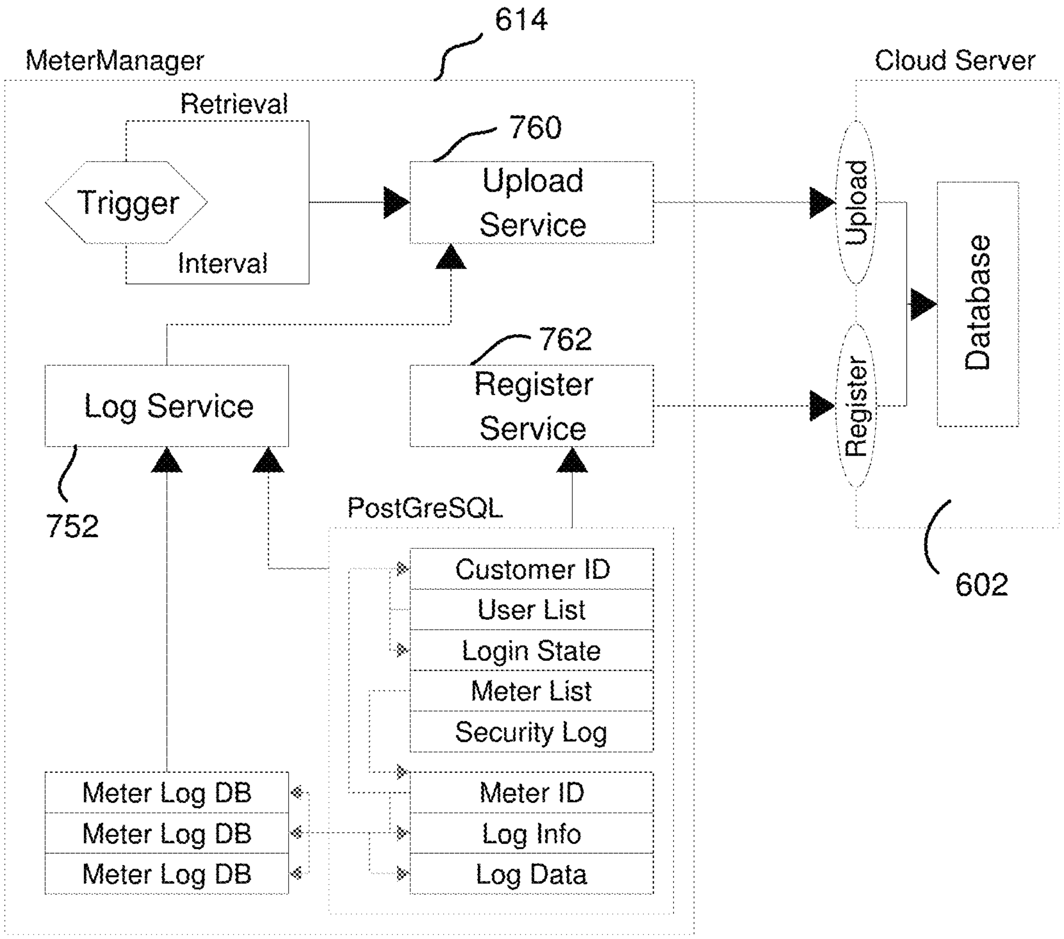
FIG. 15 is a cloud upload service diagram in accordance with the present disclosure.
Figure 16:
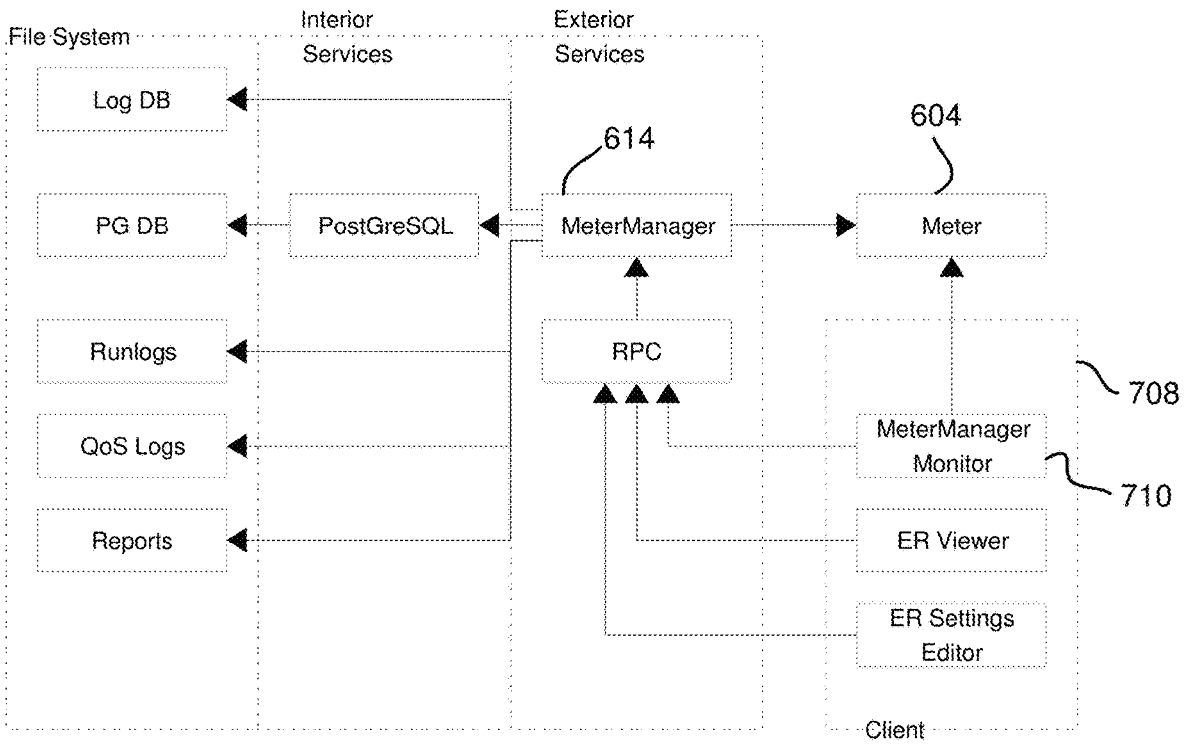
FIG. 16 is a WebAPI RPC flow diagram in accordance with the present disclosure.

Referring to FIG. 15, the cloud upload service of meter manager module 614 is shown in accordance with of the present disclosure. Referring to FIG. 16, the WebAPI RPC 750 feature of system 600 is shown in accordance with of the present disclosure.

Figure 17:
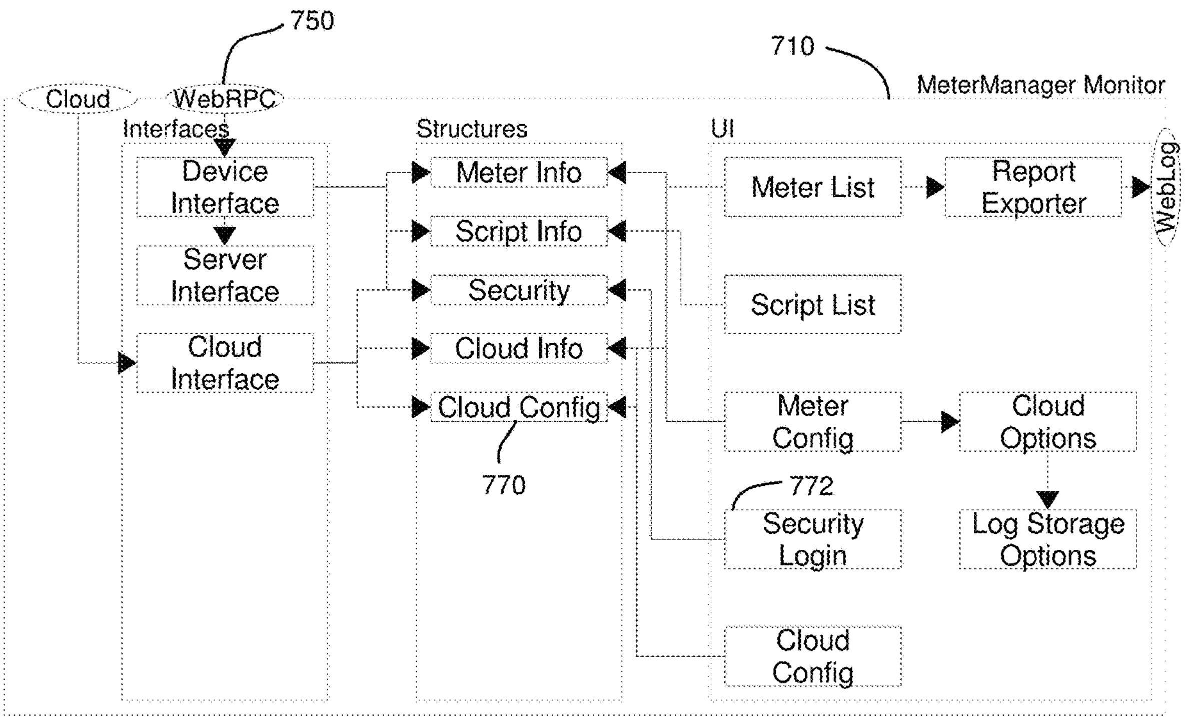
FIG. 17 is a user interface flow diagram in accordance with the present disclosure.

Referring to FIG. 17 a block diagram of a meter manager server UI, also known as meter manager monitor 710, which is outputted by meter manager module 614 to a client device for display in a web browser window is shown in accordance with the present disclosure. The meter manager monitor 710 includes:

- Security Login 772—Usage of Meter Manager Monitor requires a login, that will be confirmed with the Meter Manager Server, before software features can be used.
- Cloud Configuration 770—UIs will enable a user to configure the usage of the Cloud Server by Meter Manager, including login information, meter registration, and meter upload options.
- Log Db Storage Method—The user will be given the option of using MS Access or Massive Table for meter log storage.
- WebAPI RPC 750—RPCClient will be extended to use the new WebAPI RPC protocol to interface with the meter manager Server 614/702.

Figure 18:
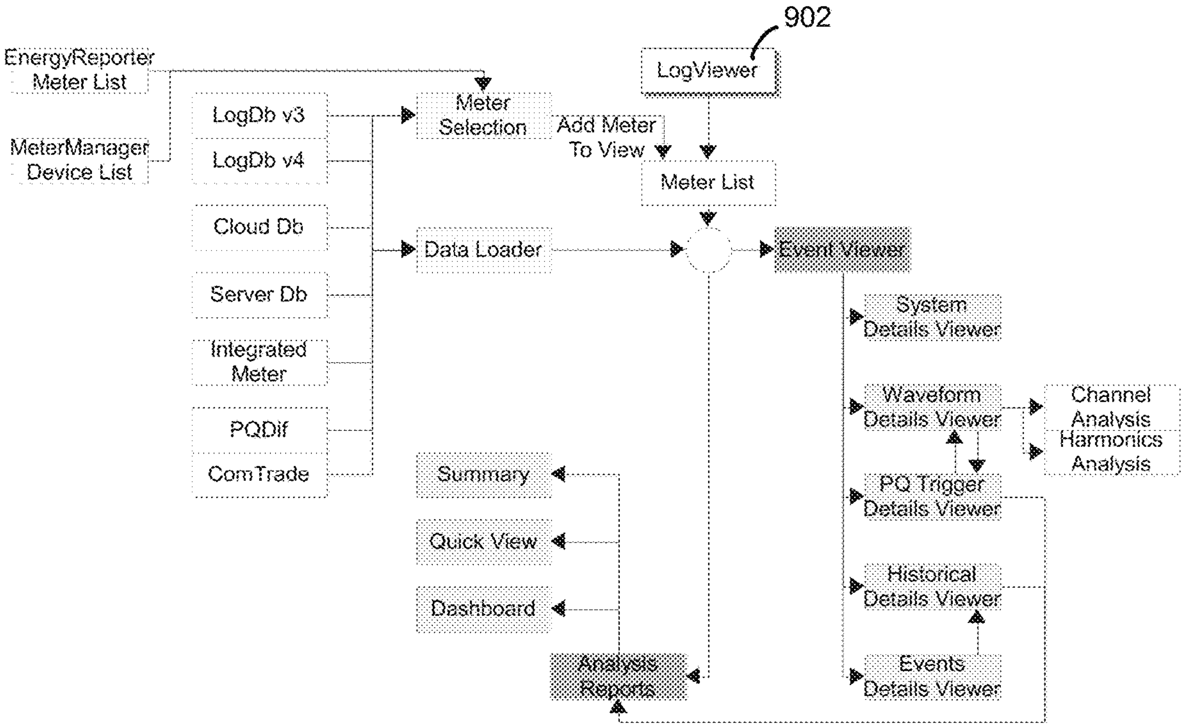
FIG. 18 is a log viewer flow diagram in accordance with the present disclosure.

Referring to FIG. 18, a flow diagram of the operation of a log viewer is shown in accordance with the present disclosure. Log Viewer 902 is an application, which provides access to viewing (i.e., in a UI outputted for display to a client device) the logs from multiple meter data sources, including the old MS-Access Log Db v3 and v4, as well as supporting newer data sources such as PQDif, ComTrade, Server Dbs, reading logs directly from meters 604, 606, and other data sources. Additionally, log events are shown by viewer 902 in a more integrated manner, showing all data in a single Combined Event Viewer, which the user can then filter or drill down to specific details and event types. Each event type also allows jumping to related events, such as PQ to waveforms and limits to system events, to make it easier for the user to rapidly analyze the events. A user selectable number of meters will also be represented by each Viewer 902, allowing the user to analyze the issues which occur across a location.

Figure 19:
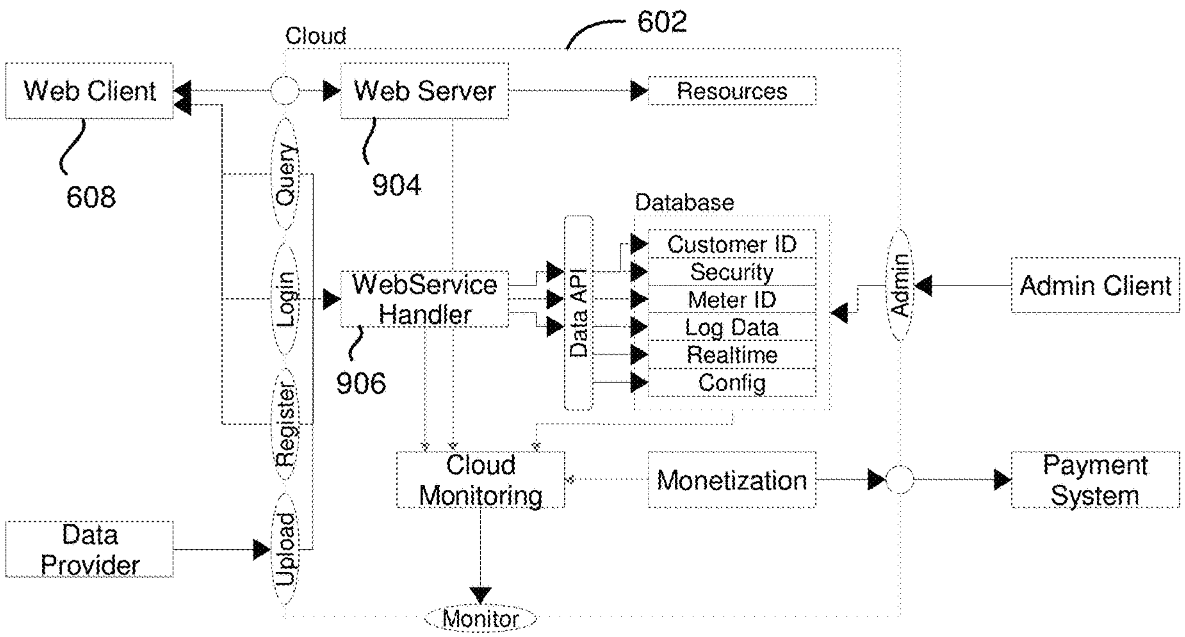
FIG. 19 is a cloud viewer flow diagram in accordance with the present disclosure.

Referring to FIG. 19, several features of cloud viewer or server 602 are shown in accordance with an embodiment of the present disclosure.

In one embodiment, the web server 904 is IIS, web service handler 906 is ASP.NET, cloud server 602 is hosted on Azure and database will be SqlServer 2016. Historical channels will be stored in one table, with ~50 pre-allocated channel fields.

In another embodiment, the Cloud Viewer uses RabbitMQ as an internal messaging queue, where the cloud server 602 is hosted on AWS (Amazon Web Services) and the database is InfluxDb.

Figure 20:
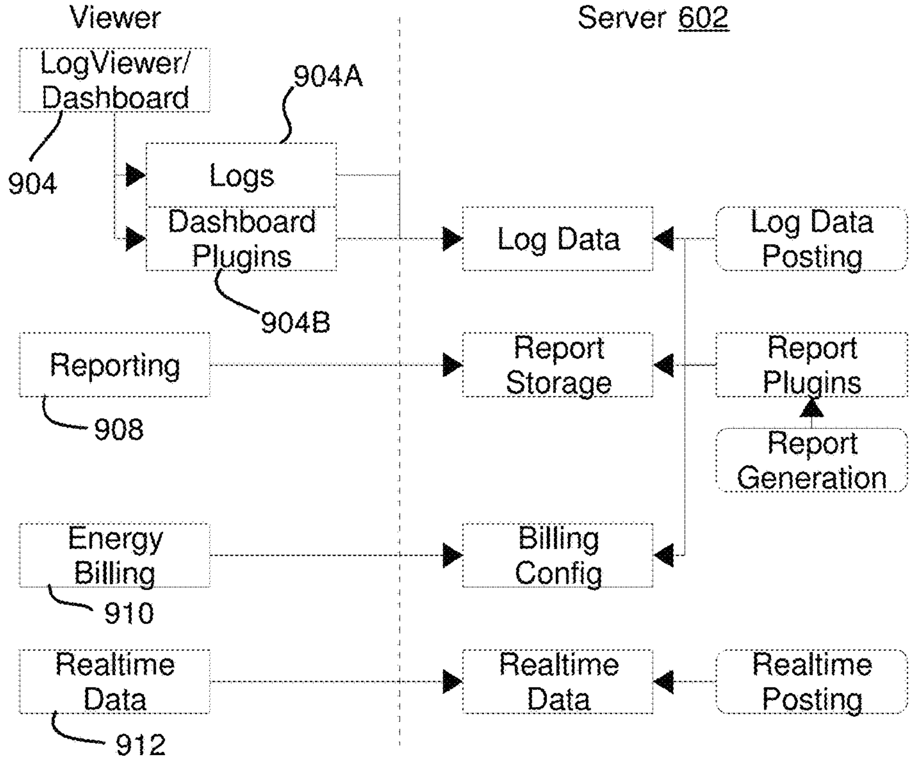
FIG. 20 illustrates a user interface interaction between a client device and a cloud server in accordance with the present disclosure.

Referring to FIG. 20 a flow diagram illustrating how several UI components (904, 908, 910, 912) of system 600 in accordance with an embodiment of the present disclosure.

- LogViewer/Dashboard 904
  - Logs 904A—Displays each of the logs in a drill down fashion.
  - Dashboard 904B—Displays an overview of each of the logs in a single convenient page. Dashboards should include both raw data trends, and 'analysis' dashboards, such as sum usage for the day across multiple locations.
- Reporting 908—Displays reporting options, and interface to view automatically generated reports, and generate new reports. A backend report generator is used to schedule and trigger the automatic generation of reports.
- Energy Billing 910—Linked to the reporting, Billing allows configuring the billing components, including reports, and displays generated bills and billing/cost related dashboard information.
- Realtime Data 912—Displays "realtime" meter data from an internal database, kept up to date by data postings.
- User Registration and Configuration—Allows for the registration of new users, configuring user settings, and linking users to customers.
  - Payment—Allows users to manage their payment for the service, and view their current payments.
- Location Management—Allows creation and modification of location settings, including configuring meters.
- Admin Management—Backend portal for maintainers to access all features, plus directly edit security and payment systems, and view audit logs.

In one embodiment, meter cloud system 600 implements public key infrastructure (PKI) certificates. By placing a PKI certificate on each node in the system, such as the cloud server 602, individual instances of the meter manager module 614, and meters 604, 606 themselves, the meter cloud system 600 can provide a reasonably high level of confidence that each node is talking to legitimate other nodes. By placing a certificate in each meter 604, 606 (and the meter manager module 614), the cloud server 602 can verify that the meter 604, 606 is known and legitimate, preventing false or hijacked posts and queries to the server 602. Certificates can also be used to encrypt data that is transferred between the nodes, the high security transfers, such as firmware transfers, and security actions, such as logging in, and changing security parameters in meters 604, 606. Meter certificates are used to ensure that a meter 604, 606 is legitimate and allowed to interact with the cloud server 602. However, to maintain authenticity, these certificates need to be changed out periodically. This will be handled automatically by the cloud server 602, which will both provision new certificates, and retire old ones. Meter cloud systems 600 includes a certificate management UI for the system admin to review the existing certificates and trigger changes.

In one embodiment, a web application firewall (or WAF) (e.g., web application firewall 810 described above) is provided that filters, monitors, and blocks HTTP traffic to and from the meter cloud server 602. In contrast to a regular firewall, a WAF 810 filters the content of specific web applications while regular firewalls serve as a safety gate between servers. By inspecting HTTP traffic, the WAF 810 of the present disclosure may prevent attacks stemming from web application security flaws, such as SQL injection, cross-site scripting (XSS), file inclusion, and security misconfigurations. The WAF of the present disclosure may be deployed in front of the web applications, described herein, and analyzes bi-directional web-based (HTTP) traffic—detecting and blocking anything malicious. This functionality can be implemented in software or hardware, running in an appliance device, e.g., a client device, or in the server running a common operating system.

The WAF may be a stand-alone device or integrated into other network components. In other words, a WAF can be a virtual or physical appliance that prevents vulnerabilities in the web applications of the present disclosure from being exploited by outside threats. These vulnerabilities may be because the application itself is a legacy type or it was insufficiently coded by design. The WAF addresses these code shortcomings by special configurations of rule-sets, also known as policies.

It is to be appreciated that the WAF 810 of the present disclosure may be deployed inline in three different ways, i.e., transparent bridge, transparent reverse proxy, and reverse proxy. Transparent' refers to the fact that the HTTP traffic is sent straight to the web application, therefore the WAF is transparent between the client and server. This is in contrast to reverse proxy, where the WAF acts as a proxy and the client's traffic is sent directly to the WAF. The WAF then separately sends filtered traffic to web applications. This provides the additional benefit of IP masking.

The meter cloud system 600 includes a system management interface (described in greater detail below) for use by system administrators (e.g., sales, engineers, admins, etc.) to view and manage the configurations and data of all customers. The system admin user is a special user type, which the meter cloud system 600 enables to access the system management webpages and configure the system on a global level. At the user management level, a user may view and configure all users registered in the system, including the ability to reset/change passwords, disable and ban users, create and delete accounts, and view a user's history. At the customer management level, a user may view and configure all customers in the system, including their billing information, billing history, and enabled features. At a meter management level, a user may view and configure all meters registered in the system, including the ability to add or remove a meter to a customer, change meter settings, and view meter data.

The meter cloud system 600 includes a security audit feature for ensuring the security of a server. Not only does it provide regulatory compliance, it can also be used for digital forensics after a breach, which can increase the confidence of customers. Additionally, it can be used to identify threat actors before they perform a breach, by identifying malicious looking activity. The security audit may be performed at the following levels:

Server Audit

Provide a server level audit, which logs all secure activity across the entire server, including detailed source information. This log is the basis, after filtering, for other security audit logs. The audit provides forensics and helps identify security threats to the cloud system 600. The audit may further be reviewed by a threat analysis software. As such, it may be exported in a common format, such as CEF and syslog.

Admin Audit

Server level audit for system admins provides commonly useful information, such as logins, settings changes, and actions performed. This audit helps review what changes may have occurred on the system, as well as diagnose problems for customers.

Customer Audit

The customer audit allows customer admins to review the changes that have occurred to their customer, to review and keep tabs on the users they manage, as well as providing a trail of changes they themselves have made.

The meter cloud system 600 provides a report generation feature (as will be described in greater detail below with respect to an energy billing module) that allows users to generate various reports, based off of selected and configurable templates, on a schedule or manually. These reports base their data off the meter data which has been stored in the server. A report template configuration UI, schedule configuration UI, and generated report viewer UI are provided. Exemplary reports include:

Custom Data export logs: Provides a csv format export file, which contains the history of user selected channels for the time range of the report, along with computed formulas applied to rows, columns, and in the header. The report may contain a number of channels from a number of meters.

Note, each row is a point in time, and each column is a channel of a meter, or a formula.

Energy Usage report: Provides a pdf report which analyzes the energy usage for a number of meters, and provides usage information, summaries, trends, and comparisons between meters.

Custom Analysis report: Provides a csv format export file, which contains analysis of meter data and information, along with meter and facility specific information. Analysis data can include billing rate fields, costs, usage, sums, averages, and max/min values.

Note, each row is a meter or a facility, and each column is a custom field.

A Report Viewer UI is generated in cloud server 602 and provided to a client 608, which allows the user to view all the reports they have previously generated, delete old reports, and generate new ones. Storage is provided on the server for reports generated for each customer, with a time limit on age to minimize storage space requirements. A Report Configuration UI is provided, which allows the user to view, edit, and create report templates, as well as to create a list of reports to generate based on the templates. Reports are scheduled and generated by a configurable list of reports to generate, which pairs a report template, set of meters, and schedule to generate on, together.

The meter cloud system 600 provides Energy Billing by adding rate structures and bill generation as an enabled feature, based on the energy readings uploaded to the cloud server. The application of the energy billing is through, for example, the billing module, dashboards and reports. Configurable bill templates allow the user to create a number of bill generation templates, which include channels to bill off of, a schedule and duration, bill format, and rate structures to apply. A UI is provided to create, edit, list, and copy bill templates. Configurable rate structure templates allow the user to create an arbitrary number of configurable rate structures, which can then be applied to bill templates to generate bills. A UI is provided to create, edit, list, and copy rate structures. Customizable rate plugin allows for the variance in regional rate structure requirements, implement rate charges as easy to implement code plugins, with the goal of allowing tech support or software to quickly add rates on customer request, without requiring retesting the whole system.

In one embodiment, Bills are pdf reports which include a set of charges based on a rate structure template, along with basic usage history, and meta data such as customer info, provider info, and user configurable text. Customizable layouts provide the ability to customize the layout of the bill report in the report template. Many customers require alternate labels, additional text, additional fields, and different layouts, to match their expectation of a bill or invoice. User Selectable time range provides the ability to generate bills for a user selected interval, down to an hour resolution.

A Dashboard Feature (implemented by a dashboard module of server 602 described in greater detail below) provides analysis of log data, beyond just presenting the raw log data, in a set of data fields and graphs. A Custom Dashboard Panel creates a dashboard panel that can be customized by the user, to show the information they want. Options includes base dashboard type, source channels or logs, source meters, and analysis types, as appropriate to the dashboard type. Exemplary dashboard types include:

- Per User: Allows custom dashboards that are unique to that user, and displayed on their home page.
- Per Facility: Allows custom dashboards that are unique to a single facility, and displayed on the facility dashboard page.
- Per Meter: Allows custom dashboards that are unique to a single meter, and displayed on the meter dashboard page.
- Dashboard Templates: Allows the user to create custom dashboard templates, which they can then select when customizing a dashboard panel, to quickly configure that panel.

In one embodiment, Dashboard Tiles are provided which are groups of dashboard panels, where the user customizes the size and layout of each panel to suit their needs.

In another embodiment, Analysis Dashboards are a dashboard type that analyzes historical data, and provides summary information on that data, such as aggregations, avg/max/min, usage to date, sums, standard deviation, and deviation between channels. Analysis of channel applies the analysis to a single selected channel, or the aggregation of multiple channels. Analysis of Facility applies the analysis to all the meters with the selected channel at a facility, or the aggregation of all the meters at the facility.

Future Trend Prediction dashboards are a type that analyzes historical data, and provides a forecast of what will happen to that data in the near future. Trends could be expressed as a percentage likelihood of a type of event in the near future, a forecast value in the near future, or a prospective trend over the near future. Comparison dashboards are a type which provides comparisons between different ranges in time, different channels, or between different meters.

Cost dashboards are a type which applies a selected rate structure to a meter or facility, and displays a breakdown of the costs involved. Exemplary cost dashboards include:

- Cost Trend: Displays a graph of the costs over time. May not include all costs, as some costs are not affected by time, such as flat fees.
- Cost Totals: Displays a breakdown of the costs for the current time range displayed.
- Cost Comparison: Displays a comparison of the cost breakdown between multiple ranges in time, or between multiple meters or facilities.

Realtime Dashboards are a type which, instead of displaying the historical logged values of a channel, display the current values posted by the meter (or within a reasonable time frame). Exemplary real-time dashboards include:

- Live values from meters: To get live values from meters, the meter (or meter manager module) polls the current values, and posts them to the cloud server. These posted values are then be stored for display in the real-time dashboards.
- Value Dashboard Panels: Value Dashboard panels are a type of real-time dashboard which presents one or more channels in a semi-graphical format, such as a large single value, gauges, bars, or colorized indicators.
- Grid Dashboard Panels: Grid Dashboard Panels are a type of real-time dashboard which presents multiple channels or multiple meters in a grid format, to allow the user to quickly determine values at a glance.
- Internal storage of real-time values: Store the real-time values in an internal array, whether a database or in memory, for a limited period of time.
- Short term history trendlines of real-time values: Along with a live value, a small trendline of previous live values can be displayed, allowing the user to identify trends at a glance.
- User configurable limits on real-time values: Allows the user to create warning limits on real-time values, such that if the value is detected to be over or under a certain limit, an action will be taken. When configured, the live value will be displayed in a different color, or with a warning indicator next to it. When configured, a notification will be displayed in a notification bar for the user, to bring their attention to the issue.

When configured, the user will receive an email when the limit is triggered.

A meter control feature allows a user to interact and control a meter, via the website. Since the cloud server cannot directly control a meter, the control is performed via a message queue which the meter (or meter manager module) periodically reads. The message queue holds, for example, instructions, commands, etc., to be read (or downloaded) and then executed by a meter. The Meter Control includes a UI interface, which provides both the ability for the user to control a feature, as well as provide feedback on the status and success of the control. A history of all control actions, and their results may be kept and displayed to the user. A Profile Update allows the user to update the profiles of meters. These updates will be put into a queue, along with a status feedback as to when those changes have been accepted, or the reason for being denied. To modify the profile, the current profile is read and stored. The current profile may be uploaded from the meter to the server, and stored along with a modification date. A Profile UI provides a UI that displays all the profile settings, and the ability to change them, e.g., request a settings change for an individual meter, request a common settings change for a group of meters and allows the user to create and store a set of profile templates, which can then be loaded into a single, or multiple, meters.

The meter control feature allows the user to perform resets of energy, demand, max/mins, and various different logs. Manual Reset requests a feature to be reset, and provide an update when it has been performed. For readings, such as energy and demand, the values must be posted to the cloud server before the reset is performed. Similarly, logs must be posted to the cloud server before the reset if performed. Additionally, the user can set up a schedule, such as once a week, or once a month, to perform a reset of a specified feature.

The server 602 is configured to keep track of the firmwares of all the meters, along with the hardware configuration, and provide recommendations to the user on what meters should be upgraded. When the user selects upgrade, the server 602 with transfer the appropriate firmwares to the meter/s in question to be upgraded. Security Updates allow the user to configure security on a meter, including configuring roles, users, and passwords. The ability to configure multiple meters with the same security configuration is included.

The meter cloud system 600 employs centralized security, for example, synchronized security between cloud and meter, such a meter login uses the same parameters as the cloud. Additionally, the meter may use a secondary query to the cloud for login, rather than storing the security internally. User Roles are provided to control feature access. Configurable user roles are added, which can then be assigned to users under a customer by the customer admin, to restrict what features and facilities a user has access to. An extension of user roles, system user roles allows system admin users have restricted access to system features, such as only having read access to all meters or configuring systems, but not allowing the deletion of users or billing information.

In one embodiment, billable extensions may be employed to restrict access to features based on whether the customer has paid for the feature. A Billable Extension Selection UI is provided by server 602 to be displayed on a client device to allow the user to enable or disable what features they want to pay for. The architecture of the system 600 is configured to restrict UI access and usage of billable features, so that they can only be used when enabled (and billed) for this customer.

Meter cloud server 602 is configured to generate and provide power quality analysis reports (e.g., in a PDF or other suitable format). The power quality analysis reports analyze power quality events including limits, power quality, and waveform events, and provide information about those events. Exemplary reports include:

- Single Event analysis report: Provides an analysis report on the conditions and information surrounding a single event, or group of events.
- Multiple Event summary report: Provides a summary report of all the power quality events which occurred in the time range of the report.
- Event Identification: Adds possible event issue identification to the Power Quality Analysis reports.

Meter manager module 614 and meter cloud server 602 integration features will now be described, such as, but not limited to, integrating the user configuration, registration, and log upload of meters 604 to the Meter Cloud 602 from the meter manager module 614.

Meter manager module 614 provides a bridge for older (or legacy) meters or IEDs 604 to upload their log data 612 to the cloud server components of the meter cloud server 602. Additionally, the meter manager module 614 simplifies the registration and maintenance of multiple meters 604 with the meter cloud server 602, by automatically registering all found meters 604 with the meter cloud server 602.

The meter manager module/meter cloud integration provides four major components for the user to maintain their portion of the meter cloud system 600:

- Meter Cloud User Integration and Configuration—This feature includes an interface to configure what server to use for the Meter Cloud 602, and what user information to login and use for all other services. This feature may be used if the user doesn't have a login for the Meter Cloud 602
- Cloud Sync Service—This feature automatically registers all meters to the entered user account, and automatically uploads log data for meters which have been activated. This feature also keeps the meter manager module 614 synchronized with the information configured on the Log Viewer Cloud web server.
- Meter Cloud Service Status—This feature provides a status and history for the Cloud Sync Service.
- Meter Configuration—The Meter Configuration is configured to allow the user to enable and disable which meters are active in the meter cloud server 602, as well as provide status information on the log data which has been uploaded.

In one embodiment, the meter manager module 614 will not provide Meter Cloud configuration options, such as customer configuration, user registration, meter configuration (other than those listed), or location configuration. These features may be left to the Log Viewer Cloud web server, and links to the web pages will be provided.

Additionally, the meter manager module 614 is configured to provide some Meter Cloud Server functionality, including registering meters, receiving uploaded log data, and responding to queries for log data. This allows one meter manager module 614 to operate as a server for another device, such as a client device.

The meter manger module 614 is configured with a plurality of features, including, but not limited to, using a user's login to register meters 604, 606 and upload log data, providing links to web pages for configuring customers, locations, accounts, and meters, automatically registering all meters in the meter list to the meter cloud server 602, providing tools for the user to enable or disable a meter in the meter cloud system 600, automatically uploading log data for meters which are enabled in the meter cloud server 602, providing history and status for all registrations and log data uploads, synchronizing the meter manager module information with meter cloud information.

Figure 21:
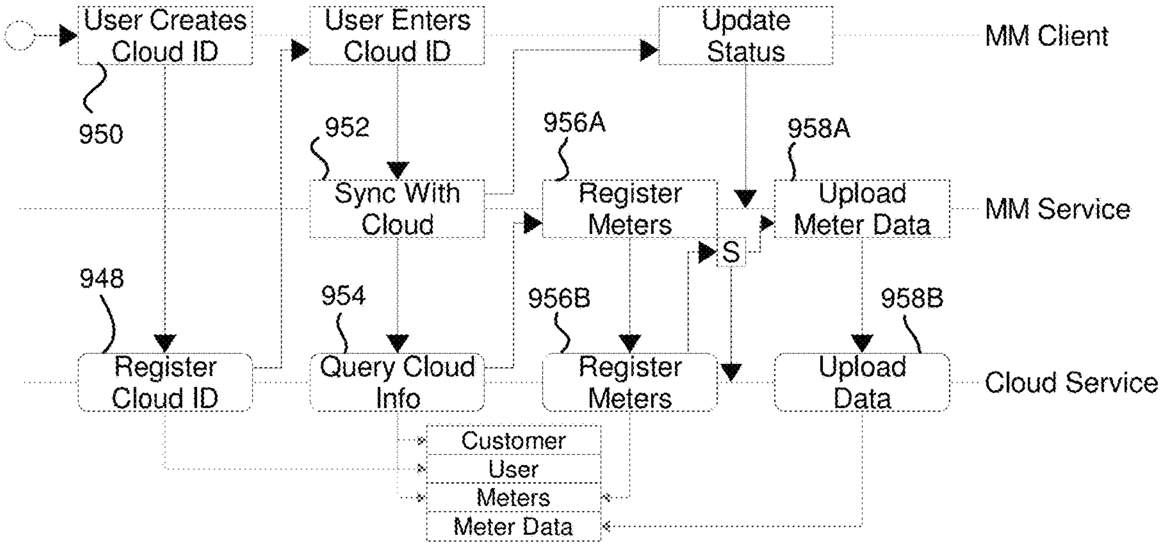
FIG. 21 is a flow diagram for registering a cloud ID and syncing the cloud ID with the cloud server in accordance with the present disclosure.

As shown in the FIG. 21, the meter manager module 614 is configured to register (948) a cloud ID created by a user (950) and sync (952) the cloud ID with the cloud server 602. Thereafter, the meter manger module 614 queries (954) information stored in the cloud server 602 and registers (956A, 956B) various meters. After the meters are registered, meter data is uploaded (958A, 958B).

Figure 22:
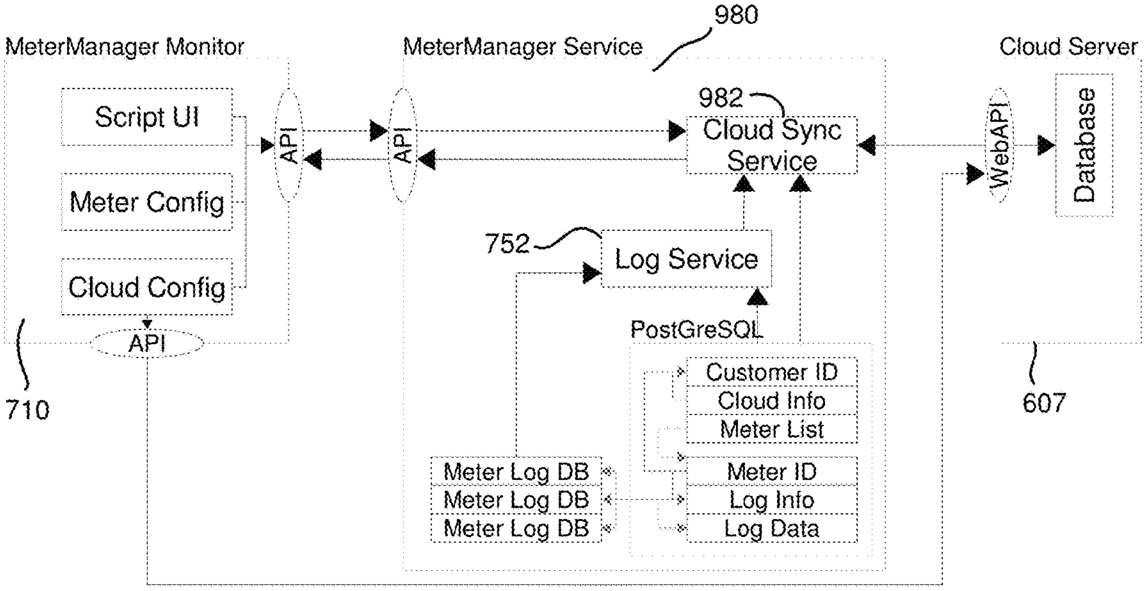
FIG. 22 illustrates interactions of the meter manager monitor, meter manager service and a cloud server in accordance with the present disclosure.

Referring to FIG. 22, a system diagram showing the implementation of the meter manager monitor 702, meter manager service 980 of meter manager module 614, and cloud server 602 are shown in accordance with the present disclosure.

Figure 23:
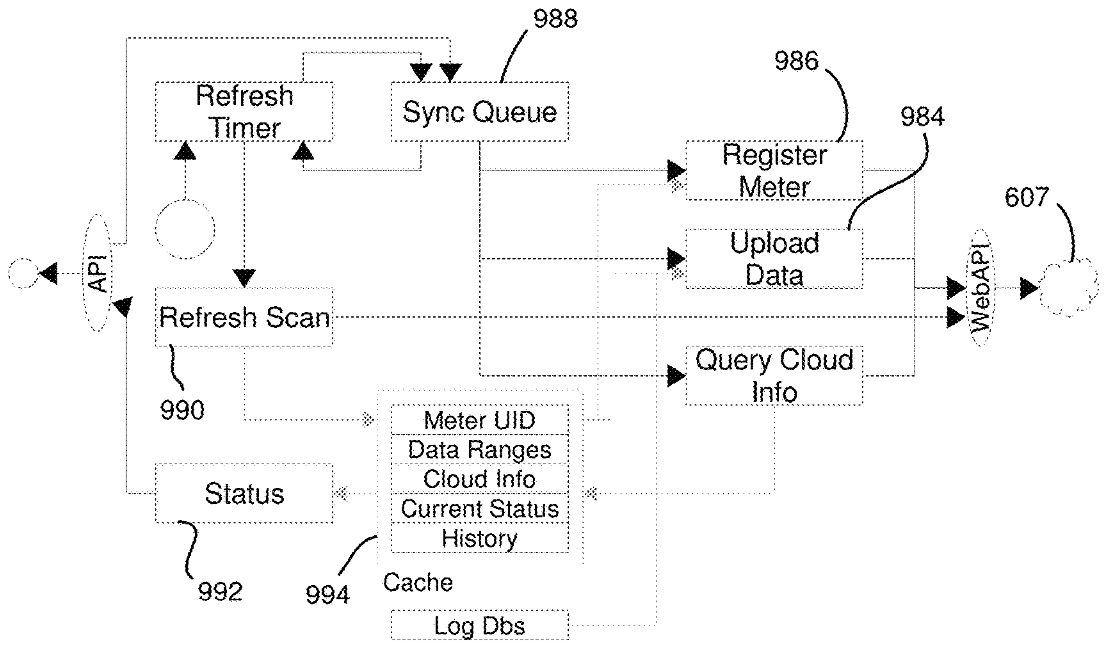
FIG. 23 illustrates a cloud sync service in accordance with the present disclosure.

The Cloud Sync Service 982 of the Meter Manager Service 980 is shown in FIG. 23 in accordance with the present disclosure.

The Cloud Sync Service Runner (CSSR) 982 is a queue based actor, similar to the ImportRunner. The CSSR provides most interactions with the Meter Cloud for Meter Manager (the primary exception being the direct cloud config tools provided in the Monitor for editing and verifying User information).

The CSSR is configured with several features listed below:

- Upload Data 984—Uploads a meter's log data to the Meter Cloud.
- Register 986—Processes registering and reconfiguring meters with the Meter Cloud server 602.
- Server Sync 988—Reads the current configuration for the configured customer from the server, to ensure the meter manager module operates on the most recent configuration.
- Refresh Scan 990—CSSR 980 periodically compares the meter information and cloud configuration available with what is available in the cloud, and enqueues synchronizations and uploads as necessary.
- Status 992—Used to report on the status, inner workings and cache, and history of the CSSR 980.
- Cache 994—The CSSR 980 prebuilds all the statuses and values into a cache 994, to enable rapid determination of what needs actions and what doesn't. Each item in the cache 994 is tied to an update time, which is used to determine if anything has changed since the cache value was last updated.

The Cache 994 of the CSSR 980*n* includes several modules, such as, Meter Info UID, User Cloud Info, Current Status, and History.

Meter Info module includes features such as cloud configuration, Log Db available, and Cloud Db available. Cloud configuration keeps track of what meters have been registered with the cloud, if upload is enabled, and if the meter is enabled with the cloud. Log Db data is stored to keep track of what log data is available from the meter's log db. A refresh is triggered by log retrieval. Cloud Db data is stored to keep track of what log data has been uploaded to the meter's cloud db. A refresh is triggered by an upload.

User Cloud Info is configured to store data and keep track of the cloud configuration for the configured user, including customer info, logins, enables, locations (if available), and meter configurations.

Current Status module is configured to store data to keep track of the current status of the CSSR for the Status reporting component. The Current Status module includes a current action feature, which provides information about the current action being performed. The current action feature will be blank if the CSSR is currently idle. The Current Status module also includes a queue information feature, which provides a list of all actions that are pending in the CSSR action queue. These action do not include the currently executing action. The Current Status module also includes a Counts feature, which includes counts of actions which succeeded, failed, or were skipped because nothing needed to be done.

The History module is configured to store history of the actions which were attempted, including details on the parameters and results. The data in the History module is kept as an in memory queue of 1000 items.

The Meter Manager Service 980 further includes a Log Server, which provides access to the Log Databases for the meters, both to read data, and to push data into them (as part of meter manager module acting as a meter cloud server).

The Meter Manager system of the present disclosure includes the following RPC commands to support controlling and querying the Cloud Sync Service:

cloud.meter.register
cloud.meter.upload
cloud.refresh
cloud.info—Returns the current cloud configuration info and status.
cloud.sync.status
cloud.sync.history
cloud.user.verify—Verifies that the given user can login to the cloud server, and is valid.
cloud.enable [user][pass]—Attempts to configure the meter manager scheduler to sync meters and configuration with the given username and password. The user is verified to have permission to configure the cloud for their customer.
cloud.disable—Disables cloud integration, clearing the user and password cache.

Cloud Info—The following information is configured and cached by the meter manager module 614 to control how the meter manager module 614 interacts with the Meter Cloud 602:

cloud.location
cloud.apikey
cloud.customer
cloud.user.name
cloud.user.pass
etheria.client-enabled—[bool] Controls if meter manager module 614 is integrated with the cloud 602 as a client.
etheria.client-host
etheria.client-port
etheria.client-rootpath
etheria.client-user
etheria.client-password Meter Cloud Info—The following information is configured and cached by meter manager module 614 to control how meter manager module 614 interacts with the meter cloud server 602 for a specific meter (these settings are stored in the meters setting bag):

cloud.meter.uid—[string] Cloud UID for the meter. Assumes the meter is not registered if not found.
cloud.meter.enabled—[bool] If this meter should be registered with the cloud. If this is set, and uid is not, the meter should be registered.
cloud.meter.upload.enabled—[bool] If this meter should upload its log data to the cloud. A meter may be registered and not upload.

Figure 24:
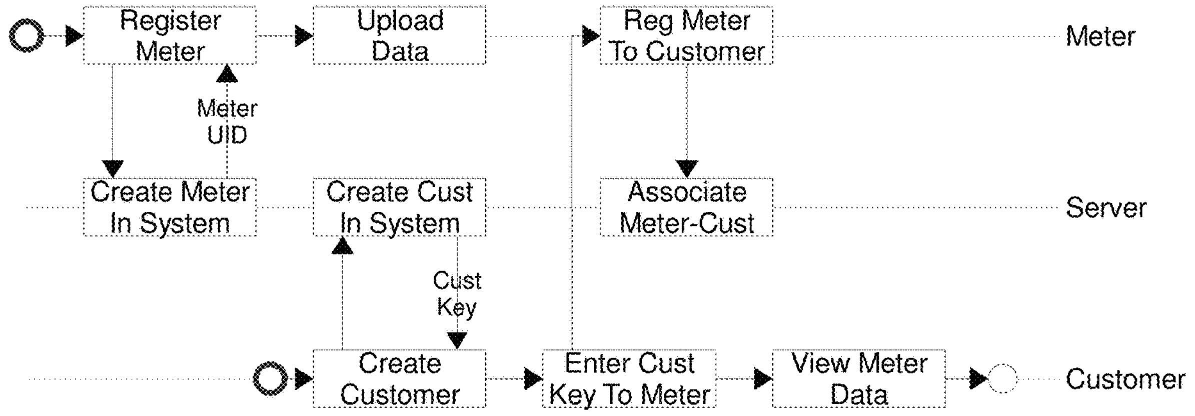
FIG. 24 is a flow diagram of a meter registration process using a key in accordance with the present disclosure.

The meter manager 614 includes a user interface supporting the following features:

Cloud User Configuration, which enables a user to log in and provides several associated options
Cloud Meter Configuration
Cloud Sync Status, which enables a user to see one or more Meter Lists, Scripts, and History Status The meter registration process notifies the Meter Cloud 602 of a new meter to store meter data, and associates it with a customer, so that customer can view the meter's data. In one embodiment, when the meter first comes online, or when it is first discovered by the Meter Proxy server, it attempts to self-register with the Meter Cloud 602, which returns a Meter UID (user identifier/identification) to be used for uploading meter data. Later, when a user registers as a customer in the Meter Cloud, they are provided with a Customer Key, which they then register with the Meter, or Meter Proxy server. The meter or proxy then associates itself with the customer using the Customer Key. This process is shown in FIG. 24.

Figure 25:
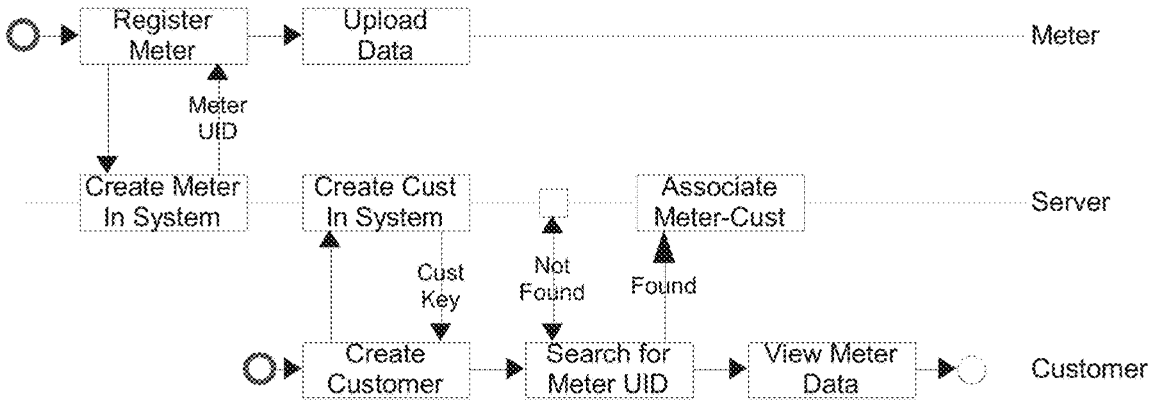
FIG. 25 is a flow diagram of a meter registration process by searching UID or serial number in accordance with the present disclosure.

In another embodiment, an alternate registration method would be for the user to search for their meter's Meter UID or serial through the Meter Cloud as shown in FIG. 25. The meter would still register itself with the Meter Cloud, but after the user registers a new customer, they would be provided with an Add Meter option, which would allow them to search for the meter using the serial or Meter UID.

The meter registration process of the present disclosure provides simplistic registration and association, so that users have to do a minimum of effort to bring their meter online in the meter cloud server 602. In one aspect, meters self-register with the meter cloud server 602, or through a proxy software. To associate the meter, a user enters a customer code to the meter, or a proxy software, to self-associate the meter with a customer; or alternatively, a user links meters to customers by searching for the serial or Meter UID through the meter cloud UI.

Meter Registration—When a meter starts up, or is detected by the Meter Proxy server, if it finds that it does not have a Meter UID for the meter, it attempts to register the meter with the Meter Cloud. Once registered, the Meter UID is stored for further use.

In general, the registration process preforms the following steps:

1. Register Meter—Sends the register meter api command to the server. If the server already has the meter registered, it responds with the meter info for that meter, including the Meter UID. If the meter is new, the meter is registered, and the new Meter UID is returned to the caller.
2. Initialize Database—When a new meter is registered, the server database is initialized for that meter, and a new Meter UID is generated for that meter.

3. Register Meter Info—After a meter is registered, important meter settings, such as CT/PT ratio, Energy Scaling, and Hookup, are written to the server.

Customer Association—When a user registers as a new customer, they must first search and register for access to their meters before they can view them, using a UI provided to them via the Meter Cloud UI. Once found, they confirm that the meter is theirs, and it is added to their meter list, so that when they enable it, they can view data.

In general, the association process preforms the following steps:

1. Create Customer—Creates a new customer in the Meter Cloud system.
2. Search for Meter UID—At any time, a management user for the customer can go to the Search for Meter screen, and enter a meter serial or Meter UID to search for. If the meter is found, they can confirm that they own that meter: the server then associates the meter with that customer, and it is added to their meter list. Once enabled, they can then view the data.

Figure 26:
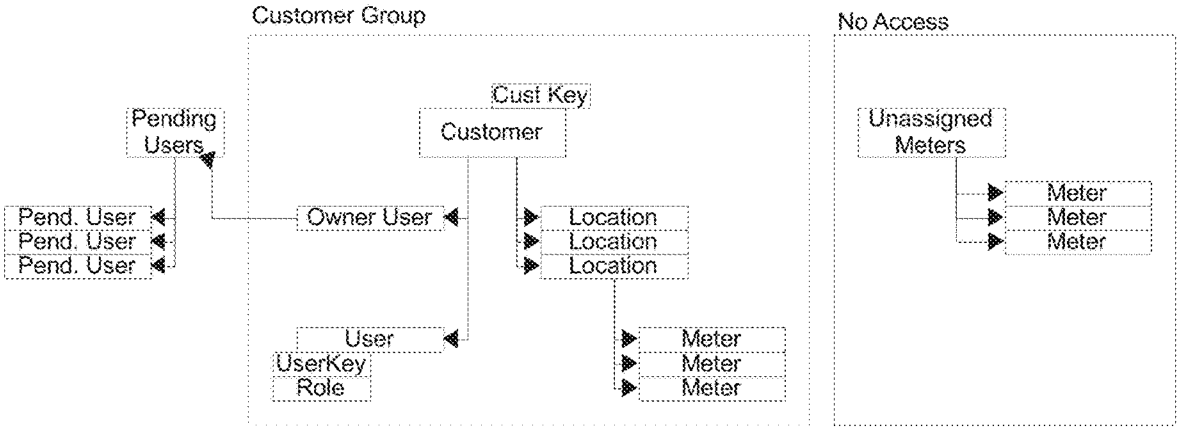
FIG. 26 illustrates an overview of user management of the cloud-based meter management system is a flow diagram of a meter registration process using a key in accordance with the present disclosure.

Details on the user sub-system of the Meter Cloud, including registration, access levels, and deactivation will now be described. Referring to FIG. 26, an overview of the Cloud Meter user management feature of meter cloud 602 is shown in accordance with the present disclosure.

Key Terms

- User—Someone who logs into the Meter Cloud to view meter data, and configure the system.
- User UID—The unique id of the user, used for internal references and trackings.
- User Role—Each user has a role in the Meter Cloud, which controls what features they have access to.
- Pending User—A user which has been created, but not accepted into a Customer yet. Such a user can only access their own information.
- Limited User Role—The Limited User Role only allows a user to view the data for the meters belonging to a Customer. The subset of meters the user has access to can further be limited to a set of locations.
- Enterprise User Role—The Enterprise User Role has full control over configuring the Customer and it's settings, and has access to the data of all meters. Additionally, the Enterprise User can edit the settings of other users, as well as verify their registration with the Customer.
- Customer Owner Role—The Customer Owner has full access to all features of the Customer, as well as being able to configure the billing information for the Customer.
- System Admin Role—A special role, only given to the manufacturer's users, which provides access to all meters, customers, and users, as well as special administrative interfaces for maintaining the system.
- Customer—A customer is a group in the Meter Cloud, under which multiple locations, meters, and users are configured. One user is designated as the Customer Owner, usually the user which created the customer.
- Customer Key—A unique key generated for the Customer when it is created. This key is used throughout the system to associate meters and users with the Customer.
- Meter Association—The process of linking a Meter to a Customer, so that the Meter shows up in the Customer's meter list, and users can access its data.
- User Association—The process of linking a registered user with a Customer, so that they can access the Customer's meters.

The main features of user management will be described below:

- Create User—When a user first creates their User in the Meter Cloud, besides entering user information (such as username and password), they can create a New Customer, or enter the Customer code of an existing Customer.
  - Create New Customer—If the user selects Create New Customer, a new customer will be created, and the new User will be assigned as the Owner of that Customer.
  - Link to existing Customer—If the user wishes to link into an existing Customer, they enter the Customer Key for that Customer, and wait for one of the administrative users of the Customer to approve the user.
- Pending User—While a user is in the Pending state, they can only edit their own settings. They cannot access any meters' data. Once approved, they will be sent an email (if they configured an email), notifying them.
- Login—Once a user has been registered, they can then login, and perform any actions they have permission for.
- Perform Activities—The regular actions of the user, limited by the roles assigned to the user.

In accordance with various embodiments of the present disclosure, the following features are enabled via cloud 602:

- Roles control what features of the Meter Cloud the user has access to.
- Customers are created when a user registers with the Meter Cloud, if selected.
- Each Customer has a unique Customer Key, generated when the Customer is created, and accessible by all users from their user settings page.
- Users join customers by requesting to join, using a customer key to find the customer. Enterprise users have the option to invite other users, which sends them an email to register. The link in the email automatically fills out the customer key and begins the registration process.
- One user is designated the Customer Owner, which is the only user that has access to the billing information.
- Users can only access the meters which are associated with their Customer.
- Meters are associated with a Customer by searching for the Meter UID or Meter Serial.
- Customers are isolated, such that a user can only access the configuration and meter data associated with their customer. A user can only be associated with one Customer.

In accordance with various embodiments of the present disclosure, the following use cases are enabled by system 600:

- Single User—Small companies and users testing the system might only use one user, so one person would create the customer, edit the billing information, configure the system, and view the meter data results.
- Tenant Users—Property managers would want to be able to share the meter data for the locations with all of their customers or tenents. In such a case, there might be only a couple enterprise users, but they may have hundreds of limited users, which are configured to view the meter data for their particular locations.
- Large Company—Large companies are most likely to distribute the usage and configuration of the system across multiple users. They may have dozens of enterprise users, configuring various elements of meters and reports; and dozens of limited users, collecting reports, and verifying the integrity of the system.

A customer is a group in the Meter Cloud, under which multiple locations, meters, and users are configured. One user is designated as the Customer Owner, usually the user which created the customer. All customers are isolated, such that User A of Customer A can only access the meter data associated with Customer A, and User B of Customer B can only access the meter data associated with Customer B. User A would not be able to view the data of Customer B, and vice versa. Additionally, users can only be associated with one Customer.

Server 602 enables the association of a user with customers in accordance with an embodiment of the present disclosure. Several features of user/customer association are described below:

- Request Customer—When a new user is created, they have the option of entering a Customer Key to request access to a specific customer. If the Customer Key matches a customer, the user is added as a Pending User, which has no access to the customer until they are accepted.
- Add Pending User—When the server receives a Pending User request, it adds the new user to the list of pending users of the customer, so that the Owner User can review that list, and approve or reject the Pending Users. Additionally, the Owner User is sent an email notifying them that there are new Pending Users to review.
- Owner Reviews List—The next time the Owner User logs in to the Meter Cloud, they are notified that there are Pending Users to approve. They review this list, and accept or reject Pending Users, based on the user information that they provided.
- Remove Pending User—If the Owner User rejects the Pending User, that user is removed from the Pending Users list, and that user must enter in a new Customer Key to request pending status again. The former pending user is sent an email notifying them that their customer request was rejected.
- Add User to Customer—If the Owner User accepts the Pending User, that user is removed from the Pending Users list, and added to the Customer's User List. Additionally, the new user is assigned the Limited User Role, until the Owner User can assign them the proper role. Finally, the new user is sent an email notifying them that their customer request was accepted.
- Assign Role—After accepting a pending user, the Owner User should assign a role to the new user, as they are given the Limited User Role by default.

Several features of the meter cloud system 600 for Logs will now be described in greater detail. The cloud server 602 supports receiving via upload and storing several types of data log types, including Historical Logs, Waveform Logs, System Event Logs, Limit Logs, and Power Quality (PQ) Logs.

Historical Logs include historical data including a time series set of recorded data, organized by channel, and, in some embodiments, recorded at a specific interval. The table below includes exemplary historical data stored in Historical Logs:

| Timestamp | Volts A-N | Amps A | W-hours, Received | W-hours in the Interval, Received |
|---|---|---|---|---|
| 08/09/2018 05:58:00 | 122.34 | 2.8 | | |

-continued

| Timestamp | Volts A-N | Amps A | W-hours, Received | W-hours in the Interval, Received |
|---|---|---|---|---|
| 08/09/2018 05:57:00 | 122.61 | 2.79 | | |
| 08/09/2018 05:56:00 | 122.7 | 2.8 | | |
| 08/09/2018 05:55:00 | 122.64 | 2.79 | 7,974,024.00 | 20 |
| 08/09/2018 05:54:00 | 123.04 | 2.82 | | |
| 08/09/2018 05:53:00 | 123.12 | 2.8 | | |
| 08/09/2018 05:52:00 | 123.23 | 2.79 | | |
| 08/09/2018 05:51:00 | 123.22 | 2.8 | | |
| 08/09/2018 05:50:00 | 123.13 | 2.82 | 7,974,004.00 | 21 |
| 08/09/2018 05:49:00 | 123.11 | 2.8 | | |
| 08/09/2018 05:48:00 | 122.95 | 2.78 | | |
| 08/09/2018 05:47:00 | 122.88 | 2.78 | | |
| 08/09/2018 05:46:00 | 123.05 | 2.79 | | |
| 08/09/2018 05:45:00 | 122.84 | 2.8 | 7,973,983.00 | 20 |
| 08/09/2018 05:44:00 | 123.05 | 2.82 | | |
| 08/09/2018 05:43:00 | 122.99 | 2.8 | | |
| 08/09/2018 05:42:00 | 122.9 | 2.83 | | |
| 08/09/2018 05:41:00 | 122.47 | 2.82 | | |
| 08/09/2018 05:40:00 | 122.39 | 2.81 | 7,973,963.00 | 20 |

Waveform Logs include waveform recordings events which are triggered by monitored conditions, such as a surge in voltage. When such an event occurs and is detected, the meter is triggered to record the individual samples which make up the monitored readings, along with the trigger information, and logs this in a waveform recording. Multiple channels are recorded, as well as the samples for cycles before and after the event. The shape of this waveform is later used for quality analysis of the event.

Figure 27:
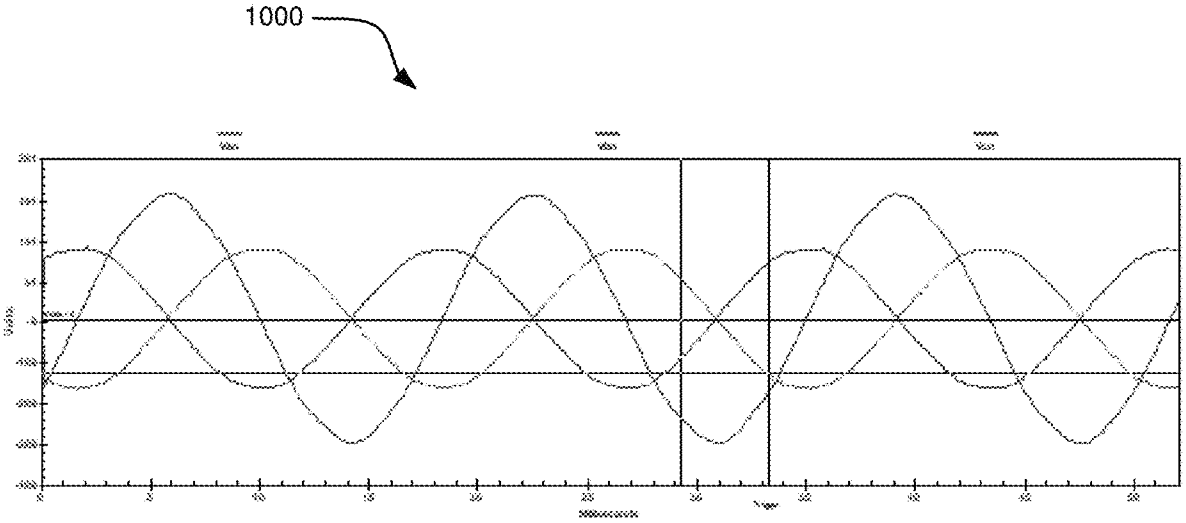
FIG. 27 illustrates a graphical representation of waveform data in accordance with the present disclosure.

For example, in one embodiment, the waveform data stored is represented as a graph with the y-axis relating to voltage and the x-axis relating to time (e.g., in milliseconds). One such exemplary representation of waveform data is shown in the graph 1000 of FIG. 27. In FIG. 27, several waveform channels are overlaid in a single view. It is to be appreciated that, in one embodiment, the waveform data is not stored as an image, but as an array of values for each channel in the recording.

System Event Logs (e.g., stored in server 602 or a server/memory accessible via server 602) include system events, which are recorded whenever an event which effects the operation of the meter occurs. The system events stored may include events such as log retrieval, power loss, settings changes, security events, and time changes. These system events are often used for auditing what is occurring with the meter. The table below represents an exemplary system event that may be stored in the Log Cloud:

| Date/Time | Event Type | Description |
|---|---|---|
| 06/12/2018 17:29:34 | Device Start Up | Firmware v0032 |
| 04/02/2018 19:23:49 | Device Start Up | Firmware v0032 |

Limit Logs (e.g., stored in server 602 or a server/memory accessible via server 602) include limit events which are recorded whenever a reading channel (the same set of channels as used in historical data) exceeds a configured limit, such as voltage going above 140v or below 72v. When the reading returns to within a predetermined limit, the end of the event is recorded. This allows the computation of a start time and duration of the event, as well as the worst excursion value for the event. The table below represents an exemplary limit event that may be stored in the Log Cloud:

| Start Date/Time | Duration (S) | Set Index | Limit ID | State | Data | Value | Set Point |
|---|---|---|---|---|---|---|---|
| 06/22/2018 09:15:06 | 37 | 1 | Limit 2 | Below | Volts A-N | 0 | Below 108 or 90% |
| 06/22/2018 09:15:06 | 37 | 2 | Limit 2 | Below | Volts C-A | 0 | Below 108 or 90% |
| 06/15/2018 11:02:44 | 598339 | 2 | Limit 1 | Above | Volts C-A | 191.16 | Above 132 or 110% |

PQ event logs (e.g., stored in server 602 or a server/memory accessible via server 602) include power quality events, which are recorded whenever a high speed reading (the same set of channels as used in waveform data) exceeds a configured or predetermined limit, such as the 1 cycle voltage an exceeding 200v. When the reading returns to within the predetermined limit, the end of the event is recorded. This allows the computation of a start time and duration of the event, as well as the worst excursion value for the event. The table below represents and exemplary power quality event that may be stored in Log Cloud:

| Start Date/Time | Duration ms | Condition | Channel | Value | % of Full Scale |
|---|---|---|---|---|---|
| 07/22/2018 09:32:32 | 0 | Sag | VAN | 94.45348 | 78.71124 |
| 07/11/2018 07:57:09 | 0 | Sag | VBN | 77.98228 | 64.98524 |
| 07/07/2018 19:06:42 | 1000 | Sag | VAN | 87.5147 | 72.92892 |

It is to be appreciated that PQ records are often taken at the same time as a waveform recordings, and, in some embodiments, the two recordings may be linked. In addition, information about the meters themselves shall be stored by the Log Cloud, to be used by the UI, reporting, and analysis packages.

The meter cloud system 600 includes several security features. The security features are implemented because the cloud server 602 may support multiple customers simultaneously, and, therefore, the security features prevent users from one customer from accessing (intentionally or otherwise), data from another customer.

The meter cloud system 600 also is configured with several storage features to support that increasing number (e.g., tens of thousands of meters being deployed word wide and, in some instances, thousands just at one customer). The meter cloud system 600 storage features support scalability and expansion of the system to store many data records for many meters, with little reconfiguration or performance impact on the system.

The different data types and data logs that meter cloud system 600 is configured to support (e.g., via being uploaded to the cloud server 602) will be described in greater detail below.

Meter cloud system 600 supports several types of Meter data and/or features associated with interfacing with meters, including settings, uniqueness, time, and query, each of which will be described now.

Settings: Each meter includes settings associated to that meter. These settings will be queried by reporting, UI, and the uploader, to determine how to manipulate the Log Data. The supported meter data stored by Log Cloud includes, Meter Name (The display name of the meter), Meter Serial (The unique identifier of the physical meter), Meter Type (The hardware type of the meter), and Meter UID (The unique identifier of the meter in the cloud system).

Uniqueness: Each meter includes a unique identifier (UID) in the Log Cloud system, separate from the serial number of the meter. When meters are replaced in service, the serial number may change, but the UID will remain the same. This shall provide a continuity of measured data at a location.

Time: Meters are installed all across the world, and thus the Log Cloud system storage and representation of these timestamps is configured to support multiple timezones. Timezone support may be implemented at any layer, so long as it is self consistent. Meters times may be changed, which means duplicate timestamps may occur for different chronological data. Both records must be preserved. Historical records which occur during the rollback period of daylight savings time are preserved by the Log Cloud system as distinct values.

Query: Log Cloud system is configured to provide a query to read the settings for each meter. The Log Cloud system is also configured to provide a query to list all meters which the executing user has access to.

Historical Logs and Historical Data implementation within the meter cloud system 600 will now be described.

Historical data includes a time series set of recorded data, organized by channel, and, in some embodiments, recorded at a specific interval. The supported channels may include one or more of:

Voltage AN
Voltage BN
Voltage CN
Voltage AB
Voltage BC
Voltage CA
IA
IB
IC
Frequency
Watts Total
VAR Total
VA Total
Power Factor
Interval Energy WattHr Received
Interval Energy WattHr Delivered
Interval Energy VARHr Received
Interval Energy VARHr Delivered
Interval Energy VAHr
Watts Positive Max Demand Watts Negative Max Demand
VARs Positive Max Demand
VARs Negative Max Demand
VA Max Demand
Power Factor Positive Max Demand
Power Factor Negative Max Demand
Voltage A % THD
Voltage B % THD
Voltage C % THD
Current A % THD
Current B % THD
Current C % THD It is to be appreciated that meter cloud system 600 is configured to support an increase in the set of channels supported to accommodate for future developments. In some embodiments, all meters will upload a similar set of channels. Channels may be at different logging intervals. For example, voltage may be every 1 minute, and energy every 5 minutes. In some embodiments, an arbitrary sub-set of the supported channels may be uploaded from a meter, as not every meter will be configured to log every value.

With respect to data uploaded to the cloud server 602, no assumptions should be made about the order of channel data uploaded. For example, the meter cloud system is designed to support various changing upload scenarios: Data may be uploaded in time sequence order, but need not be. Channels for a specific time range may be uploaded in the same post, but need not be. The interval between data uploads may be around one day, but may be much slower (1 month), or much faster (15 minutes). Channels may be uploaded separately. Channels may be uploaded together. Data may be uploaded in pages, repeatedly posting to cover large ranges of time. The meter cloud system 600 is configured such that each page will be an independent post of data, fully self-consistent, and include all details necessary to store the included data. The cloud server 602 is configured such that separate channels may be uploaded in separate pages, as it cannot guaranteed that all data for all channels will be available at the time of the upload for a specified point in time.

The cloud server 602 may be configured to implement a predetermined upload format. For example, an exemplary upload format is shown below:

```
{
  apikey: "~~~~",
  meter_uid: "c4add118-b187-4d21-9813-d25bffdb6083",
  channels: [
    {chan_key:"reading.voltage.an"},
    {chan_key:"reading.voltage.bn"},
    {chan_key:"reading.voltage.cn"}
  ],
  time_first: 1493590000000,
  time_last: 1493710000000,
  records: [
    [1493590000000,120.442184,119.7983875,119.8013317],
    [1493600000000,120.4224738,NaN, 120.4119957],
    [1493610000000,120.1290346,119.5067033,119.8153032],
    ...
  ]
}
```

The predetermined upload format is a format that associates a timestamp with one or more channel values. The format is selected such that the format can be generated by an embedded device, thus complicated and proprietary communications stacks are avoided in the making the format selection. The upload format is selected such that the format can easily be transmitted over TCP and through a corporate firewall with minimum configuration on the part of IT. The upload format is selected such that it supports 'empty' values, positions in the data array which are not filled in, and do not need to be stored in the server. In one embodiment, the format is configured such that 'empty' values are not represented by a valid value, such as zero. In this embodiment, where a value is used, a invalid number is used, such as NaN.

Limits: The cloud server 602 makes certain assumptions about the data being uploaded in Historical records. For example, it is assumed that Historical records shall be logged no faster than at One Minute intervals. If the recorded data is faster, the uploader will reduce the data to one minute intervals. Interval Energy computation period is configured as the logging interval.

All Historical values include the following formatting conditions: (1) All values shall be formatted as primary; (2) All values shall be formatted as doubles; (3) % values shall be formatted as 1=100%.

Cloud server 602 is configured with several storage features with respect to Historical data. For example, in one embodiment, Historical data is stored according to one or more of the following conditions:

each recorded value is associated with a timestamp. A single instance of multiple channels may be associated with a single timestamp
Historical data is stored for at least 6 months
From 6 months to a year, the time frequency of the data can be reduced to 15 minutes.
From 1 year to 2 years, the time frequency of the data can be reduced to 1 hour.
Interval Energy cannot have its time frequency reduced. Interval Energy data must be replaced with aggregated data over the period it was reduced.
Long term full resolution storage should be provided in a compressed, size reduced format. Long term full resolution storage may be stored in a slow to access location and format, such as raw binary files. Queries will be for blocks of data. Data will be used for long term reports and analysis.

The cloud server 602 implements the following settings with respect to the Historical data:

Scaled Energy Settings—These settings describe how the energy should be formatted to provide consistency across softwares. For example, with scaled energy, we may have a watthour value of 146789456 Wh, but the setting says to display it as 146.78 MWh, or 000146.78 MWh. This format must be consistent between all places that you can view the meter's settings
CTPT Ratios—Specifies the ratio and fullscale of Voltage and Current
Hookup—Specifies what hookup type the meter is configured for, which is used to determine which phase values are valid and useful.

The cloud server 602 is configured to support sending/receiving several queries with respect to Historical data. Query speed for large ranges of time is of paramount importance. Therefore, in one embodiment, the system is configured such that multiple channels are queried in one session. Multiple channels may be requested in one query. In one embodiment, the system is configured such that multiple months may be queried in one session. Long ranges of time may be requested in a single query. In one embodiment, supports a query which lists all channels recorded for a meter. In another embodiment, the system supports a query which gets the time range for each channel of a meter. The end time of each channel may be used by the uploader to determine what data needs to be uploaded.

Waveform Logs and Waveform Data implementation within the cloud system 600 will now be described.

As described above, Waveform Logs include waveform recording events which are triggered by monitored conditions, such as a surge in voltage. When such an event occurs and is detected, the meter is triggered to record the individual samples which make up the monitored readings, along with the trigger information, and logs this in a waveform recording. Multiple channels are recorded, as well as the samples for cycles before and after the event. The shape of this waveform is later used for quality analysis of the event.

The cloud system 600 is configured to support at least the following channels in any waveform recording, though not required for every recording:

Volts AN
Volts BN
Volts CN
Volts AB
Volts BC
Volts CA
IA
IB
IC
Digital Inputs 0-7

The triggers for recording waveform recording include:

Sag—A sag is when the measured value drops too low. Sags apply to Current and Voltage channels.

Surge—A surge is when the measured value goes too high. Surges apply to Current and Voltage channels.

Input—An input trigger is a waveform capture that occurs because one of the digital inputs changed state.

Manual Capture—The user triggered a capture of the waveform. A manual capture is not associated with any channel, and has no return to normal event.

Normal—A return to normal trigger occurs when the exception condition, that triggered the original event, ends. Also known as an event end, such as 'Sag End', or 'Surge End'.

The cloud system 600 may be configured such that waveform recordings are uploaded one recording at a time. The uploads for waveform recordings may be in a predetermined format. An exemplary predetermined format for waveform recording uploads is shown below:

{
"header": {
  "start_time":1476702701196,
  "end_time":1476702702192
  },
"trigger":{
  "freq":58.348,
  "Van":7119.540,
  "Vbn":14336.721,
  "Vcn":14593.935,
  "Vab":18904.328,
  "Vbc":25040.207,
  "Vca":20157.926,
  "Vaux":14631.782,
  "Ia":5044.235,
  "Ib":4068.405,
  "Ic":6035.858,
  "Ix":4996.338,
  "Imeasure":756.134,
  "sample_interval_ms":0.3906250,
  "trigger_time": 1476702701250,
  "waveform_trigger":["Van=Sag_start", "Van-Surge_end",...,null]
  }
"sample":{
  "digin":[[1,1,1,1,1,1,1,1],...], -continued "Ia":[−4984.039,...],
  "Ib":[5443.298,...],
  "Ic":[−2154.510,...],
  "laux": [52867.188,...],
  "Van_Vab":[−10210.957,...],
  "Vbn_Vbc":[10187.402,...],
  "Vcn_Vca":[10387.617,...],
  "Vaux":[0.000,...]
  }
}

The predetermined waveform record upload format may include the following information: Trigger Cause, Trigger Time, Recording Start Time, Time per sample, Total duration, Samples per cycle, List of samples per channel, List of RMS values for the cycle at the time of the trigger. In some embodiments, the time resolution is at least 1 ms. In some embodiments, the time resolution is at least 100 μs. A time need not be associated with each sample, as the time of the sample can be computed from the time of the start of the capture, and the time per sample. In one embodiment, the cloud system is configured such that Analog Channels (Voltage, Current) are encoded as arrays of doubles in primary and Digital Channels (Digital Inputs) are encoded as arrays of arrays of 0s and 1s, representing the binary state nature of digital inputs. In the cloud system, the Trigger block describes the data structure of the information during the cycle of the trigger, including RMS values, sample times, and any triggers that occurred during. The "waveform_trigger" in the exemplary predetermined format shown above is a list of triggers that occurred during the triggering cycle and is the list of triggers for this waveform recording.

The storage within cloud system 600 of waveform records is such that waveform recordings are quickly accessible for at least a predetermined period of time (e.g., 1 month) and slower access is acceptable for waveform recordings that are at least a second predetermined period of time old (e.g., 1 year old). Waveform records older than the second predetermined period of time (e.g., a year old) are stored in long term cold storage for analysis purposes.

Limiters: The cloud server 602 makes certain assumptions about the data being uploaded. For example, it is assumed that there shall be no more than 2048 samples per channel per recording. If there are more than 2048 samples per channel per recording (or whether the data received exceeds any other predetermined limit), the software on cloud server 602 will attempt to truncate the recording (or other type of data received) to one cycle before the trigger, and as many after as available. Another assumption is that a sample rate of up to 256 samples per cycle shall be supported. If the sample rate is higher, the software will attempt to down sample the recording to 256 samples per cycle. Another assumption is that the number of waveform recordings in a given period of time shall be limited. For example, in one embodiment, the following limits are implemented: (1) No more than 1 recording per second; (2) No more than 5 recordings per minute; (3) No more than 25 recordings per hour; (4) No more than 50 recordings per day.

The cloud system 600 implements the following settings with respect to the waveform records: Nominal Frequency, CTPT Ratio, Current Class, Fullscales.

The cloud system 600 is configured to send/receive a query to list all recordings during a specified period of time. Responsive to the query the system returns a list including the following for each record:

Timestamp

Triggers

The cloud system 600 is configured to send/receive a query to read back a single waveform recording. The format of the response may be similar to the upload format. The format may be a format easily usable in JavaScript for rendering on a UI. The query will use information from the list query to determine which recording to return.

System Event Logs and System Event Data implementation within the cloud system 600 will now be described.

System Events include values, where the following field may be recorded: Time, Event Code, Description. The event types may include, but not me be limited to, Programmable Settings Change Device power loss Device reset Time changed Firmware changed Log reset Energy reset Max/Min reset User login User configuration change Error reporting In one embodiment, System Events may be uploaded in a predetermined upload format. An exemplary predetermined upload format for System Events is shown below:

```
{
"header":[
    "time",
    "event_type",
    "event_subtype",
    "description",
"records":[
    [1482255759160,1,1,"device power off"],
  [1482255765000,1,1,"device power off"],
    [1482395650360,2,1,"update programmable setting"],
    ...,[ ]],
"time_first":1482255759160,
"time_last":1482395650360,
]}
```

The predetermined upload format for System Events is selected such that the format associates a single event with a timestamp and multiple events may have the same timestamp.

Limits: The cloud system makes certain assumptions about the data being uploaded in System Events. For example, it is assumed that Log Retrieval Events will not be uploaded.

The cloud System is configured to support sending/receiving several queries with respect to System Events. For example, the system supports a query which provides all events for a specified time range. A specifier for specific event codes to return may be included in the query. The format of the query response may be the same proposed upload format above. The format is configured to be easily readable by JavaScript for listing on a UI.

Limit Logs and Limit Event Data implementation within the cloud system will now be described.

Limit Logs include limit events which are recorded whenever a reading channel (the same set of channels as used in historical data) exceeds a configured limit, such as voltage going above 140v or below 72v. When the reading returns to within a predetermined limit, the end of the event is recorded. This allows the computation of a start time and duration of the event, as well as the worst excursion value for the event.

The values that may be included in a limit event include:

Start time

Duration

Exception Channel

Exception Type

Worst case exception value

Worst case exception percentage

In one embodiment, limit events may be uploaded in a predetermined upload format. An exemplary predetermined upload format for limit events is shown below:

```
{
  "header":["start_time,"duration","channel","limit_id",
  "exception_type","except_value","except_percent","limit_threshold"],
  "records":[
    [1477326041773,null,"readings.voltage.an",0,0,40.23,49.84,80],
    [1477326040273,1.412,
    "readings.voltage.an",1,1,148.54, 122.72,120]
    ]
  "time_first":1482255759160,
  "time_last":1482395650360,
}
```

Limits: The cloud system makes certain assumptions about the data being uploaded in limit events. For example, it is assumed that only paired limit events shall be uploaded. Unpaired records shall be uploaded when they become paired. Unpaired start records shall be uploaded if no possible end unpaired record is possible. It is also assumed that the number of PQ records in a given period of time shall be limited to (1) No more than 2 records per second; (2) No more than records per minute; (3) No more than 50 records per hour; (4) No more than 100 records per day.

The cloud system is configured to support sending/receiving several queries with respect to Limit Events. For example, the system supports a query which provides all events for a specified time range. A specifier for specific limits to return may be included in the query. The format of the query response may be the same proposed upload format above. The format is configured to be easily readable by JavaScript for listing on a UI.

The cloud system may support Fullscales settings with respect to limit events.

Power Quality Log and Limit Quality Event implementation within the cloud system will now be described.

PQ event logs include PQ events, which are recorded whenever a high speed reading (the same set of channels as used in waveform data) exceeds a configured or predetermined limit, such as the 1 cycle voltage an exceeding 200v. When the reading returns to within the predetermined limit, the end of the event is recorded. This allows the computation of a start time and duration of the event, as well as the worst excursion value for the event.

The values that may be included in a PQ event include:

Start time

Duration

Exception Type

Worst case exception value

Worst case exception percentage

In one embodiment, PQ events may be uploaded in a predetermined upload format. An exemplary predetermined upload format for PQ events is shown below:

```
{
  "header":["start_time,"duration","channel","exception_type",
  "except_value","except_percent","pq_threshold"],
  "records":[
    [1477326041773,null,"readings.voltage.an",0,40.23,49.84,80],
    [1477326040273,1.412,"readings.voltage.an",1,148.54,122.72,120]
    ]
  "time_first":1482255759160,
  "time_last":1482395650360,
}
```

start_time:[long] Time the pq event started (exception was first detected). Value as milliseconds since 1970.

duration:[double] The duration of the pq event in seconds. Will be null if no end event was recorded.

channel:[string] The key of the channel the pq event occurred on. PQ events will only occur on the following channels.

readings.voltage.an
readings.voltage.bn
readings.voltage.cn
readings.voltage.ab
readings.voltage.bc
readings.voltage.ca
readings.voltage.aux
readings.current.a
readings.current.b
readings.current.c
readings.current.n exception_type:[int] The type of exception that triggered the PQ event.

| code | event |
|---|---|
| 0 | sag |
| 1 | surge |

except_value:[double] The worst observed value on the specified channel during the event.

except_percent:[double] Value in percentage of fullscale, of the worst observed value on the specified channel during the event.

pq_threshold:[double] Threshold setting for the specified channel at the time of the event.

Limits: The cloud system makes certain assumptions about the data being uploaded in PQ events. For example, it is assumed that only paired events shall be uploaded. Unpaired records shall be uploaded when they become paired. This means that PQ records may be uploaded out of order. Unpaired start records shall be uploaded if no possible end unpaired record is possible. Another assumption is that the number of PQ records in a given period of time shall include predetermined limits such that (1) No more than 10 records per second; (2) No more than 30 records per minute; (3) No more than 100 records per hour; (4) No more than 200 records per day.

The cloud system is configured to support sending/receiving several queries with respect to PQ Events. For example, the system supports a query which provides all events for a specified time range. A specifier for specific limits to return shall be included in the query. The format of the query response may be the same proposed upload format above. The format is configured to be easily readable by JavaScript for listing on a UI.

The cloud system may support Fullscales settings with respect to PQ events.

The cloud system is configured with several security features. The cloud system is configured such that querying data and configuring the system is only allowed by authorized user. The requirement for user authorization is enforced at the API layer and not the UI layer. The cloud server 602 is further configured such that all user and meters are organized under customers and a user may be associated with one or more meters. The user association may be configured such that a user may only be associated with meters for the customer they belong to and/or a user may only query data for meters they are associated with. The cloud server 602 is configured to provide a mechanism to prevent data from being uploaded from unauthorized users for a meter. In one embodiment, the cloud system is configured such that at least one user is designated as the administrator for a customer. The cloud system is configured such that the customer administrator is able to configure all the meters for the customer, enable or disable the usage of a meter in the cloud for billing purposes, delete data associated with a meter, and/or view the data for all meters for a customer. In on embodiment, the cloud system is configured such that at least one user is designated as the administrator for the system. The cloud system is configured such that the system administrator has access to configure and view all meters for all customer, to configure and view all users for all customers, and to configure and view all customers.

The cloud system 600 is configured to support the increasing number of meters deployed world-wide (e.g., thousands just at one customer). The cloud system is configured to be easily expandable and scalable by being designed such that minimal reconfiguration to increase the number of supported meters is required and minimal performance impact occurs with increasing quantities of data. Each meter in cloud system 600 is associated to a specific customer.

Each meter in the cloud system 600 is configured to employ several storage requirements to make the meter cloud system easily scalable and functional. In one embodiment, each meter in meter cloud system is configured to record at least 30 channels of historical data, at least 15 minute intervals for historical data at least 10 waveform records per day, at least 20 limit records per day, at least 20 system event records per day, at least 50 PQ event records per day. In one embodiment, each meter is configured to store at least 6 months of recorded data. The storage each meter employs is optimized for fast query of large ranges of time series data.

The meter cloud system is designed to store the data of tens of thousands of meters, including historical channels, system events, PQ, limits, and waveforms. However, this storage is limited, and some configurations can lead to hundreds of thousands of these records in a single day, which if left running for too long, would quickly exceed the capability of the storage. While there are some circumstances where this data is legitimate, in most cases this is poor configuration, or only for debug purposes.

To counter this, the meter cloud system 600 limits the number of logs and/or records that can be uploaded in any particular period of time. However, without good feedback to the user that data may be missing from the data they view on the website, the user would only think that the system is broken or some type of error occurred.

Figure 28:
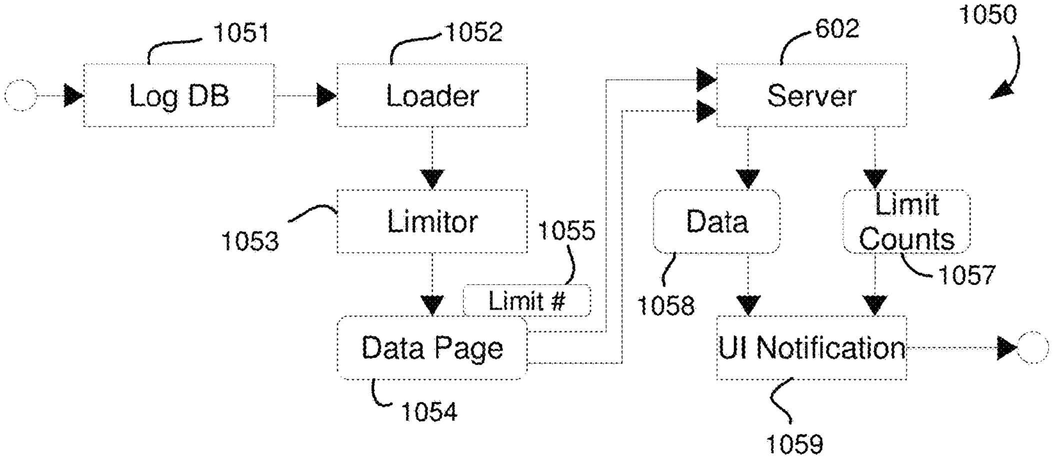
FIG. 28 is a flow diagram of a limitor notification in accordance with the present disclosure.

A Limitor Notification is provided, which is a propagation of the counts and times of skipped data, up to the cloud server 602, so that the website can display error count notifications to the user. An overview of the Limitor Notification module 1050 is shown in FIG. 28 in accordance with the present disclosure. Module 1050 may be stored in meter manager 614, server 602, and/or any one of meters 604, 606 and executed by one or more processors in each of 614, 602, 604, 606.

When the meter log data is loaded by Loader 1052 from meter log database 1051, it is passed through a Limitor filter 1053, which keeps track of various conditions, and if the data violates that condition, it is either modified or dropped, i.e., excluded from being uploaded. For example, in one implementation, those conditions could include the number of records in a single hour. As another example, waveform records could be limited to only 20 per day. As another example, waveform records could be modified to use a lower sample rate, or less cycles. As another example, historical records could be limited to at the fastest every 1 minute. A count of limit violations each day, is kept per log.

All log data which passes the Limitor 1053 are included in a Data Page 1054, which includes Limit Information 1055 about what was modified, which will detail the number of records skipped during the period of that data page. This package is then uploaded to cloud server 602, which splits and stores the information separately as Data 1058, and Limit Counts 1057. UI notification 1059 is then displayed to the user whenever any data 1058 has corresponding Limit Counts 1057. When displaying a range of log data, whether it be historical, system events, or pq/waveform, the UI notification 1059 displays an indication, e.g., an exclamation mark, if the limitor count exceeds 0. Additionally, queries for the log data will also include the exception count for the range in question.

The Limitor Notification of the present disclosure provides for the following features: detect and count daily log record limitor exceeded conditions, and upload those counts to the server; store the limitor exceeded counts on the server; and display those counts to the user, for the meter, log, and time range they are currently viewing. It is to be appreciated that the associated meter is not modified, nor the local meter log database, if the upload is affected by the limitor. The limitor only modifies what is uploaded to the cloud server 602. The meter log data that is not uploaded may be accessed from the meter, at a later time via various methods.

In one embodiment, cloud server 602 is configured to determine if meter data (e.g., log data) pushed from meters 604, 606 and/or meter manager 614 to cloud server 602 exceeds a predetermined limit (e.g., in data size) and, if the predetermined limit is exceeded, server 602 excludes the meter data from being stored in at least one database of server 602 or a database server 602 is in communication with. In one embodiment, server 602 is configured to store only a predetermined portion of the meter data (e.g., a portion at or below the predetermined limit) in the database if server 602 determines the meter data is above the predetermined limit. Server 602 is configured to record a count and associated time of day when the meter data was excluded, such that the count and associated time of day of the exclusion of data can be presented to the user via a web page (e.g., provided to client device 608).

Figure 29:
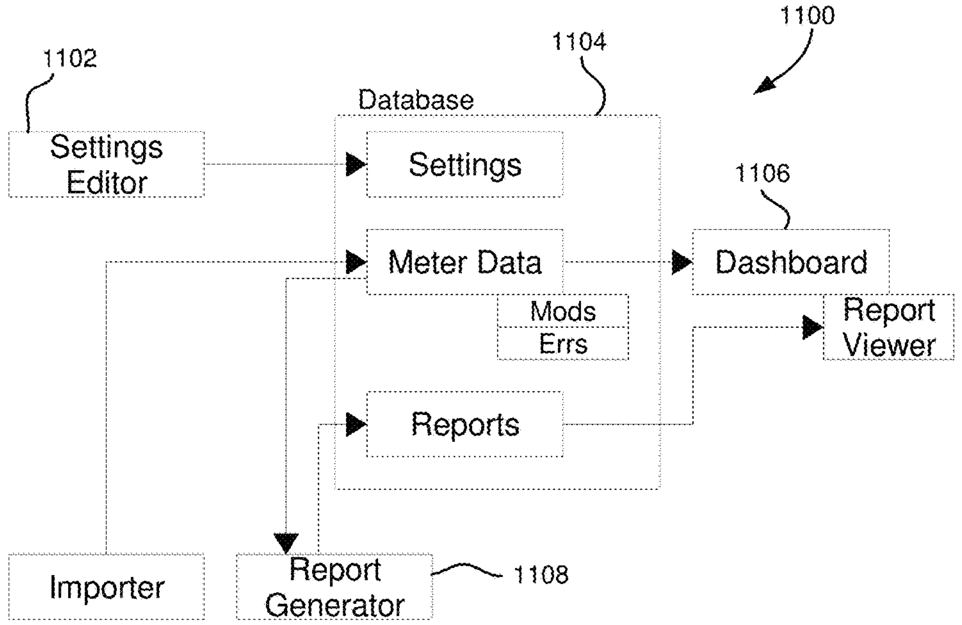
FIG. 29 illustrates an energy billing module in accordance with the present disclosure.

In one embodiment of the present disclosure, the meter cloud server 602, includes an energy billing module 1100. The energy billing module 1100 is configured to provide bill analysis and cost report generation for a plurality of IEDs coupled to the meter cloud system of the present disclosure using energy data uploaded to the meter cloud server. The block diagram of the energy billing module 1100 is shown in FIG. 29 in accordance with the present disclosure.

Energy billing module 1100 includes four components or modules:

(1) Settings Editor 1102: This module configures various parameters and features of energy billing module, such as, but not limited to, rate structures, reports, locations, etc.

(2) Internal Log Data 1104—This module includes one or more memories configured to store energy usage data received by IEDs coupled to the Meter Cloud system of the present disclosure. The data stored may include meta information stored about the log data.

(3) Dashboard Viewer 1106—This module is a UI configured to generate and output for display a dashboard of log values stored in internal log data module. The dashboard viewer may further generate and output for display analysis (e.g., various trends, calculations, or other types of analytics) of the log values displayed.

(4) Reporting 1108—This module generates configurable CSV and PDF reports, for example, the reporting module may be configured with one or more modules for generating custom CSV files and PDF files, such as a custom CSV module, a usage trending PDF module (e.g., for generating a customized PDFs including usage trend information associated with the loads one or more IEDs are coupled to) and a bill PDF generator module (e.g., for generating customized PDFs including billing information associated with the loads one or more IEDs are coupled to).

In one embodiment, the log data is configured to enable a user to keeping track of invalid billing values and enable the user to enter in corrections (e.g., via user input to a UI of energy billing module) to existing data entries stored in log data module. In another embodiment, log data module may be configured to aggregate or organize data stored within log data module based on one or more characteristics or properties of the data stored. For example, in one embodiment, log data module may be configured to aggregate energy usage data values for all IEDs or meters at a specific location or a group of locations. Other characteristics or properties may include dates/times, groups of meters (regardless of locations), load types, etc.

In one embodiment, dashboard module 1106 is configured to generate summaries and analysis of energy values. The summaries and analysis generated may include:

Summed usage for the day
Comparison of usage for locations
Cost graph by hour/day (using the billing configuration)
Temperature logging and graphing in comparison to usage
Top demand lists Reporting generator or module 1108 is configured to generate fully configurable reports (e.g., according to user settings stored in settings editor). The reports may be generated on a schedule (once a day, month, etc.).

The data stored in log data module 1104 may be organized into Customers, Locations, and Meters. Customers are the top level, and contain a list of Locations. Each Location contains a list of Meters. Virtual Meters (e.g., data holders or containers) for each location aggregate the data for all the meters at a location. Software Usage Accumulation is performed on the Virtual Meters to provide previous and current usage values for Virtual Meters (e.g., summing the interval energy for all meters as a location and using the sum as a single value) to be used in Bills and Custom Reports. Meter data can be marked as negative, to subtract the usage from the Virtual Meter aggregation. It is to be appreciated that Temperature Data logged for each location may be used by dashboard module and provided in customized reports generated by reporting module.

In one embodiment, each meter or IED can load the data for a number of channels, mapping those data channels to billing commodities. Meters in energy billing module 1100 need not have a one-to-one mapping with actual physical meters. Imports can be performed by energy billing module 1100 from a CSV file, or multiple meters can be imported by energy billing module from a single physical meter's database.

In one embodiment, energy billing module 1100 is configured to automatically detect errors in meter data stored or received. The errors are flagged for user attention before bill are generated from that data. The meter data can be modified via user input to energy billing module to correct errors, and this is reflected in cost analysis and reports. However, the original value (i.e., the value flagged as being erroneous or incorrect) is retained, for auditing purposes.

Reporting generator or module 1108 is configured such that billing is applied to commodities, applying a configurable Rate Structure to the commodity data. Rate Structures include Fixed Charges, which are summary charges: including Tiered Rates, Peak Demand, Taxes, Flat Rates, and Coincidental Peak Demand. Rate Structures include Rate Charges, which are Time of Use based charges, configured using a perpetual calendar, and applied to the time of day the usage occurs within. The billing may be divided into separate time intervals, e.g., up to 12 seasons (or any other divisible time interval) to allow for separate rate charges at different times of year.

The energy billing module 1100 includes several features, which will be described below.

The energy billing module 1100 is configured to use energy data imported into the meter cloud server 602 to generate cost dashboards and reports. The imported data may be marked by energy billing module 1100 to generate cost dashboards and reports. The data channels may be marked by the energy billing module 1100 as negative to subtract from location usage aggregations performed by reporting module. For example, a user may mark or apply a negative to a channel so these values may be removed from the sum. The energy billing module may further be configured to analyze energy data for errors that would prevent generating a correct bill. If one or more errors are detected by energy billing module, one or more users may be provided with a notification that the error(s) detected need correcting.

The energy billing module 1100 includes a settings configuration module having an interface (e.g., viewable via dashboard module) for the configuration of perpetual rate structure to be applied by energy billing module to locations for cost analysis and report generation. Reporting module 1108 is configured to automatically generate Monthly Bill Reports for each location that has a rate structure configured, and email (or otherwise provide) to the configured users. Reporting module 1108 is configured to automatically generate Monthly Executive Summary Usage Reports for each location, and email (or otherwise provide) to the configured users. The energy billing module 1100 includes an interface (e.g., dashboard module 1106) for the configuration of custom usage reports). Reporting module is configured to automatically generate Custom Usage Reports, and email (or otherwise provide) the generated reports to the configured users.

Figure 36:
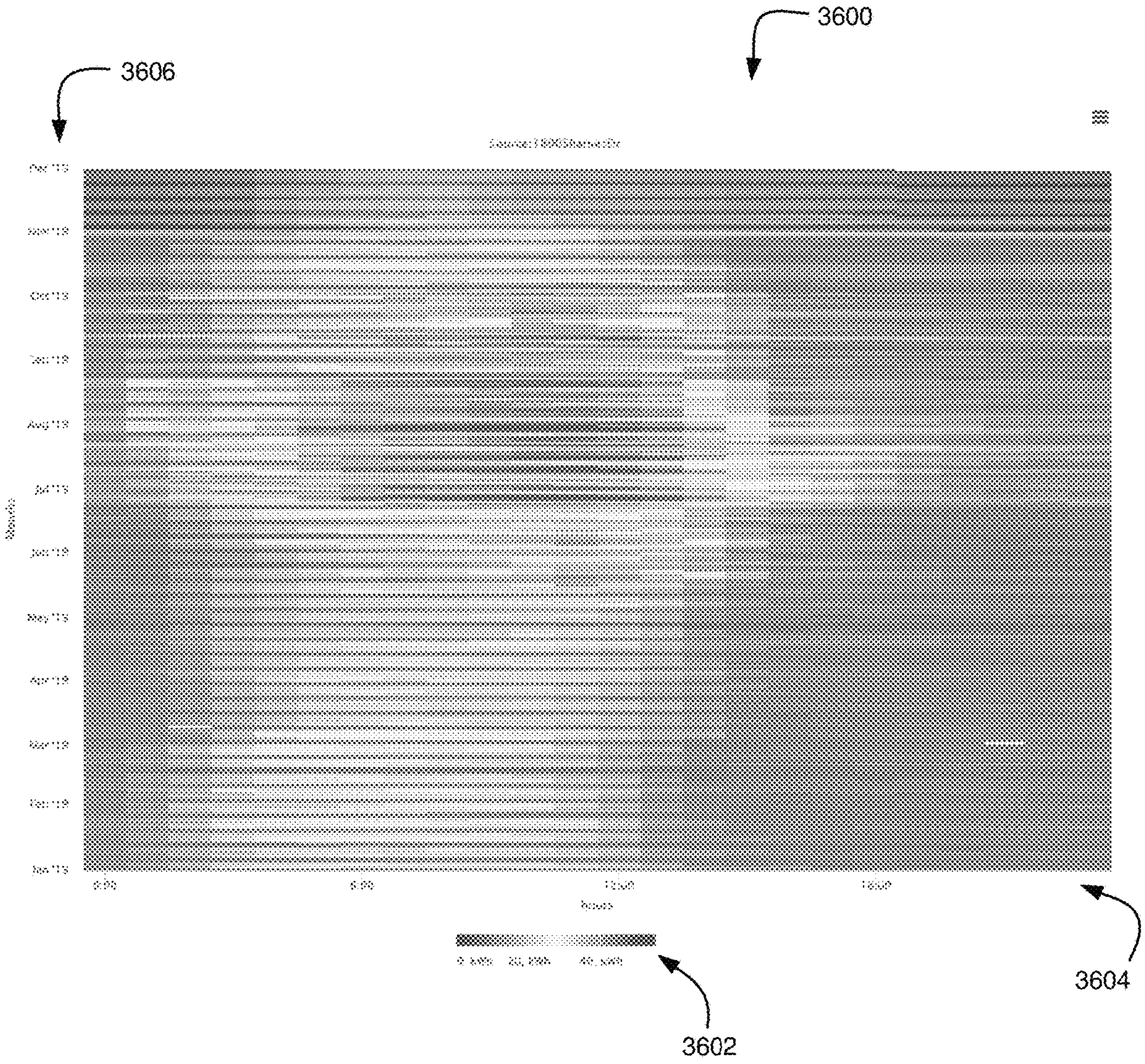
FIG. 36 illustrates a heatmap of energy usage for a meter in accordance with the present disclosure.

The dashboard module 1106 is configured to show (via an output to a display) the energy usage for each meter and the summary energy usage for each location. The dashboard module 1106 is configured to show the cost breakdown for each meter and location (using the rate structure for the location), weather information logging on an hourly basis for each location, and notifications when usage and cost exceeds a configured limit within a period. In one embodiment, the energy usage for a particular meter over an adjustable period of time may be illustrated as a heatmap, as shown in FIG. 36. In this embodiment, a scale 3602 of varying colors is associated with varying levels of usage and the heatmap 3600 includes an x-axis 3604 indicating time of day and a y-axis 3606 indicating days of the year. Usage by color is then displayed on the heatmap 3600 in the appropriate location, e.g., 8:00 am on Jul. 1, 2019. The heatmap may predict the usage for a predetermined number of days out from the current date and will show the predicted usage in the heatmap.

Energy billing module 1100 is configured to be useful in a variety of use cases, each of which are described in greater detail below.

Cost Trending: Report module 1108 is configured to generate reports including cost analysis and cost trending (e.g., forecasting future energy costs based on current energy consumption data). The cost analysis features may be used to compare the usage between locations (such as buildings on a campus), and over time, to provide a sense of competition, and incentive to reduce usage. The dashboard module 1106 may be used to view the analyzed data to compare the usage across all locations, trends of individual locations over time, usage analysis reports comparing the qualities and costs of all the locations, and alarms when usage exceeds configured limits. In these scenarios, there may be many users that would login under a read only role, to view their dashboard information in dashboard module. Such users often prefer to see additional usage meta-analysis, such as usage per day, average peak times, carbon footprint, temperature comparisons, and track commodities other than just electricity, such as BTU's and gallons of steam. Each of the usage meta-analysis data described above may be generated by reporting module and displayed in dashboard module 1106 to be viewed by one or more users.

Sub-Metering: Reporting module 1108 is configured to provide several features that may be useful in sub-metering contexts (e.g., Malls, office buildings, etc.). For example, some property managers, which sub-let out parts of buildings (such as malls), or entire buildings (such as office buildings), use the billing features of reporting module 1108 to generate cost invoices, that are forwarded by energy billing module to the renter to specify the portion of the energy usage that the renter is responsible. In addition to costing, these users often want to see daily usage reports emailed for tracking purposes. The energy billing module 1100 is configured to provide the reports generated (including daily usage reports) to one or more users via email or any other protocol via one or more communication networks.

Event Hosting: Reporting module 1108 is configured to provide several features that may be useful in event hosing contexts (Corporate Events, Concerts, etc.) For example, a sub-category of property managers, these users sub-let out their property for short periods of time: sometimes a couple days, sometimes only a couple hours. They need to generate a cost invoice for specific short periods of time, with changing customers receiving the invoice. Reporting module is configured to provide reports for event hosting contexts by generating reports including cost invoices for specific short periods of time for changing customers. The reports including the invoices are then sent to the desired customers (e.g., the customers being billed for the short periods of time of energy usage).

External Billing Package: Reporting module 1108 is configured to provide several features that may be useful in event hosing contexts (Large Companies, etc.) For example, some companies have their own billing packages that they use, but that require usage values to be entered in for costing and analysis. Reporting module 1108 is configured to enable these users to use a custom reports module to generate a monthly report that they can import.

The cloud system 600 integrates an enabled usage-based payment or licensing system in the cloud server 602, with an internal cloud management software. The act of billing and account management will be handled by an automatic billing system. The automated billing system will use the cloud management software to enable the meters a customer desires. At the beginning of each year, or when a user's account is first enabled, a usage report will be generated that can be fed into the software that an accounting system uses for invoices. If the customer does not pay the yearly invoice by the expiration date, the meter will automatically be disabled. After the customer's account has been set up, the number of meters a customer has enabled can be increased or decreased.

Figure 30:
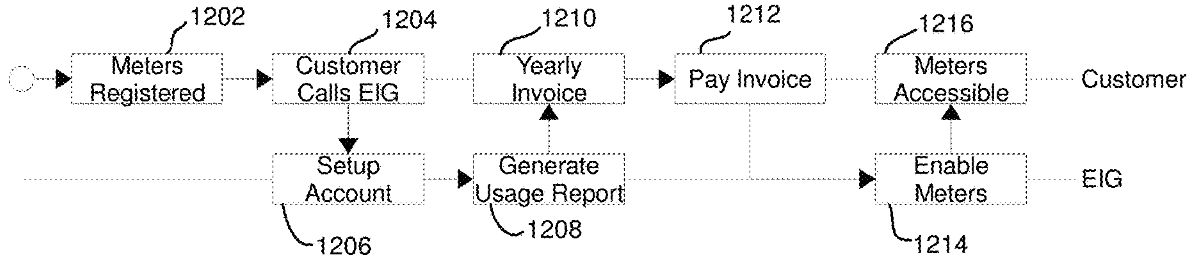
FIG. 30 is a payment system for customer usage flow diagram in accordance with the present disclosure.

Referring to FIG. 30, a flow diagram for the usage-based payment system of cloud server 602 is shown in accordance with the present disclosure. The flow diagram of FIG. 30 includes the following steps detailed below:

- Meters Registered 1202: Meters are registered from meter manager module, or directly from the meter itself. However, at this point, the meter is not enabled, and the user cannot access the data that has been uploaded.
- Customer Calls System Admin 1204: To enable access to meters, the customer contacts a system administrator, e.g., an entity that implemented the cloud system, to set up an Energy Cloud Billing Account. This may be through, for example, an e-mail, webpage interface, etc.
- Setup Account 1206: The accounting system works out the details of the customer's account with the customer.
- Enable Meters 1214: Once the customer's account has been set up, the system enables the meters requested by the customer.
- Meters Accessible 1216: Once enabled, the customer now has the ability to access the data of their meters.
- Generate Usage Report 1208: At the end of every year, the accounting system will go into the cloud management software, and generate a usage report for each customer. From this usage report, accounting will generate an invoice for the customers usage for the next year.
- Invoice 1210: The invoice previously generated will then be sent to the customer for payment (121). If they do not pay, meters will automatically be disabled at the end of the expiration period.

The accounting system enables the following features: Certificates used to ensure security between software and server; ability to enable and disable meters on a per customer basis; ability for tech support to review and manage customers, users, and meters; ability to query and generate monthly usage reports for each customer, for accounting billing purposes, on demand. The user may request any month at any time; process document provided for accounting and tech support for how to manage billing.

It is to be appreciated that each meter will have an expire date, and charges will be on the number of months in a year the meter shall be enabled for. Customers will pay for the upcoming months they plan on using. Charges will be prorated for the remainder of the month in question, since enable. Meters will automatically be disabled if the expiration period elapses, without being renewed. Customers will be billed via an invoice from the accounting system, which bases the charge off a usage report generated from the management software. The expiration date of each meter will be presented in the management software, so that accounting can determine when to ask customers for renewals. An upcoming renewals feature will list the renewals that are necessary in the next month.

In general, there are two types of API calls, which are restricted by who is capable of calling them, and the results when they are called by different levels users. The at least two user levels are:

- Admin—All of the following api's should only be able to be called by a logged in system admin user.
- General—The following api's can be called by anyone, but when called as system admin, should provide access to meters under all customers.

Below are exemplary commands with the user level in brackets:

Set Meter Expiration Date [admin]

Set the expiration date for the specified meter. If the expiration date is blank, then the date is cleared, and the meter is disabled. Alternatively, a low date can be used for disable.

List Meters [general]

Modify to include the expiration date for the meter. If in the past, blank, or missing, the meter is not enabled.

Modify to return all meters for all customers, including ones not registered to a customer, for the system admin account.

List Users [general]

Lists users, and their information.

For general users, returns only their own user.

For customer admin users, returns the list of all users for this customer.

For system admin users, returns the list of all users for all customers.

List Facilities [general]

Lists facilities, and their information.

For general users, returns only the facilities they can access.

For customer admin users, returns the list of all facilities for this customer.

For system admin users, returns the list of all facilities for all customers.

List Customers [admin]

Lists all of the customers currently registered, and their information. Note that the customer object is just the user object of the admin user, with extended fields, and that {uid} is both the {user_uid} of the admin user, and the {cust_uid} of the customer, and will match up as such in other api structures.

Assign Meter to Customer [general]

Assigns or removes a meter to/from a customer.

Update Customer Info

Updates the configurable customer info fields, including:

- Company name
- Company contact (first/last)
- Company contact email
- Company contact phone Delete Customer

- Deletes the customer, and all their facilities, from the system.

Enable/Disable User

Enables/Disables the ability for a user to login. When disabled, a user will be presented with an account disabled page.

Modify User Roles

Roles determine what a user is allowed to do. This adds and removes a set of roles allowed by the specified user. Note, it is added if it doesn't exist already. If a tag is not specified to add, and the user already has that role, then it is not removed from the user. Similar for remove.

ADMIN

ROLECREATOR (custom)

Approve User

Updates the user settings by switching them from pending to approved.

Add User

Adds the specified user from the system. Returns the new uid of the user.

Delete User

Removes the specified user from the system.

Update User

Updates the user settings with the specified settings. If a setting is not specified, it is not changed.

email name facilities access list

Reset User Password

Resets the user password.

Delete Facility

Deletes the specified facility. This will remove the facility from each user access, and all meters at this facility will no longer have an assigned facility.

Update Facility

Update the info for the specified facility. If a setting is not specified, it is not changed.

name address

Clear Meter Data

Clears all the log data for the specified meter and log.

Move Meter to Facility

Moves the meter to the specified facility, removing it from a previous one if necessary.

Figure 31:
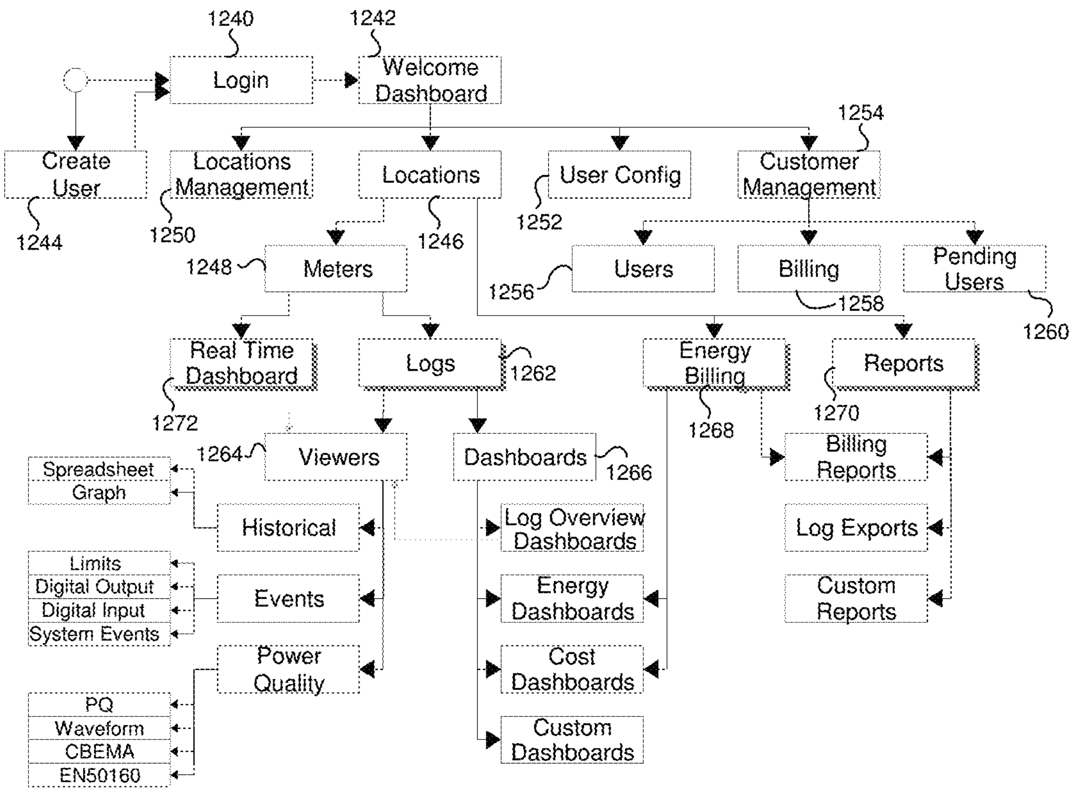
FIG. 31 illustrates an overview of a user interface for the cloud-based meter management system in accordance with the present disclosure.

The meter cloud system 600 includes a meter cloud user interface (UI) configured to enable a user to view, navigate, configure, and interact with the various components of Meter Cloud. FIG. 31 illustrates an overview of the meter cloud user interface in accordance with the present disclosure, where the various components will be described below:

Login and Welcome: Entrance screen for the software. Allows the user to login 1240, or create a new user. Once the user has logged in, they are greeted with the Welcome Dashboard 1242, which displays new information and links to all the major functionality of the software.

Create User 1244: Allows the user to create a new User. After entering user information, they are given the option to create a new Customer, or to apply to join an existing Customer, by entering that Customer's Key.

Login 1240: Allows an existing user to login to the Meter Cloud UI.

Welcome Dashboard 1242: Once logged in, the Welcome Dashboard 1242 displays useful information to the user, such as their locations, summary dashboards, recent notifications, and navigation options for other management options.

Locations and Meters: Provides a list of the Locations and Meters that are accessible by the Current User.

Locations 1246: Lists all the Locations (Facilities) that are accessible by the Current User.

Meters 1248: Lists all the Meters which are available under the selected Location.

Locations Management 1250

Allows Enterprise Users to configure Locations and Meters, and search for new meters from the pool of unassigned ones.

User Configuration 1252

Allows a user to configure their own settings, such as contact information.

Customer Management 1254: Allows the Owner User to configure information about the Customer, including managing the list of users for the Customer, editing the billing information, and confirming pending users.

Customer Info: Configures the Customer Information, such as Customer name, address, and provides the Customer Key for distribution to prospective users.

Users 1256: Configures the list of users, including editing the locations a user has access to, and removing users.

Billing 1258: Only accessible to the Customer Owner, configures the billing information.

Pending Users 1260: Lists all users which are currently pending, and gives an Enterprise User the ability to approve or reject Pending Users.

Logs 1262: Displays log data for individual meters, including both drilldown log specifics, and overview and analysis dashboard displays.

Viewer 1264: Drilldown viewer for each of the individual logs. Provides both spreadsheet views for raw data values, and overview graphs.

Historical: The Historical Logs display trending data for the various data channels the meter records, based off of the time range and list of channels the user has selected.

Spreadsheets: Displays each channel selected in a grid, with the rows as time, and the columns as each channel. Because there may be a disjoint in time between different channels, some channels may be empty at some times.

Graphs: Displays each channel selected on a combined graph, plotting time versus value.

Events

Limits

Digital Output

Digital Input

System Events

Power Quality

PQ

Displays a list of PQ events by time, and indicates if any waveforms are linked to the PQ event. If a waveform is linked, then the user can jump to that waveform by clicking on it.

Waveform

Displays a list of Waveform events by time and triggering channel. Selecting a waveform displays the samples graph and details of that waveform.

CBEMA

Displays a CBEMA graph of the PQ events, which plots magnitude vs duration. Selecting a PQ event on the graph provides information about the PQ Event, and jumps the user to that event in the PQ Event list.

EN50160

Links to the EN50160 Report.

Dashboards 1266: Overview dashboard for the log data, providing quick glance graphs, summary values, and analyzed data views.

Log Overview: Provides overviews of each of the logs, including trends of common historical channels, CBEMA curves of PQ events, and counts of other events. The user can jump to the relevant log by selecting the full view or history of dashboard items.

Energy: Provides energy specific overviews and analysis, such as usage by day or month, comparison by location, month to month trends, and month to date usage.

Cost: Applies the Energy Billing cost configurations to provide cost overviews, such as the rate breakdown for a month, cost comparison between months, and month to date costs.

Custom: Allows the user to create a dashboard template from a set of dashboard types, such as trend, summary, or cost; and configure a number of parameters, such as source channels, meters, and time ranges; and add them to their dashboard screen.

Energy Billing 1268: Configuration, dashboards, and reports specific to providing the user with energy and cost management.

Configuration: Provides cost and rate structure configuration for each location.

Linked Dashboards: Links the cost and energy dashboards into one location.

Linked Reports: Links to the billing reports.

Reports 1270: Provides configuration and viewing for various reports a user can create automatically for their meters and locations.

Billing Reports

Log Exports

Custom Reports

Realtime Dashboard 1272: Provides a dashboard of (relatively) live values from meters. The user can jump to the logs for individual meters by selecting the history of any real time channel (if available).

Meter View

Location View

In one embodiment, the UI works from a drill-down, single meter, viewpoint; however, in other embodiments, the UI operates from a multi-device point of view.

FIG. 32 is a block diagram illustrating physical components of a computing device 1302, for example a client computing device (such as the web browser client described above), a server (such as meter cloud server 602), or any other computing device, with which examples of the present disclosure may be practiced. In a basic configuration, the computing device 1302 may include at least one processing unit 1304 and a system memory 1306. Depending on the configuration and type of computing device, the system memory 1306 may comprise, but is not limited to, volatile storage (e.g., random access memory), non-volatile storage (e.g., read-only memory), flash memory, or any combination of such memories. The system memory 1306 may include an operating system 1307 and one or more program modules 1308 suitable for running software programs/modules 1320 such as IO manager 1324, other utility 1326 and application 1328. As examples, system memory 1306 may store instructions for execution. Other examples of system memory 1306 may store data associated with applications. The operating system 1307, for example, may be suitable for controlling the operation of the computing device 1302. Furthermore, examples of the present disclosure may be practiced in conjunction with a graphics library, other operating systems, or any other application program and is not limited to any particular application or system. This basic configuration is illustrated in FIG. 33 by those components within a dashed line 1322. The computing device 1302 may have additional features or functionality. For example, the computing device 1302 may also include additional data storage devices (removable and/or non-removable) such as, for example, magnetic disks, optical disks, or tape. Such additional storage is illustrated in FIG. 33 by a removable storage device 1309 and a non-removable storage device 1310.

As stated above, a number of program modules and data files may be stored in the system memory 1306. While executing on the processing unit 1304, program modules 1308 (e.g., Input/Output (I/O) manager 1324, other utility 1326 and application 1328) may perform processes including, but not limited to, one or more of the stages of the operations described throughout this disclosure. For example, program modules 1308 may include energy billing module 1100, settings editor module 1102, internal log data module 1104, dashboard viewer module 1106, reporting module 1108, among others. Other program modules that may be used in accordance with examples of the present disclosure may include electronic mail and contacts applications, word processing applications, spreadsheet applications, database applications, slide presentation applications, drawing or computer-aided application programs, photo editing applications, authoring applications, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 33 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 1302 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the present disclosure may be practiced within a general purpose computer or in any other circuits or systems.

The computing device 1302 may also have one or more input device(s) 1312 such as a keyboard, a mouse, a pen, a sound input device, a device for voice input/recognition, a touch input device, etc. The output device(s) 1314 such as a display, speakers, a printer, etc. may also be included. The aforementioned devices are examples and others may be used. The computing device 1304 may include one or more communication connections 1316 allowing communications with other computing devices 1318 and/or meters/IEDs 1319. Examples of suitable communication connections 1316 include, but are not limited to, a network interface card; RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1306, the removable storage device 1309, and the non-removable storage device 1310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1302. Any such computer storage media may be part of the computing device 1302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is to be appreciated that the computing device 1320 may, in certain embodiments, be a mobile computing device, for example, a mobile telephone, a smart phone, a personal data assistant, a tablet personal computer, a phablet, a slate, a laptop computer, and the like, with which examples of the present disclosure may be practiced.

It is to be appreciated that the various features shown and described are interchangeable, that is a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A method of implementing a utility meter management system comprising:

communicating, via a meter server, with a plurality of meters through a network, wherein each meter of the plurality of meters includes a network interface;

maintaining a meter database having a meter identification number associated with each meter of the plurality of meters, wherein the meter database is in communication with the meter server;

assigning an electronic unique first customer key to a first customer group and storing the electronic unique first customer key in a key database in communication with the meter server;

associating one or more meters of the plurality of meters with the first customer group to form a digital set of first customer meters;

storing electronic information associated with the set of first customer meters;

providing, via a user interface, a user an option to register as a new customer group or to register with the first customer group;

authenticating the user to provide access to the first customer group if the user selects to register with the first customer group via the user interface; and providing access to the electronic information associated with the set of first customer meters if the user is authenticated with the first customer group.

2. The method of claim 1, wherein authenticating the user to provide access to the first customer group includes requesting the first customer key from the user.

3. The method of claim 1, wherein information associated with the first customer meters includes a meter identification (ID), ratio of current transformer to potential transformer (CT/PT ratio), energy scaling, and/or hookup information.

4. The method of claim 1, further comprising registering a first new meter with the meter server and generating a meter ID for the first new meter.

5. The method of claim 4, wherein registering the first new meter includes the server receiving a register meter API command from the first new meter over the network.

6. The method of claim 5, further comprising determining if the first new meter is listed in the meter database after receiving the register meter API command, responding with the meter ID for the first new meter if the first new meter is listed in the meter database, and assigning a new meter ID for the first new meter if the first new meter is not in the meter database.

7. The method of claim 4, further comprising allowing the user to search for the meter ID for the first new meter and associate the first new meter with the first customer group.

8. The method of claim 1, further comprising storing a list of users associated with the electronic unique first customer key.

9. The method of claim 1, further comprising communicating with a client device through a web interface.

10. A method of implementing a utility meter management system comprising:

receiving a first register meter application programming interface (API) command from a web service enabled first meter;

registering the web service enabled first meter with a meter server, the meter server configured to store information related to a plurality of meters;

receiving a second register meter API command from a web service enabled second meter;

registering the web service enabled second meter with the meter server;

storing information associated with the first meter as first meter data;

storing information associated with the second meter as second meter data;

assigning a unique first API key to a first customer group;

assigning a unique second API key to a second customer group;

limiting access to the first meter data to users authenticated with the first API key; and limiting access to the second meter data to users authenticated with the second API key.

11. The method of claim 10, further comprising communicating a first meter ID from the meter server to a client device after registering the web service enabled first meter.

12. The method of claim 10, further comprising writing CT/PT ratio, energy scaling, and/or hookup information associated with the web service enabled first meter and the second meter into a meter database associated with the meter server.

13. The method of claim 10, further comprising providing data associated with the web service enabled first meter to an authenticated user with the first API key.

14. The method of claim 10, wherein the first register meter API command is received over a network.

15. The method of claim 10, further comprising receiving the first API key from a user and providing and add meter request to the user.

16. The method of claim 15, further comprising allowing the user to search for the web service enabled first meter using a meter ID.

17. A cloud-based meter management system comprising:

a web service enabled meter;

a server that receives and stores meter log data pushed to the server from the web service enabled meter;

a client device configured to communicate with the server and access the meter log data stored on the server, the client device including a user interface;

wherein the user interface provides a first registration option and a second registration option, the first registration option configured to create a unique customer group and the second registration option configured to join an existing customer group;

wherein a unique application programming interface (API) key is generated when the first registration option is selected; and wherein the unique API key is used to register the web service enabled meter with the customer group when the second registration option is selected; and wherein the unique API key is used to verify that the web service enabled meter has legitimate access to the server to push meter log data.

18. The cloud-based meter management system of claim 17, wherein the server is configured to query its database for the meter because of the client device sending the unique API key to the server when the second registration option is selected.

19. The cloud-based meter management system of claim 18, wherein the server returns a notification to the client device indicating that the meter is already registered when the query locates the web service enabled meter.

20. The cloud-based meter management system of claim 18, wherein the server registers the web service enabled meter with the customer group and stores information associated with the web service enabled meter in a database.

* * * * *